US009394385B2

(12) United States Patent
Hlavinka et al.

(10) Patent No.: US 9,394,385 B2
(45) Date of Patent: Jul. 19, 2016

(54) POLYMER COMPOSITIONS AND METHODS OF MAKING AND USING SAME

(71) Applicant: Chevron Phillips Chemical Company LP, The Woodlands, TX (US)

(72) Inventors: Mark L. Hlavinka, Bartlesville, OK (US); Qing Yang, Bartlesville, OK (US); William B. Beaulieu, Tulsa, OK (US); Paul J. DesLauriers, Owasso, OK (US)

(73) Assignee: Chevron Phillips Chemical Company LP, The Woodlands, TX (US)

( * ) Notice: Subject to any disclaimer, the term of this patent is extended or adjusted under 35 U.S.C. 154(b) by 0 days.

(21) Appl. No.: 14/684,844

(22) Filed: Apr. 13, 2015

(65) Prior Publication Data

US 2015/0210786 A1    Jul. 30, 2015

Related U.S. Application Data

(62) Division of application No. 13/753,289, filed on Jan. 29, 2013, now Pat. No. 9,034,991.

(51) Int. Cl.
*C08F 210/16* (2006.01)
*C08F 10/14* (2006.01)
(Continued)

(52) U.S. Cl.
CPC .............. *C08F 10/14* (2013.01); *C08F 210/16* (2013.01); *C08F 4/65912* (2013.01); *C08F 4/65927* (2013.01); *C08F 2500/05* (2013.01); *C08F 2500/09* (2013.01); *C08F 2500/10* (2013.01); *C08L 2203/18* (2013.01); *C08L 2205/02* (2013.01); *F16L 9/12* (2013.01)

(58) Field of Classification Search
CPC ............... C08F 210/16; C08F 2500/04; C08F 2500/05; C08F 2500/10; C08F 2500/17; C08L 23/16; C08L 2203/18
See application file for complete search history.

(56) References Cited

U.S. PATENT DOCUMENTS 3,161,629 A    12/1964  Gorsich
3,242,099 A     3/1966  Manyik et al.
(Continued)

FOREIGN PATENT DOCUMENTS

CN    103012196 A    4/2013
DE      1959322 A1   7/1971
(Continued)

OTHER PUBLICATIONS

Negishi, E.-I., "Product Class 11: Organometallic Complexes of Zirconium and Hafnium," Science of Synthesis, XP-001243520, 2003, pp. 681-775.
(Continued)

*Primary Examiner* — Rip A Lee
(74) *Attorney, Agent, or Firm* — Conley Rose, P.C.; Rodney B. Carroll; Cheryl L. Huseman

(57) ABSTRACT

A polymer reactor-blend comprising at least a first component having a polydispersity index of greater than about 20 and is present in an amount of from about 1 wt. % to about 99 wt. % based on the total weight of the polymer and a second component having a polydispersity index of less than about 20 and is present in an amount of from about 1 wt. % to about 99 wt. % based on the total weight of the polymer wherein a molecular weight distribution of the second component lies within a molecular weight distribution of the first component.

21 Claims, 5 Drawing Sheets

(51) Int. Cl.
*F16L 9/12* (2006.01)
*C08F 4/659* (2006.01)
*C08F 4/6592* (2006.01)

(56) References Cited

U.S. PATENT DOCUMENTS

| | | |
|---|---|---|
| 3,248,179 A | 4/1966 | Norwood |
| 3,533,738 A | 10/1970 | Rundell et al. |
| 3,946,020 A | 3/1976 | Minato et al. |
| 4,060,480 A | 11/1977 | Reed et al. |
| 4,070,272 A | 1/1978 | Rausch |
| 4,077,904 A | 3/1978 | Noshay et al. |
| 4,101,445 A | 7/1978 | Levine et al. |
| 4,279,780 A | 7/1981 | Dombro |
| 4,452,910 A | 6/1984 | Hopkins et al. |
| 4,476,243 A | 10/1984 | Dombro |
| 4,501,885 A | 2/1985 | Sherk et al. |
| 4,526,942 A | 7/1985 | Chester et al. |
| 4,547,551 A | 10/1985 | Bailey et al. |
| 4,588,790 A | 5/1986 | Jenkins, III et al. |
| 4,596,862 A | 6/1986 | McDaniel et al. |
| 4,657,998 A | 4/1987 | Malpass |
| 4,659,685 A | 4/1987 | Coleman, III et al. |
| 4,788,171 A | 11/1988 | Klendworth |
| 4,794,096 A | 12/1988 | Ewen |
| 4,803,253 A | 2/1989 | McDaniel et al. |
| 4,806,513 A | 2/1989 | McDaniel et al. |
| 4,808,561 A | 2/1989 | Welborn, Jr. |
| 4,892,851 A | 1/1990 | Ewen et al. |
| 4,939,217 A | 7/1990 | Stricklen |
| 4,969,522 A | 11/1990 | Whitehurst et al. |
| 5,001,204 A | 3/1991 | Klendworth et al. |
| 5,010,152 A | 4/1991 | McDaniel et al. |
| 5,036,034 A | 7/1991 | Ewen |
| 5,037,911 A | 8/1991 | McDaniel et al. |
| 5,049,535 A | 9/1991 | Resconi et al. |
| 5,071,808 A | 12/1991 | Antberg et al. |
| 5,075,467 A | 12/1991 | Desobry |
| 5,085,705 A | 2/1992 | Withiam |
| 5,162,278 A | 11/1992 | Razavi |
| 5,171,798 A | 12/1992 | McDaniel et al. |
| 5,183,868 A | 2/1993 | Nordquest |
| 5,191,132 A | 3/1993 | Patsidis et al. |
| 5,210,352 A | 5/1993 | Alt et al. |
| 5,223,467 A | 6/1993 | Razavi |
| 5,321,105 A | 6/1994 | Rekers et al. |
| 5,332,707 A | 7/1994 | Karayannis et al. |
| 5,347,026 A | 9/1994 | Patsidis et al. |
| 5,352,749 A | 10/1994 | DeChellis et al. |
| 5,369,196 A | 11/1994 | Matsumoto et al. |
| 5,376,611 A | 12/1994 | Shveima |
| 5,399,636 A | 3/1995 | Alt et al. |
| 5,401,817 A | 3/1995 | Palackal et al. |
| 5,401,820 A | 3/1995 | McDaniel et al. |
| 5,416,228 A | 5/1995 | Ewen et al. |
| 5,420,320 A | 5/1995 | Zenk et al. |
| 5,434,116 A | 7/1995 | Sone et al. |
| 5,436,304 A | 7/1995 | Griffin et al. |
| 5,436,305 A | 7/1995 | Alt et al. |
| 5,439,995 A | 8/1995 | Bailly et al. |
| 5,444,134 A | 8/1995 | Matsumoto |
| 5,451,649 A | 9/1995 | Zenk et al. |
| 5,455,314 A | 10/1995 | Burns et al. |
| 5,461,127 A | 10/1995 | Naganuma et al. |
| 5,468,702 A | 11/1995 | Jejelowo |
| 5,483,014 A | 1/1996 | Turner et al. |
| 5,496,781 A | 3/1996 | Geerts et al. |
| 5,496,782 A | 3/1996 | Zandona |
| 5,498,581 A | 3/1996 | Welch et al. |
| 5,527,867 A | 6/1996 | Bergmeister |
| 5,534,473 A | 7/1996 | Welch et al. |
| 5,541,272 A | 7/1996 | Schmid et al. |
| 5,543,376 A | 8/1996 | Bergmeister |
| 5,554,795 A | 9/1996 | Frey et al. |
| 5,556,893 A | 9/1996 | Costa et al. |
| 5,563,284 A | 10/1996 | Frey et al. |
| 5,565,175 A | 10/1996 | Hottovy et al. |
| 5,565,592 A | 10/1996 | Patsidis et al. |
| 5,571,880 A | 11/1996 | Alt et al. |
| 5,575,979 A | 11/1996 | Hanson |
| 5,576,259 A | 11/1996 | Hasegawa et al. |
| 5,587,501 A | 12/1996 | Winter et al. |
| 5,594,078 A | 1/1997 | Welch et al. |
| 5,594,080 A | 1/1997 | Waymouth et al. |
| 5,612,271 A | 3/1997 | Zandona |
| 5,631,203 A | 5/1997 | Welch et al. |
| 5,631,335 A | 5/1997 | Alt et al. |
| 5,643,847 A | 7/1997 | Walzer, Jr. |
| 5,646,322 A | 7/1997 | van Beek et al. |
| 5,648,439 A | 7/1997 | Bergmeister et al. |
| 5,654,454 A | 8/1997 | Peifer et al. |
| 5,668,230 A | 9/1997 | Schertl et al. |
| 5,670,580 A | 9/1997 | Tazaki et al. |
| 5,700,748 A | 12/1997 | Murray |
| 5,703,181 A | 12/1997 | Tashiro et al. |
| 5,705,578 A | 1/1998 | Peifer et al. |
| 5,705,579 A | 1/1998 | Hawley et al. |
| 5,714,425 A | 2/1998 | Chabrand et al. |
| 5,714,555 A | 2/1998 | Chabrand et al. |
| 5,719,241 A | 2/1998 | Razavi et al. |
| 5,726,264 A | 3/1998 | Jung et al. |
| 5,739,220 A | 4/1998 | Shamshoum et al. |
| 5,780,659 A | 7/1998 | Schmid et al. |
| 5,807,938 A | 9/1998 | Kaneko et al. |
| 5,854,165 A | 12/1998 | Yabunouchi et al. |
| 5,854,363 A | 12/1998 | Jung et al. |
| 5,861,352 A | 1/1999 | Gila et al. |
| 5,866,497 A | 2/1999 | Murray |
| 5,883,036 A | 3/1999 | Fujie et al. |
| 5,886,202 A | 3/1999 | Jung et al. |
| 5,906,955 A | 5/1999 | Hamura et al. |
| 5,907,021 A | 5/1999 | Turner et al. |
| 5,919,983 A | 7/1999 | Rosen et al. |
| 5,942,459 A | 8/1999 | Sugano et al. |
| 6,034,187 A | 3/2000 | Maehama et al. |
| 6,096,677 A | 8/2000 | Wilson, Jr. |
| 6,107,230 A | 8/2000 | McDaniel et al. |
| 6,114,477 A | 9/2000 | Merrill et al. |
| 6,150,544 A | 11/2000 | Seki et al. |
| 6,165,929 A | 12/2000 | McDaniel et al. |
| 6,169,151 B1 | 1/2001 | Waymouth et al. |
| 6,174,981 B1 | 1/2001 | Bergmeister et al. |
| 6,180,736 B1 | 1/2001 | Muhle et al. |
| 6,187,880 B1 | 2/2001 | Welch et al. |
| 6,201,077 B1 | 3/2001 | Bergmeister et al. |
| 6,204,346 B1 | 3/2001 | Bergmeister et al. |
| 6,225,425 B1 | 5/2001 | Dolle et al. |
| 6,239,059 B1 | 5/2001 | Saudemont et al. |
| 6,239,235 B1 | 5/2001 | Hottovy et al. |
| 6,262,191 B1 | 7/2001 | Hottovy et al. |
| 6,262,201 B1 | 7/2001 | Welch et al. |
| 6,268,447 B1 | 7/2001 | Murray et al. |
| 6,274,684 B1 | 8/2001 | Loveday et al. |
| 6,291,699 B1 | 9/2001 | Birmingham et al. |
| 6,294,494 B1 | 9/2001 | McDaniel et al. |
| 6,300,271 B1 | 10/2001 | McDaniel et al. |
| 6,300,451 B1 | 10/2001 | Mehta et al. |
| 6,316,553 B1 | 11/2001 | McDaniel et al. |
| 6,333,389 B2 | 12/2001 | Whiteker et al. |
| 6,340,651 B1 | 1/2002 | Licht et al. |
| 6,340,652 B1 | 1/2002 | Sugano et al. |
| 6,355,594 B1 | 3/2002 | McDaniel et al. |
| 6,376,415 B1 | 4/2002 | McDaniel et al. |
| 6,388,017 B1 | 5/2002 | McDaniel et al. |
| 6,391,816 B1 | 5/2002 | McDaniel et al. |
| 6,395,666 B1 | 5/2002 | McDaniel et al. |
| 6,462,161 B1 | 10/2002 | Cady et al. |
| 6,469,188 B1 | 10/2002 | Miller et al. |
| 6,482,905 B1 | 11/2002 | Schmidt et al. |
| 6,489,263 B2 | 12/2002 | Murray et al. |
| 6,509,427 B1 | 1/2003 | Welch et al. |
| 6,515,086 B1 | 2/2003 | Razavi |
| 6,524,987 B1 | 2/2003 | Collins et al. |
| 6,531,565 B2 | 3/2003 | Kellum et al. |

(56) References Cited

U.S. PATENT DOCUMENTS

| | | | |
|---|---|---|---|
| 6,541,413 B1 | 4/2003 | Razavi et al. |
| 6,548,441 B1 | 4/2003 | McDaniel et al. |
| 6,548,442 B1 | 4/2003 | Collins et al. |
| 6,573,344 B1 | 6/2003 | Hawley et al. |
| 6,576,583 B1 | 6/2003 | McDaniel et al. |
| 6,583,241 B1 | 6/2003 | Beach et al. |
| 6,613,712 B1 | 9/2003 | McDaniel et al. |
| 6,613,852 B2 | 9/2003 | McDaniel et al. |
| 6,632,894 B1 | 10/2003 | McDaniel et al. |
| 6,653,416 B2 | 11/2003 | McDaniel et al. |
| 6,667,274 B1 | 12/2003 | Hawley et al. |
| 6,686,490 B1 | 2/2004 | Kol et al. |
| 6,693,153 B2 | 2/2004 | Miller et al. |
| 6,750,302 B1 | 6/2004 | McDaniel et al. |
| 6,770,712 B2 | 8/2004 | Golze et al. |
| 6,831,141 B2 | 12/2004 | McDaniel et al. |
| 6,833,415 B2 | 12/2004 | Kendrick et al. |
| 6,897,176 B2 | 5/2005 | Nakayama et al. |
| 6,936,667 B2 | 8/2005 | Jensen et al. |
| 6,939,928 B1 | 9/2005 | Kawai et al. |
| 6,982,306 B2 | 1/2006 | Martin et al. |
| 6,984,603 B2 | 1/2006 | McDaniel et al. |
| 6,992,032 B2 | 1/2006 | McDaniel et al. |
| 6,998,441 B2 | 2/2006 | Golze et al. |
| 7,002,031 B2 | 2/2006 | Resconi et al. |
| 7,026,494 B1 | 4/2006 | Yang et al. |
| 7,041,617 B2 | 5/2006 | Jensen et al. |
| 7,064,225 B2 | 6/2006 | Thorn et al. |
| 7,094,857 B2 | 8/2006 | Sukhadia et al. |
| 7,109,277 B2 | 9/2006 | Hawley et al. |
| 7,119,153 B2 | 10/2006 | Jensen et al. |
| 7,125,821 B2 | 10/2006 | Xu et al. |
| 7,148,298 B2 | 12/2006 | Jensen et al. |
| 7,163,906 B2 | 1/2007 | McDaniel et al. |
| 7,199,073 B2 | 4/2007 | Martin et al. |
| 7,226,886 B2 | 6/2007 | Jayaratne et al. |
| 7,247,594 B2 | 7/2007 | Jayaratne et al. |
| 7,294,599 B2 | 11/2007 | Jensen et al. |
| 7,312,283 B2 | 12/2007 | Martin et al. |
| 7,345,113 B2 | 3/2008 | Van Dun et al. |
| 7,393,965 B2 | 7/2008 | Tohi et al. |
| 7,396,888 B2 | 7/2008 | Razavi |
| 7,432,328 B2 | 10/2008 | Jaker |
| 7,449,527 B2* | 11/2008 | Razavi ................ C08F 10/00 525/191 |
| 7,468,452 B1 | 12/2008 | Martin et al. |
| 7,470,758 B2 | 12/2008 | Jensen et al. |
| 7,479,529 B2 | 1/2009 | Wenzel et al. |
| 7,501,372 B2 | 3/2009 | Thorn et al. |
| 7,517,939 B2 | 4/2009 | Yang et al. |
| 7,521,572 B2 | 4/2009 | Jayaratne et al. |
| 7,534,842 B2 | 5/2009 | Jayaratne et al. |
| 7,576,163 B2 | 8/2009 | Yang et al. |
| 7,595,364 B2 | 9/2009 | Shannon et al. |
| 7,601,665 B2 | 10/2009 | McDaniel et al. |
| 7,619,047 B2 | 11/2009 | Yang et al. |
| 7,625,982 B2* | 12/2009 | Martin ............... C08F 210/16 138/178 |
| 7,629,284 B2 | 12/2009 | Jensen et al. |
| 7,632,907 B2 | 12/2009 | Sukhadia et al. |
| 7,652,160 B2 | 1/2010 | Yang et al. |
| 7,666,959 B2 | 2/2010 | Razavi |
| 7,696,280 B2* | 4/2010 | Krishnaswamy ....... C08L 23/04 525/191 |
| 7,732,542 B2 | 6/2010 | Yang et al. |
| 7,763,561 B2 | 7/2010 | McDaniel et al. |
| 7,790,820 B2 | 9/2010 | Jensen et al. |
| 7,842,763 B2 | 11/2010 | Jensen et al. |
| 7,847,009 B2 | 12/2010 | Wong et al. |
| 7,863,210 B2 | 1/2011 | Murray et al. |
| 7,884,163 B2 | 2/2011 | McDaniel et al. |
| 7,884,165 B2 | 2/2011 | McDaniel et al. |
| 7,906,603 B2 | 3/2011 | McDaniel et al. |
| 7,910,763 B2 | 3/2011 | Jayaratne et al. |
| 7,919,639 B2 | 4/2011 | Murray et al. |
| 7,951,881 B2 | 5/2011 | Sukhadia et al. |
| 7,960,487 B2 | 6/2011 | Yang et al. |
| 7,989,549 B2 | 8/2011 | Zhou et al. |
| 8,012,900 B2 | 9/2011 | Murray et al. |
| 8,048,679 B2 | 11/2011 | DesLauriers et al. |
| 8,067,511 B2 | 11/2011 | Shin et al. |
| 8,080,681 B2 | 12/2011 | Murray et al. |
| 8,114,946 B2 | 2/2012 | Yang et al. |
| 8,119,553 B2 | 2/2012 | Yang et al. |
| 8,129,472 B2 | 3/2012 | Turner et al. |
| 8,138,113 B2 | 3/2012 | Yang et al. |
| 8,318,862 B2 | 11/2012 | Michie, Jr. |
| 8,344,068 B2 | 1/2013 | Michie, Jr. et al. |
| 8,501,651 B2 | 8/2013 | Ding et al. |
| 8,536,391 B2 | 9/2013 | Small et al. |
| 8,580,893 B2 | 11/2013 | McLeod et al. |
| 8,835,577 B2 | 9/2014 | Rix et al. |
| 8,877,672 B2 | 11/2014 | Hlavinka et al. |
| 8,895,679 B2 | 11/2014 | Hlavinka |
| 8,937,139 B2 | 1/2015 | Hlavinka et al. |
| 2004/0059070 A1 | 3/2004 | Whitte et al. |
| 2004/0152591 A1 | 8/2004 | Jin et al. |
| 2005/0101772 A1 | 5/2005 | Schottek et al. |
| 2005/0148460 A1 | 7/2005 | Marin et al. |
| 2005/0203261 A1 | 9/2005 | Sukhadia et al. |
| 2005/0288461 A1 | 12/2005 | Jensen et al. |
| 2006/0178482 A1 | 8/2006 | Kwalk |
| 2006/0189769 A1 | 8/2006 | Hoang et al. |
| 2007/0060726 A1 | 3/2007 | Razavi |
| 2007/0073013 A1 | 3/2007 | Razavi et al. |
| 2007/0197716 A1* | 8/2007 | Krishnaswamy ..... C08F 210/16 524/543 |
| 2009/0240010 A1 | 9/2009 | McDaniel et al. |
| 2010/0179055 A1 | 7/2010 | Prades et al. |
| 2010/0221475 A1 | 9/2010 | Sukhadia et al. |
| 2010/0280199 A1 | 11/2010 | McDaniel et al. |
| 2011/0035193 A1 | 2/2011 | Deslauriers et al. |
| 2011/0082323 A1 | 4/2011 | Small et al. |
| 2012/0046428 A1 | 2/2012 | Kao et al. |
| 2012/0059134 A1 | 3/2012 | Yang et al. |
| 2013/0059100 A1 | 3/2013 | Hlavinka et al. |
| 2013/0059103 A1 | 3/2013 | Yang et al. |
| 2013/0059982 A1 | 3/2013 | Yu et al. |
| 2014/0213747 A1 | 7/2014 | Hlavinka et al. |

FOREIGN PATENT DOCUMENTS

| | | | |
|---|---|---|---|
| EP | 0416928 | A2 | 3/1991 |
| EP | 0416928 | A3 | 11/1991 |
| EP | 0628574 | A1 | 12/1994 |
| EP | 0416928 | B1 | 3/1995 |
| EP | 0666267 | B1 | 8/1995 |
| EP | 0729978 | A1 | 9/1996 |
| EP | 0853086 | A1 | 7/1998 |
| EP | 0881236 | A1 | 12/1998 |
| EP | 1201711 | A1 | 5/2002 |
| EP | 1276775 | A1 | 1/2003 |
| EP | 1276775 | B1 | 1/2003 |
| EP | 1325899 | A1 | 7/2003 |
| EP | 1405866 | A1 | 4/2004 |
| JP | 09059289 | A | 3/1997 |
| WO | 9914219 | A1 | 3/1999 |
| WO | 9948934 | A1 | 9/1999 |
| WO | 9960033 | A1 | 11/1999 |
| WO | 0024792 | A1 | 5/2000 |
| WO | 0037512 | A2 | 6/2000 |
| WO | 0105852 | A1 | 1/2001 |
| WO | 0123433 | A1 | 4/2001 |
| WO | 0123434 | A1 | 4/2001 |
| WO | 0141920 | A1 | 6/2001 |
| WO | 0144309 | A1 | 6/2001 |
| WO | 0158587 | A1 | 8/2001 |
| WO | 0170827 | A1 | 9/2001 |
| WO | 0170828 | A1 | 9/2001 |
| WO | 0183498 | A1 | 11/2001 |
| WO | 0190239 | A1 | 11/2001 |
| WO | 02074854 | A2 | 9/2002 |
| WO | 03008468 | A2 | 1/2003 |
| WO | 03020821 | A1 | 3/2003 |

(56) References Cited

FOREIGN PATENT DOCUMENTS

| WO | 2004087770 A1 | 10/2004 |
|---|---|---|
| WO | 2005118654 A1 | 12/2005 |
| WO | 2006008127 A1 | 1/2006 |
| WO | 2007024773 A1 | 3/2007 |
| WO | 2007037836 A2 | 4/2007 |
| WO | 2007037836 A3 | 4/2007 |
| WO | 2007092753 A2 | 8/2007 |
| WO | 2007092753 A3 | 8/2007 |
| WO | 2007101053 A1 | 9/2007 |
| WO | 2008002969 A2 | 1/2008 |
| WO | 2008003020 A2 | 1/2008 |
| WO | 2009117128 A1 | 9/2009 |
| WO | 2010098827 A1 | 9/2010 |
| WO | 2014066602 A1 | 5/2014 |
| WO | 2014066618 A1 | 5/2014 |
| WO | 2014120540 A1 | 8/2014 |
| WO | 2014120548 A1 | 8/2014 |

OTHER PUBLICATIONS

Peifer, Bernd, "Self-immobilizing Metallocene Catalysts for the Polymerization of Olefins," PhD. Dissertation, 1995, 132 pages, University of Bayreuth, Germany.
"Group notation revised in periodic table," Feb. 4, 1985, C&EN, pp. 26-27.
Pinnavaia, Thomas J., "Intercalated Clay Catalysts," Apr. 22, 1983, pp. 365-371, vol. 220, No. 4595, Science.
Podzimek, Stepan, "A review of the analysis of branched polymers by SEC-MALS," Jan. 2002, 5 pages, American Laboratory.
Poli, Rinaldo, "Monocyclopentadienyl Halide Complexes of the d- and f-Block Elements," XP-002422576, Chem. Rev., 1991, pp. 509-551, vol. 91, No. 4, American Chemical Society.
Renaut, P., et al., "Cyclopentadienylhafnium Trichloride, Its Synthesis and Use to Prepare a Chiral Hafnium Compound," Journal of Organometallic Chemistry, 1977, pp. C35-C36, vol. 127, Elsevier Sequoia S.A., Lausanne.
Sacchi, Maria Carmela, et al., "Silica-Supported Metallocenes: Stereochemical Comparison Between Homogeneous and Heterogeneous Catalysis," Macromol. Rapid Commun., 1995, pp. 581-590, vol. 16, Hüthig & Wepf Verlag, Zug.
Sandman, Daniel J., et al., "5,6:11,12-Bis(ditelluro)tetracene: Synthesis, Molecular, and Supramolecular Properties," Organometallics, 1982, pp. 739-742, vol. 1, No. 5, American Chemical Society.
Schumann, Herbert, et al., "Synthesis, characterization, and catalytic properties of bis[alkylindenyl]-, bis[alkenylindenyl]- and [alkenylindenyl(cyclopentadienyl)]zirconium dichloride complexes," Journal of Organometallic Chemistry, 2001, pp. 31-40, vol. 636, Elseiver Science B.V.
Shida, M., et al., "Correlation of Low Density Polyethylene Rheological Measurements with Optical and Processing Properties," Polymer Engineering and Science, Nov. 1977, pp. 769-774 plus cover page, vol. 17, No. 11, The Society of Plastics Engineers, Inc.
Sitzmann, Helmut, et al., "Titan-, Zirconium- und Hafniumkomplexe mit 1, 2, 4-Tri-tert-butyl-cyclopentadienyl-Liganden," Chem. Ber., 1994, pp. 3-9, vol. 127, VCH Verlagsgesellschaft mbH, Weinheim.
Soga, Kazuo, et al., "Activation of SiO2-supported zirconocene catalysts by common trialkylaluminiums," Makromol. Chem., 1993, pp. 3499-3504, vol. 194, Hüthig & Wepf Verlag, Basel.
Soga, Kazuo, et al., "Highly Isospecific SiO2-Supported Zirconocene Catalyst Activated by Ordinary Alkylaluminiums," Macromol. Rapid Commun., 1994, pp. 139-143, vol. 15, Hüthig & Wepf Verlag, Basel.
Soga, Kazuo, et al., "Polymerization of Propene with the Heterogeneous Catalyst System Et[IndH4]2ZrCI2/MAO/SiO2 Combined with Trialkylaluminium," Makromol. Chem., Rapid Commun., 1992, pp. 221-224, vol. 13, Hüthig & Wepf Verlag, Basel.
Soga, Kazuo, et al., "Polymerization of Propene with Zirconocene-Containing Supported Catalysts Activated by Common Trialkylaluminiums," Makromol. Chem., 1993, pp. 1745-1755, vol. 194, Hüthig & Wepf Verlag, Basel.
Stone, Keith J., et al., "An Exceptionally Simple and Efficient Method for the Preparation of a Wide Variety of Fulvenes," The Journal of Organic Chemistry, Jun. 1, 1984, pp. 1849-1853, vol. 49, No. 11, American Chemical Society.
Sukhadia, Ashish M., "The Complex Effects of Long Chain Branching on the Blown Film Performance of LLDPE Resins," Antec Annual Technical Conference, Conference Proceedings, vol. II—Materials, pp. 1481-1486 plus cover page, May 5-9, 2002, California, Society of Plastics Engineers.
Thomas, J. M., "Sheet Silicate Intercalates: New Agents for Unusual Chemical Conversions," Intercalation Chemistry, 1982, Chapter 3, pp. 55-99, Academic Press, Inc.
Villar, Marcelo A., et al., "Rheological characterization of molten ethylene—α-olefin copolymers synthesized with Et[Ind]2ZrCl2MAO catalyst," Polymer, 2001, pp. 9269-9279, vol. 42, Elsevier Science Ltd.
Walter, Philipp, et al., "Influence of zirconocene structure and propene content on melt rheology of polyethene and ethene propene copolymers," Polymer Bulletin, 2001, pp. 205-213, vol. 46, Springer-Verlag.
Wengrovius, Jeffrey H., et al., "Attempts to Prepare Alkylidene Zirconium Complexes by Hydrogen Atom Abstraction," Journal of Organometallic Chemistry, 1981, pp. 319-327, vol. 205, Elsevier Sequoia S.A., Lausanne.
Winter, Charles H., et al., "Cyclopentadienylmetal Trichloride Formation versus Metallocene Dichloride Formation in the Reactions of Silylated Cyclopentadienes with Zirconium and Hafnium Chlorides. Crystal Structure of (1,3-Bis(trimethylsilyl)cyclopentadienyl)titanium Trichloride," Organometallics, 1991, pp. 210-214, vol. 10, No. 1, American Chemical Society.
Zenk, Roland, "Tailor-made bridged metallocene dichloride complexes as catalyst precursors for the stereospecific homogeneous polymerization of propylene," Dissertation, 1994, 186 pages, University of Bayreuth, Germany.
Zigeuner G., et al., "Über die Struktur der künstlichen Harze VIII. Mitt.: Zur Darstellung von 3,5-disubstituierten 2-Hydroxybenzaldehyden (Structure of synthetic resins. VIII. The preparation of 3,5-disubstituted 2-Hydroxybenzaldehydes) ," XP009175444, Monatshefte fur Chemie, Jan. 1, 1959, pp. 297-305, vol. 90, No. 3, Springer Verlag.
Zhang, Yong, et al., "Some Mixed Cyclopentadienyl-Indenyl Zirconium Complexes with PhCH2 or PhCH2CH2 Substituents in Ethylene Polymerization," Journal of Polymer Science: Part A: Polymer Chemistry, 2005, pp. 1261-1269, vol. 43, Wiley Periodicals, Inc.
Foreign communication from a related counterpart application—International Search Report, PCT/US2013/066550, Jan. 22, 2014, 4 pages.
Foreign communication from a related counterpart application—International Search Report, PCT/US2013/066583, Jan. 22, 2014, 3 pages.
Foreign communication from a related counterpart application—International Search Report and Written Opinion, PCT/US2007/062555, Aug. 2, 2007, 8 pages.
Foreign communication from a related counterpart application—International Preliminary Report on Patentability, PCT/US2007/062555, Aug. 26, 2008, 6 pages.
Foreign communication from a related counterpart application—International Search Report and Written Opinion, PCT/US2006/032542, Aug. 9, 2007, 20 pages.
Foreign communication from a related counterpart application—International Preliminary Report on Patentability, PCT/US2006/032542, Mar. 18, 2008, 14 pages.
Foreign communication from a related counterpart application—International Search Report and Written Opinion, PCT/US2007/061519, Sep. 12, 2007, 13 pages.
Foreign communication from a related counterpart application—International Preliminary Report on Patentability, PCT/US2007/061519, Aug. 5, 2008, 9 pages.
Foreign communication from a related counterpart application—International Search Report and Written Opinion, PCT/US2009/001741, Aug. 5, 2009, 8 pages.

(56) References Cited

OTHER PUBLICATIONS

Foreign communication from a related counterpart application—International Preliminary Report on Patentability, PCT/US2009/001741, Sep. 21, 2010, 6 pages.
Foreign communication from a related counterpart application—Invitation to Pay Additional Fees, PCT/US2014/012689, Apr. 3, 2014, 5 pages.
Foreign communication from a related counterpart application—International Search Report, PCT/US2014/012689, Jul. 22, 2014, 5 pages.
Foreign communication from a related counterpart application—International Search Report, PCT/US2014/012723, Apr. 14, 2014, 3 pages.
Office Action dated Jun. 9, 2014 (51 pages), U.S. Appl. No. 13/753,289, filed Jan. 29, 2013.
Office Action (Final) dated Nov. 20, 2014 (10 pages), U.S. Appl. No. 13/753,289, filed Jan. 29, 2013.
Advisory Action dated Dec. 22, 2014 (4 pages), U.S. Appl. No. 13/753,289, filed Jan. 29, 2013.
Notice of Allowance dated Jan. 22, 2015 (10 pages), U.S. Appl. No. 13/753,289, filed Jan. 29, 2013.
Alt, Helmut G., et al., "Ansa-Metallocenkomplexe des Typs (C13H8—SiR2-C9H6_nR'n)ZrCl2 (n=0, 1; R=Me, Ph, Alkenyl; R'=Alkyl, Alkenyl): Selbstimmobilisierende Katalysatorvorstufen für die Ethylenpolymerisation," Journal of Organometallic Chemistry, 1998, pp. 229-253, vol. 562, Elsevier Science S.A.
Alt, Helmut G., et al., "C1-Bridged fluorenylidene cyclopentadienylidene complexes of the type (C13H8—CR1R2-C5H3R)ZrCl2 (R1, R2=alkyl, phenyl, alkenyl; R=H, alkyl, alkenyl, substituted silyl) as catalyst precursors for the polymerization of ethylene and propylene," Journal of Organometallic Chemistry, 1998, pp. 87-112, vol. 568, Elsevier Science S.A.
Alt, Helmut G., et al., "C1-verbrückte Fluorenyliden—Indenylidenkomplexe des Typs (C13H8—CR2—C9H6_nR'n) ZrCl2 (n=0, 1; R=Me, Ph, Butenyl; R'=Alkyl, Alkenyl) als Metallocenkatalysatorvorstufen für die Ethylenpolymerisation," Journal of Organometallic Chemistry, 1998, pp. 153-181, vol. 562, Elsevier Science S.A.
Alt, Helmut G., et al., "C2-bridged metallocene dichloride complexes of the types (C13H8—CH2CHR-C9H6_nR'n) ZrCl2 and (C13H8—CH2CHR-C13H8)MCl2(n=0, 1; R=H, alkenyl; R'=alkenyl, benzyl; M=Zr, Hf) as self-immobilizing catalyst precursors for ethylene polymerization," Journal of Organometallic Chemistry, 1999, pp. 1-16, vol. 580, Elsvier Science S.A.
Alt, Helmut G., et al., "Syndiospezifische Polymerisation von Propylen: 2- und 2,7-substituierte Metallocenkomplex des Typs (C13H8_nRnCR'2C5H4)MCl2(n=1,2; R=Alkoxy, Alkyl, Aryl, Hal; R'=Me, Pb; M=Zr, Hf)," Journal of Organometallic Chemistry, 1996, pp. 39-54, vol. 522, Elsevier Science S.A.
Alt, Helmut G., et al., "Verbrückte Indenyliden—Cyclopentadienylidenkomplexe des Typs (C9H5CH2Ph-X-C5H4)MCl2 (X=CMe2, SiMe2; M=Zr, Hf) als Metallocenkatalysatoren für die Ethylenpolymerisation. Die Molekülstrukturen von (C9H5CH2Ph-CMe2-C5H4)MCl2 (M=Zr, Hf)," Journal of Organometallic Chemistry, 1998, pp. 111-121, vol. 558, Elsevier Science S.A.
Amor, José Ignacio, et al., "Synthesis of bis(tert-butyl)cyclopentadienyl derivatives of titanium and zirconium. NMR spectra and dynamic behaviour of the base-free [Zr(1,3-tBu2-•5-C5H3)(CH2Ph)2]+ cation," Journal of Organometallic Chemistry, 1995, pp. 127-131, vol. 497, Elsevier Science S.A.
Arnett, Raymond L., et al., "Zero-Shear Viscosity of Some Ethyl Branched Paraffinic Model Polymers," J. Phys. Chem., 1980, pp. 649-652, vol. 84, No. 6, American Chemical Society.
Bird, R. Byron, et al., "Dynamics of Polymeric Liquids," Fluid Mechanics, vol. 1, Second Edition, 1987, cover page, publishing page, pp. xiii-xviii, and 171-172, John Wiley & Sons, Inc.
Breslow, David S., et al., "Bis-(Cyclopentadienyl)-Titanium Dichloride-Alkylaluminum Complexes as Catalysts for the Polymerization of Ethylene," Journal of the American Chemical Society, Communications to the Editor, Sep. 20, 1957, pp. 5072-5073, vol. 79.
Chien, James C. W., et al., "Olefin Copolymerization with Metallocene Catalysts. III. Supported Metallocene/Methylaluminoxane Catalyst for Olefin Copolymerization," Journal of Polymer Science: Part A: Polymer Chemistry, 1991, pp. 1603-1607, vol. 29, John Wiley & Sons, Inc.
Collins, Scott, et al., "Polymerization of Propylene Using Supported, Chiral, ansa-Metallocene Catalysts: Production of Polypropylene with Narrow Molecular Weight Distributions," Macromolecules, 1992, pp. 1780-1785, vol. 25, No. 6, American Chemical Society.
Cotton, F. Albert, et al., "Advanced Inorganic Chemistry," Sixth Edition, Mar. 30, 1999, cover page, title page, pp. ix-x, and 1 page book description, John Wiley & Sons, Inc.
Daniell, W., et al., "Enhanced surface acidity in mixed alumina-silicas: a low-temperature FTIR study," Applied Catalysis A: General, 2000, pp. 247-260, vol. 196, Elsevier Science B.V.
Das, P. K., "Computational Chemistry of Metallocene Catalyzed Olefin Polymerization," 21st Century Symp. S.W. Regional American Chemical Society Meeting, Oct. 25-28, 2003, pp. 2-12, Oklahoma.
Deppner, Matthias, "Substituted idenyl complexes of zirconium as catalysts for olefin polymerization," Dissertation, Feb. 1998, pp. 1-77 plus cover, information, and content pages, University of Bayreuth, Germany.
Erker, Gerhard, et al., "Convenient Route to Monocyclopentadienylzirconium (IV) Complexes," Inorg. Chem., 1982, pp. 1277-1278, vol. 21, American Chemical Soceity.
Gladysz, J. A., et al., "Reactions of organocyclopropanes and spirocycles with metal atoms," XP-002424275, Chemical Abstracts Service, (Journal of the American Chemical Society, 1979, pp. 3388-3390, vol. 101, No. 12), 2 pages.
Hawley's Condensed Chemical Dictionary, Eleventh Edition, 1987, cover page, contents page, and pp. 862-863, Van Nostrand Reinhold Company, New York.
Hieber, C. A., et al., "Shear-Rate-Dependence Modeling of Polymer Melt Viscosity," Jul. 1992, pp. 931-938, vol. 32, No. 14, Polymer Engineering and Science.
Hieber, C. A., et al., "Some correlations involving the shear viscosity of polystyrene melts," 1989, pp. 321-332, vol. 28, No. 4, Rheologica Acta.
Hitchcock, Peter B., et al., "Ligand Redistribution Reactions as a Route to Cyclopentadienyl- or 1-aza-allylzirconium(IV) Trichlorides and the X-ray Structures of [{Zr(LL')Cl2(μ-Cl)}2] and [Zr(LL')2Cl2] [LL'=N(R)C(But)CHR,R=SiMe3]," Polyhedron, 1995, pp. 2745-2752, vol. 14, No. 19, Elsevier Science Ltd.
Hubert, L., et al., "Physical and Mechanical Properties of Polyethylene for Pipes in Relation to Molecular Architecture. II. Short-Term Creep of Isotropic and Drawn Materials," Journal of Applied Polymer Science, vol. 84, 2002, pp. 2308-2317, Wiley Periodicals, Inc.
Hultzsch, Kurt, "Studien auf dem Gebiet der Phenol-Formaldehyd-Harze, XIV. Mittel.: Über die Ammoniak-Kondensation und die Reaktion von Phenolen mit Hexamethylentetramin (Phenol-formaldehyde resins. XIV. The ammonia condensation and the reaction of phenols with hexamethylenetetramine)," XP009175438, Chemische Berichte, vol. 82, No. 1, Jan. 1, 1949, pp. 16-25.
Jany, Gerhard, et al., "Para-Fluoro benzyl substituted bis(indenyl) metallocenes as catalyst precursors in ethene polymerization," Journal of Organometallic Chemistry, 1998, pp. 173-178, vol. 553, Elsevier Science S.A.
Janzen, J., et al., "Diagnosing long-chain branching in polyethylenes," Journal of Molecular Structure, 1999, pp. 569-584 plus 2 pages of comments and information, vol. 485-486, Elsevier Science B.V.
Jung, Michael, "Ansa Metallocene complexes of zirconium as catalysts for the olefin polymerization," Dissertation, 1997, 217 pages, University of Bayreuth, Germany.
Kajigaeshi, Shoji, et al., "Selective Preparation of Fluorene Derivatives Using the t-Butyl Function as a Positional Protective Group," Bull. Chem. Soc. Jpn., Jan. 1986, pp. 97-103, vol. 59, No. 1, The Chemical Society of Japan.
Kaminaka, Manabu, et al., "Polymerization of Propene with Catalyst Systems Composed of Al2O3- or MgCl2-Supported

(56) References Cited

OTHER PUBLICATIONS

Et[IndH4]2ZrCl2 and AlR3 (R=CH3, C2H5)," Makromol. Chem., Rapid Commun., 1991, pp. 367-372, vol. 12, Hüthig & Wepf Verlag, Basel.

Kaminsky, Walter, et al., "High Melting Polypropenes by Silica-Supported Zirconocene Catalysts," Makromol. Chem., Rapid Commun., 1993, pp. 239-243, vol. 14, Hüthig & Wepf Verlag, Basel.

Kaminsky, Walter, et al., "Metallocenes for Polymer Catalysis," Advances in Polymer Science, 1997, pp. 143-187, vol. 127, Springer-Verlag Berlin Heidelberg.

Kokko, Esa, et al., "Influence of the Catalyst and Polymerization Conditions on the Long-Chain Branching of Metallocene-Catalyzed Polyethenes," Journal of Polymer Science: Part A: Polymer Chemistry, 2000, pp. 376-388, vol. 38, John Wiley & Sons, Inc.

Kolodka, E., et al., "Long-chain branching in slurry polymerization of ethylene with zirconocene dichloride/modified methylaluminoxane," Polymer, 2000, pp. 3985-3991, vol. 41, Elsevier Science Ltd.

Köppl, Alexander, "Aluminoxane based immobilized cocatalysts for heterogeneous olefin polymerization," Dissertation, updated Dec. 13, 1997, pp. 1-160 plus cover, information, and content pages, University of Bayreuth, Germany.

Köppl, Alexander, et al., "Heterogeneous metallocene catalysts for ethlene polymerization," Journal of Molecular Catalysis A: Chemical, 2001, pp. 23-32, vol. 165, Elsevier Science B.V.

Kravchenko, Raisa, et al., "Propylene Polymerization with Chiral and Achiral Unbridged 2-Arylindene Metallocenes," Organometallics, 1997, pp. 3635-3639, vol. 16, No. 16, American Chemical Society.

Laurent, E., "Comprehensive Evaluation of the Long-Term Mechanical Properties of PE100 Resins Meeting the Requirements of Modern Installation Techniques," Plastics pipes XI, 2001, pp. 63-73 plus publishing page, Woodhead Publishing Limited.

Li, Hongbo, et al., Coordination Copolymerization of Severely Encumbered Isoalkenes with Ethylene: Enhanced Enchainment Mediated by Binuclear Catalysts and Cocatalysts, J. Am. Chem. Soc., 2005, pp. 14756-14768, vol. 127, No. 42, American Chemical Society.

Licht, Erik, "Metallacyclic zirconocene complexes as catalysts for homogeneous and heterogeneous olefin polymerization," Dissertation, updated May 14, 1998, pp. 1-178 plus cover, information, and content pages, University of Bayreuth, Germany.

Licht, Erik H., et al., "ω-Phenylalkyl-substituted zirconocene dichloride complexes as catalyst precursors for homogeneous ethylene polymerization," Journal of Organometallic Chemistry, 2000, pp. 275-287, vol. 599, Elsevier Science, S.A.

Licht, Andrea I., et al., "Synthesis of novel metallacyclic zirconocene complexes from ω-alkenyl-functionalized zirconocene dichloride complexes and their use in the α-olefin polymerization," Journal of Organometallic Chemistry, 2002, pp. 134-148, vol. 648, Elsevier Science B.V.

Llinás, Gerardo Hidalgo, et al., "(C5Me5)SiMe3 as a mild and effective reagent for transfer of the C5Me5 ring: an improved route to monopentamethylcyclopentadienyl trihalides of the group 4 elements," Journal of Organometallic Chemistry, 1988, pp. 37-40, vol. 304, Elsevier Sequoia S.A.

Lund, Eric C., et al., "Rapid and Efficient Procedures for the Synthesis of Monocyclopentadienyl Complexes of Hafnium and Zirconium," Organometallics, 1990, pp. 2426-2427, vol. 9, No. 9, American Chemical Society.

Malmberg, Anneli, et al., "Long-Chain Branching in Metallocene-Catalyzed Polyethylenes Investigated by Low Oscillatory Shear and Uniaxial Extensional Rheometry," Macromolecules, 2002, pp. 1038-1048, vol. 35, No. 3, American Chemical Society.

Marks, Tobin J., "Surface-Bound Metal Hydrocarbyls. Organometallic Connections between Heterogeneous and Homogeneous Catalysis," Accounts of Chemical Research, Feb. 1992, pp. 57-65, vol. 25, No. 2, American Chemical Society.

Martín, Avelino, et al., "Molecular structure of trichloro(•5-pentamethylcyclopentadienyl)zirconium(IV)," Journal of Organometallic Chemistry, 1994, pp. C10-C11, vol. 480, Elsevier Science S.A.

Maurya, Mannar R., et al., "Polymer supported vanadium and molybdenum complexes as potential catalysts for the oxidation and oxidative bromination of organic substrates," Dalton Transactions, 2006, pp. 3561-3575, The Royal Society of Chemistry.

McNaught, Alan D., et al., "Compendium of Chemical Terminology," International Union of Pure and Applied Chemistry, Second edition, 1997, 1 page, Wiley-Blackwell.

Naga, N., et al., "Stereochemical control in propylene polymerization with non-bridged metallocene dichloride/methylaluminoxane," Polymer, 1998, pp. 2703-2708, vol. 39, No. 13, Elsevier Science Ltd.

Natta, Giulio, et al., "A Crystallizable Organometallic Complex Containing Titanium and Aluminum," Journal of the American Chemical Society, Communications to the Editor, Jun. 5, 1957, pp. 2975-2976, vol. 79.

Filing receipt and specification for patent application entitled "Novel Polymer Compositions and Methods of Making and Using Same," by Mark L. Hlavinka, et al., filed Feb. 23, 2016 as U.S. Appl. No. 15/051,173.

Foreign communication from a related counterpart application—International Search Report and Written Opinion, PCT/US2013/066550, Jan. 22, 2014, 9 pages.

Foreign communication from a related counterpart application—International Preliminary Report on Patentability, PCT/US2013/066550, Apr. 28, 2015, 6 pages.

Foreign communication from a related counterpart application—International Search Report and Written Opinion, PCT/US2013/066583, Jan. 22, 2014, 8 pages.

Foreign communication from a related counterpart application—International Preliminary Report on Patentability, PCT/US2013/066583, Apr. 28, 2015, 6 pages.

Foreign communication from a related counterpart application—International Search Report and Written Opinion, PCT/US2014/012689, Jul. 22, 2014, 12 pages.

Foreign communication from a related counterpart application—International Preliminary Report on Patentability, PCT/US2014/012689, Aug. 4, 2015, 8 pages.

Foreign communication from a related counterpart application—International Search Report and Written Opinion, PCT/US2014/012723, Apr. 14, 2014, 7 pages.

Foreign communication from a related counterpart application—International Preliminary Report on Patentability, PCT/US2014/012723, Aug. 4, 2015, 5 pages.

Office Action dated Oct. 7, 2010 (10 pages), U.S. Appl. No. 12/814,589, filed Jun. 14, 2010.

Office Action dated Apr. 4, 2011 (10 pages), U.S. Appl. No. 12/814,589, filed Jun. 14, 2010.

* cited by examiner

POLYMER COMPOSITIONS AND METHODS OF MAKING AND USING SAME

CROSS REFERENCE TO RELATED APPLICATIONS

This application is a divisional of and claims priority to U.S. patent application Ser. No. 13/753,289 filed on Jan. 29, 2013, now U.S. Pat. No. 9,034,991 B2 and entitled "Polymer Compositions and Methods of Making and Using Same," which is incorporated by reference herein in its entirety. The subject matter of the present application is related to U.S. patent application Ser. No. 13/753,294 filed Jan. 29, 2013, now U.S. Pat. No. 8,877,672 B2, and entitled "Catalyst Compositions and Methods of Making and Using Same," which is hereby incorporated herein by reference in its entirety for all purposes.

STATEMENT REGARDING FEDERALLY SPONSORED RESEARCH OR DEVELOPMENT

Not applicable.

BACKGROUND

The present disclosure generally relates to catalyst systems and polymer compositions. Particularly, the present disclosure relates to novel catalyst compositions for the production of multimodal polymer resins.

FIELD

Polyolefins are plastic materials useful for making a wide variety of valued products due to their combination of features such as stiffness, ductility, barrier properties, temperature resistance, optical properties, availability, and low cost. In particular, polyethylene (PE) is one of the largest volume polymers consumed in the world. It is a versatile polymer that offers high performance relative to other polymers and alternative materials such as glass or metal.

Multimodal PE resins offer the potential for broad applicability as these resins can couple desirable physical properties and processing characteristics. There exists an ongoing need for improved catalyst systems for the production of polymeric compositions.

BRIEF SUMMARY

Disclosed herein is a polymer reactor-blend comprising at least a first component having a polydispersity index of greater than about 20 and present in an amount of from about 1 wt. % to about 99 wt. % based on the total weight of the polymer and a second component having a polydispersity index of less than about 20 and present in an amount of from about 1 wt. % to about 99 wt. % based on the total weight of the polymer wherein a molecular weight distribution of the second component lies within a molecular weight distribution of the first component.

Also disclosed herein is a method of preparing a pipe comprising contacting ethylene monomer and 1-hexene with a catalyst composition comprising (i) an imine (bis) phenolate compound having Structure XIV

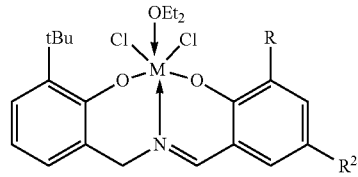

Structure XIV where M is a Group 3 to Group 12 transition metal or lanthanide; $R^2$ and $R^3$ can each independently be hydrogen, a halogen, a hydrocarbyl group, or a substituted hydrocarbyl group and (ii) a metallocene complex under conditions suitable for the formation of a polymer and $Et_2O$ is optional; recovering the polymer; and fabricating the polymer into a pipe wherein the polymer has zero shear viscosity of from about 1E+05 Pa-s to about 1E+10 Pa-s and a tensile natural draw ratio of less than about 600% and wherein the pipe has a PENT value of greater than about 800 hours as determined in accordance with ASTM F1473 using a 3.8 MPa stress.

Also disclosed herein is a polymer reactor blend having a polydispersity index of greater than about 15 and a short-chain branching distribution maximum that occurs between a weight average molecular weight of about 30 kDa and 1000 kDa.

DETAILED DESCRIPTION

Figure 1:
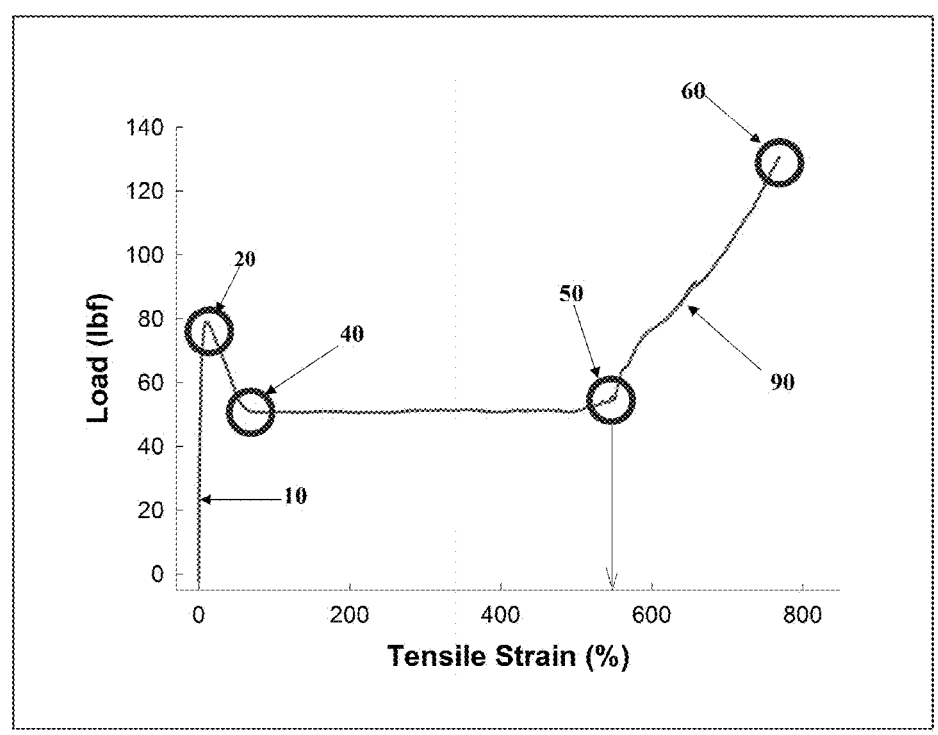
FIG. 1 is a representative tensile stress-strain curve.

Disclosed herein are novel catalyst and polymer compositions and methods of making and using same. In an embodiment, the catalyst composition comprises a mixture of a metal-salt complex of an imine phenol compound and at least one metallocene-containing compound and is designated herein as CATCOMP. CATCOMPs may be utilized in the production of multimodal polymer compositions displaying both desirable performance and processing properties. These aspects of this disclosure are further described herein.

To define more clearly the terms used herein, the following definitions are provided. Unless otherwise indicated, the following definitions are applicable to this disclosure. If a term is used in this disclosure but is not specifically defined herein, the definition from the IUPAC Compendium of Chemical Terminology, $2^{nd}$ Ed (1997) can be applied, as long as that definition does not conflict with any other disclosure or definition applied herein, or render indefinite or non-enabled any claim to which that definition is applied. To the extent that any definition or usage provided by any document incorporated herein by reference conflicts with the definition or usage provided herein, the definition or usage provided herein controls.

Groups of elements of the table are indicated using the numbering scheme indicated in the version of the periodic table of elements published in *Chemical and Engineering News*, 63(5), 27, 1985. In some instances a group of elements may be indicated using a common name assigned to the group; for example alkali earth metals (or alkali metals) for Group 1 elements, alkaline earth metals (or alkaline metals) for Group 2 elements, transition metals for Group 3-12 elements, and halogens for Group 17 elements.

A chemical "group" is described according to how that group is formally derived from a reference or "parent" compound, for example, by the number of hydrogen atoms formally removed from the parent compound to generate the group, even if that group is not literally synthesized in this manner. These groups can be utilized as substituents or coordinated or bonded to metal atoms. By way of example, an "alkyl group" formally can be derived by removing one hydrogen atom from an alkane, while an "alkylene group" formally can be derived by removing two hydrogen atoms from an alkane. Moreover, a more general term can be used to encompass a variety of groups that formally are derived by removing any number ("one or more") hydrogen atoms from a parent compound, which in this example can be described as an "alkane group," and which encompasses an "alkyl group," an "alkylene group," and materials have three or more hydrogens atoms, as necessary for the situation, removed from the alkane. Throughout, the disclosure that a substituent, ligand, or other chemical moiety may constitute a particular "group" implies that the well-known rules of chemical structure and bonding are followed when that group is employed as described. When describing a group as being "derived by," "derived from," "formed by," or "formed from," such terms are used in a formal sense and are not intended to reflect any specific synthetic methods or procedure, unless specified otherwise or the context requires otherwise.

The term "substituted" when used to describe a group, for example, when referring to a substituted analog of a particular group, is intended to describe any non-hydrogen moiety that formally replaces a hydrogen in that group, and is intended to be non-limiting. A group or groups may also be referred to herein as "unsubstituted" or by equivalent terms such as "non-substituted," which refers to the original group in which a non-hydrogen moiety does not replace a hydrogen within that group. "Substituted" is intended to be non-limiting and include inorganic substituents or organic substituents.

Unless otherwise specified, any carbon-containing group for which the number of carbon atoms is not specified can have, according to proper chemical practice, 1, 2, 3, 4, 5, 6, 7, 8, 9, 10, 11, 12, 13, 14, 15, 16, 17, 18, 19, 20, 21, 22, 23, 24, 25, 26, 27, 28, 29, or 30 carbon atoms, or any range or combination of ranges between these values. For example, unless otherwise specified, any carbon-containing group can have from 1 to 30 carbon atoms, from 1 to 25 carbon atoms, from 1 to 20 carbon atoms, from 1 to 15 carbon atoms, from 1 to 10 carbon atoms, or from 1 to 5 carbon atoms, and the like. Moreover, other identifiers or qualifying terms may be utilized to indicate the presence or absence of a particular substituent, a particular regiochemistry and/or stereochemistry, or the presence or absence of a branched underlying structure or backbone.

The term "organyl group" is used herein in accordance with the definition specified by IUPAC: an organic substituent group, regardless of functional type, having one free valence at a carbon atom. Similarly, an "organylene group" refers to an organic group, regardless of functional type, derived by removing two hydrogen atoms from an organic compound, either two hydrogen atoms from one carbon atom or one hydrogen atom from each of two different carbon atoms. An "organic group" refers to a generalized group formed by removing one or more hydrogen atoms from carbon atoms of an organic compound. Thus, an "organyl group," an "organylene group," and an "organic group" can contain organic functional group(s) and/or atom(s) other than carbon and hydrogen, that is, an organic group can comprise functional groups and/or atoms in addition to carbon and hydrogen. For instance, non-limiting examples of atoms other than carbon and hydrogen include halogens, oxygen, nitrogen, phosphorus, and the like. Non-limiting examples of functional groups include ethers, aldehydes, ketones, esters, sulfides, amines, phosphines, and so forth. In one aspect, the hydrogen atom(s) removed to form the "organyl group," "organylene group," or "organic group" may be attached to a carbon atom belonging to a functional group, for example, an acyl group (—C(O)R), a formyl group (—C(O)H), a carboxy group (—C(O)OH), a hydrocarboxycarbonyl group (—C(O)OR), a cyano group (—C≡N), a carbamoyl group (—C(O)NH$_2$), an N-hydrocarbylcarbamoyl group (—C(O)NHR), or N,N'-dihydrocarbylcarbamoyl group (—C(O)NR$_2$), among other possibilities. In another aspect, the hydrogen atom(s) removed to form the "organyl group," "organylene group," or "organic group" may be attached to a carbon atom not belonging to, and remote from, a functional group, for example, —CH$_2$C(O)CH$_3$, —CH$_2$NR$_2$, and the like. An "organyl group," "organylene group," or "organic group" may be aliphatic, inclusive of being cyclic or acyclic, or may be aromatic. "Organyl groups," "organylene groups," and "organic groups" also encompass heteroatom-containing rings, heteroatom-containing ring systems, heteroaromatic rings, and heteroaromatic ring systems. "Organyl groups," "organylene groups," and "organic groups" may be linear or branched unless otherwise specified. Finally, it is noted that the "organyl group," "organylene group," or "organic group" definitions include "hydrocarbyl group," "hydrocarbylene group," "hydrocarbon group," respectively, and "alkyl group," "alkylene group," and "alkane group," respectively, as members.

The term "alkane" whenever used in this specification and claims refers to a saturated hydrocarbon compound. Other identifiers can be utilized to indicate the presence of particular groups in the alkane (e.g. halogenated alkane indicates that the presence of one or more halogen atoms replacing an equivalent number of hydrogen atoms in the alkane). The term "alkyl group" is used herein in accordance with the definition specified by IUPAC: a univalent group formed by removing a hydrogen atom from an alkane. Similarly, an "alkylene group" refers to a group formed by removing two hydrogen atoms from an alkane (either two hydrogen atoms from one carbon atom or one hydrogen atom from two different carbon atoms). An "alkane group" is a general term that refers to a group formed by removing one or more hydrogen atoms (as necessary for the particular group) from an alkane. An "alkyl group," "alkylene group," and "alkane group" can be acyclic or cyclic groups, and/or may be linear or branched unless otherwise specified. Primary, secondary, and tertiary alkyl group are derived by removal of a hydrogen atom from a primary, secondary, tertiary carbon atom, respectively, of an alkane. The n-alkyl group may be derived by removal of a hydrogen atom from a terminal carbon atom of a linear alkane. The groups RCH$_2$ (R≠H), R$_2$CH (R≠H), and R$_3$C (R≠H) are primary, secondary, and tertiary alkyl groups, respectively.

A "halide" has its usual meaning; therefore, examples of halides include fluoride, chloride, bromide, and iodide.

Within this disclosure the normal rules of organic nomenclature will prevail. For instance, when referencing substituted compounds or groups, references to substitution patterns are taken to indicate that the indicated group(s) is (are) located at the indicated position and that all other non-indicated positions are hydrogen. For example, reference to a 4-substituted phenyl group indicates that there is a non-hydrogen substituent located at the 4 position and hydrogens located at the 2, 3, 5, and 6 positions. By way of another example, reference to a 3-substituted naphth-2-yl indicates that there is a non-hydrogen substituent located at the 3 position and hydrogens located at the 1, 4, 5, 6, 7, and 8 positions. References to compounds or groups having substitutions at positions in addition to the indicated position will be reference using comprising or some other alternative language. For example, a reference to a phenyl group comprising a substituent at the 4 position refers to a group having a non-hydrogen atom at the 4 position and hydrogen or any non-hydrogen group at the 2, 3, 5, and 6 positions.

Embodiments disclosed herein the may provide the materials listed as suitable for satisfying a particular feature of the embodiment delimited by the term "or." For example, a particular feature of the subject matter may be disclosed as follows: Feature X can be A, B, or C. It is also contemplated that for each feature the statement can also be phrased as a listing of alternatives such that the statement "Feature X is A, alternatively B, or alternatively C" is also an embodiment of the present disclosure whether or not the statement is explicitly recited.

In an embodiment, the CATCOMP comprises an imine phenol compound characterized by Structure I:

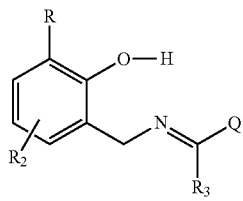

Structure I where O and N represent oxygen and nitrogen respectively and Q represents a donor group. One or more of R, $R^2$, and $R^3$, may each be the same or different and may be selected from the embodiments described herein. R can be a halogen, a hydrocarbyl group, or a substituted hydrocarbyl group. In an embodiment, R is not hydrogen. $R^2$ and $R^3$ can each independently be hydrogen, a halogen, a hydrocarbyl group, or a substituted hydrocarbyl group. These substituents are described in more detail herein.

Referring to Structure I, generally, R, $R^2$ and $R^3$ can each independently be a hydrocarbyl group. In an embodiment, R, $R^2$ and $R^3$ can each independently be a $C_1$ to $C_{30}$ hydrocarbyl group; a $C_1$ to $C_{20}$ hydrocarbyl group; a $C_1$ to $C_{15}$ hydrocarbyl group; a $C_1$ to $C_{10}$ hydrocarbyl group; or a $C_1$ to $C_5$ hydrocarbyl group. In yet other embodiments, R, $R^2$ and $R^3$ can each independently be a $C_3$ to $C_{30}$ aromatic group; a $C_3$ to $C_{20}$ aromatic group; a $C_3$ to $C_{15}$ aromatic group; or a $C_3$ to $C_{10}$ aromatic group.

In an aspect, R, $R^2$ and $R^3$ can each independently be a $C_1$ to $C_{30}$ alkyl group, a $C_4$ to $C_{30}$ cycloalkyl group, a $C_4$ to $C_{30}$ substituted cycloalkyl group, a $C_3$ to $C_{30}$ aliphatic heterocyclic group, a $C_3$ to $C_{30}$ substituted aliphatic heterocyclic group, a $C_6$ to $C_{30}$ aryl group, a $C_6$ to $C_{30}$ substituted aryl group, a $C_7$ to $C_{30}$ aralkyl group, a $C_7$ to $C_{30}$ substituted aralkyl group, a $C_3$ to $C_{30}$ heteroaryl group, or a $C_3$ to $C_{30}$ substituted heteroaryl group. In an embodiment, R, $R^2$ and $R^3$ can each independently be a $C_1$ to $C_{15}$ alkyl group, a $C_4$ to $C_{20}$ cycloalkyl group, a $C_4$ to $C_{20}$ substituted cycloalkyl group, a $C_3$ to $C_{20}$ aliphatic heterocyclic group, a $C_3$ to $C_{20}$ substituted aliphatic heterocyclic group, a $C_6$ to $C_{20}$ aryl group, a $C_6$ to $C_{20}$ substituted aryl group, a $C_7$ to $C_{20}$ aralkyl group, a $C_7$ to $C_{20}$ substituted aralkyl group, a $C_3$ to $C_{20}$ heteroaryl group, or a $C_3$ to $C_{20}$ substituted heteroaryl group. In other embodiments, R, $R^2$ and $R^3$ can each independently be a $C_1$ to $C_{10}$ alkyl group, a $C_4$ to $C_{15}$ cycloalkyl group, a $C_4$ to $C_{15}$ substituted cycloalkyl group, a $C_3$ to $C_{15}$ aliphatic heterocyclic group, a $C_3$ to $C_{15}$ substituted aliphatic heterocyclic group, a $C_6$ to $C_{15}$ aryl group, a $C_6$ to $C_{15}$ substituted aryl group, a $C_7$ to $C_{15}$ aralkyl group, a $C_7$ to $C_{15}$ substituted aralkyl group, a $C_3$ to $C_{15}$ heteroaryl group, or a $C_3$ to $C_{15}$ substituted heteroaryl group. In further embodiments, R, $R^2$ and $R^3$ can each independently be $C_1$ to $C_5$ alkyl group.

In an embodiment, R, $R^2$ and $R^3$ can each independently be a methyl group, an ethyl group, a propyl group, a butyl group, a pentyl group, a hexyl group, a heptyl group, an octyl group, a nonyl group, a decyl group, an undecyl group, a dodecyl group, a tridecyl group, a tetradecyl group, a pentadecyl group, a hexadecyl group, a heptadecyl group, an octadecyl group, or a nonadecyl group. In some embodiments, the alkyl groups which can be utilized as R, $R^2$ and $R^3$ can each independently be substituted. Each substituent of a substituted alkyl group independently can be a halogen or a hydrocarboxy group; alternatively, a halogen; or alternatively, a hydrocarboxy group. Halogens and hydrocarboxy groups that can be utilized as substituents are independently disclosed herein and can be utilized without limitation to further describe the substituted alkyl group which can be utilized as R, $R^2$ and/or $R^3$.

In an embodiment, R, $R^2$ and $R^3$ can each independently be a cyclobutyl group, a substituted cyclobutyl group, a cyclopentyl group, a substituted cyclopentyl group, a cyclohexyl group, a substituted cyclohexyl group, a cycloheptyl group, a substituted cycloheptyl group, a cyclooctyl group, or a substituted cyclooctyl group. In some embodiments, R, $R^2$ and $R^3$ can each independently be a cyclopentyl group, a substituted cyclopentyl group, a cyclohexyl group, or a substituted cyclohexyl group.

In an embodiment, each substituent for a substituted cycloalkyl group (general or specific) that can be utilized as R, $R^2$ and $R^3$ can each independently be a halogen, a hydrocarbyl group, or a hydrocarboxy group. In some embodiments, each substituent for a substituted cycloalkyl group (general or specific) that can be utilized as R, $R^2$ and $R^3$ can each independently be a halogen, an alkyl group, or an alkoxy group. Halogens, hydrocarbyl groups, hydrocarboxy groups, alkyl group, and alkoxy groups that can be utilized as substituents are independently disclosed herein and can be utilized without limitation to further describe the substituents for a substituted cycloalkyl group (general or specific) that can be utilized as R, $R^2$ and/or $R^3$.

In an aspect, R, $R^2$ and $R^3$ can each independently have Structure II:

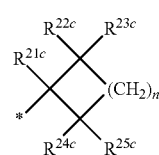

Structure II wherein the undesignated valency (*) represents the point at which the substituent (i.e., R, $R^2$ or $R^3$) attaches to the transition-metal salt complex of Structure I. Generally, $R^{21c}$, $R^{23c}$, $R^{24c}$, and $R^{25c}$ independently can be hydrogen or a non-hydrogen substituent, and n can be an integer from 1 to 5.

In an embodiment wherein R, $R^2$ and $R^3$ has Structure II, $R^{21c}$, $R^{23c}$, $R^{24c}$, and $R^{25c}$ can be hydrogen and $R^{22c}$ can be any non-hydrogen substituent disclosed herein; or alternatively, $R^{21c}$, $R^{23c}$, and $R^{25c}$ can be hydrogen and $R^{22c}$ and $R^{24c}$ independently can be any non-hydrogen substituent disclosed herein. In an embodiment, n can be an integer from 1 to 4; or alternatively, from 2 to 4. In other embodiments, n can be 2 or 3; alternatively, 2; or alternatively, 3.

In an embodiment, $R^{21c}$, $R^{22c}$, $R^{23c}$, $R^{24c}$, and $R^{25c}$ independently can be hydrogen, a halogen, a hydrocarbyl group, or a hydrocarboxy group; alternatively, hydrogen, a halogen, or a hydrocarbyl group. In some embodiments, $R^{21c}$, $R^{22c}$, $R^{23c}$, $R^{24c}$, and $R^{25c}$ independently can be hydrogen, a halogen, an alkyl group, or an alkoxy group. Halogens, hydrocarbyl groups, hydrocarboxy groups, alkyl group, and alkoxy groups that can be utilized as substituents are independently disclosed herein and can be utilized without limitation to further describe the R, $R^2$ or $R^3$ group having Structure II.

In an embodiment, R, $R^2$ and $R^3$ can each independently be a phenyl group or a substituted phenyl group. In an embodiment, the substituted phenyl group can be a 2-substituted phenyl group, a 3-substituted phenyl group, a 4-substituted phenyl group, a 2,4-disubstituted phenyl group, a 2,6-disubstituted phenyl group, a 3,5-disubstituted phenyl group, or a 2,4,6-trisubstituted phenyl group.

In an embodiment, each substituent for a substituted phenyl group independently can be a halogen, a hydrocarbyl group, or a hydrocarboxy group. In some embodiments, each substituent for a substituted phenyl group independently can be a halogen, an alkyl group, or an alkoxy group. Halogens, hydrocarbyl groups, hydrocarboxy groups, alkyl groups, and alkoxy groups that can be utilized as substituents are independently disclosed herein and can be utilized without limitation to further describe the substituents for the substituted phenyl group.

In an aspect, R, $R^2$ and $R^3$ can each independently have Structure III:

Structure III wherein the undesignated valency (*) represents the point at which the substituent (i.e., R, $R^2$ or $R^3$) attaches to the transition-metal salt complex of Structure I. Generally, $R^{22}$, $R^{23}$, $R^{24}$, $R^{25}$, and $R^{26}$ independently can be hydrogen or a non-hydrogen substituent. In an embodiment wherein R, $R^2$ or $R^3$ has Structure III, $R^{22}$, $R^{23}$, $R^{24}$, $R^{25}$, and $R^{26}$ can be hydrogen, $R^{23}$, $R^{24}$, $R^{25}$, and $R^{26}$ can be hydrogen and $R^{22}$ can be a non-hydrogen substituent, $R^{22}$, $R^{24}$, $R^{25}$, and $R^{26}$ can be hydrogen and $R^{23}$ can be a non-hydrogen substituent, $R^{22}$, $R^{23}$, $R^{25}$, and $R^{26}$ can be hydrogen and $R^{24}$ can be a non-hydrogen substituent, $R^{23}$, $R^{25}$, and $R^{26}$ can be hydrogen and $R^{22}$ and $R^{24}$ can be non-hydrogen substituents, $R^{23}$, $R^{24}$, and $R^{25}$ can be hydrogen and $R^{22}$ and $R^{26}$ can be non-hydrogen substituents, $R^{22}$, $R^{24}$, and $R^{26}$ can be hydrogen and $R^{23}$ and $R^{25}$ can be non-hydrogen substituents, or $R^{23}$ and $R^{25}$ can be hydrogen and $R^{22}$, $R^{24}$ and $R^{26}$ can be non-hydrogen substituents. In some embodiments wherein R, $R^2$ or $R^3$ has Structure III, $R^{23}$, $R^{24}$, $R^{25}$, and $R^{26}$ can be hydrogen and $R^{22}$ can be a non-hydrogen substituent, $R^{22}$, $R^{23}$, $R^{25}$, and $R^{26}$ can be hydrogen and $R^{24}$ can be a non-hydrogen substituent, $R^{23}$, $R^{25}$, and $R^{26}$ can be hydrogen and $R^{22}$ and $R^{24}$ can be non-hydrogen substituents, $R^{23}$, $R^{24}$, and $R^{25}$ can be hydrogen and $R^{22}$ and $R^{26}$ can be non-hydrogen substituents, or $R^{23}$ and $R^{25}$ can be hydrogen and $R^{22}$, $R^{24}$, and $R^{26}$ can be non-hydrogen substituents; alternatively, $R^{23}$, $R^{24}$, $R^{25}$, and $R^{26}$ can be hydrogen and $R^{22}$ can be a non-hydrogen substituent, $R^{22}$, $R^{23}$, $R^{25}$, and $R^{26}$ can be hydrogen and $R^{24}$ can be a non-hydrogen substituent, $R^{23}$, $R^{25}$, and $R^{26}$ can be hydrogen and $R^{22}$ and $R^{24}$ can be non-hydrogen substituents, or $R^{23}$, $R^{24}$, and $R^{25}$ can be hydrogen and $R^{22}$ and $R^{26}$ can be non-hydrogen substituents; alternatively, $R^{22}$, $R^{24}$, $R^{25}$, and $R^{26}$ can be hydrogen and $R^{23}$ can be a non-hydrogen substituent, or $R^{22}$, $R^{24}$, and $R^{26}$ can be hydrogen and $R^{23}$ and $R^{25}$ can be non-hydrogen substituents; alternatively, $R^{23}$, $R^{24}$, $R^{25}$, and $R^{26}$ can be hydrogen and $R^{22}$ can be a non-hydrogen substituent, or $R^{22}$, $R^{23}$, $R^{25}$, and $R^{26}$ can be hydrogen and $R^{24}$ can be a non-hydrogen substituent; alternatively, $R^{23}$, $R^{25}$, and $R^{26}$ can be hydrogen and $R^{22}$ and $R^{24}$ can be non-hydrogen substituents, $R^{23}$, $R^{24}$, and $R^{25}$ can be hydrogen and $R^{22}$ and $R^{26}$ can be non-hydrogen substituents, or $R^{23}$ and $R^{25}$ can be hydrogen and $R^{22}$, $R^{24}$, and $R^{26}$ can be non-hydrogen substituents; or alternatively, $R^{23}$, $R^{25}$, and $R^{26}$ can be hydrogen and $R^{22}$ and $R^{24}$ can be non-hydrogen substituents, or $R^{23}$, $R^{24}$, and $R^{25}$ can be hydrogen and $R^{22}$ and $R^{26}$ can be non-hydrogen substituents. In other embodiments wherein R, $R^2$ or $R^3$ has Structure III, $R^{22}$, $R^{23}$, $R^{24}$, $R^{25}$, and $R^{26}$ can be hydrogen; alternatively, $R^{23}$, $R^{24}$, $R^{25}$, and $R^{26}$ can be hydrogen and $R^{22}$ can be a non-hydrogen substituent; alternatively, $R^{22}$, $R^{24}$, $R^{25}$, and $R^{26}$ can be hydrogen and $R^{23}$ can be a non-hydrogen substituent; alternatively, $R^{22}$, $R^{23}$, $R^{25}$, and $R^{26}$ can be hydrogen and $R^{24}$ can be a non-hydrogen substituent; alternatively, $R^{23}$, $R^{25}$, and $R^{26}$ can be hydrogen and $R^{22}$ and $R^{24}$ can be non-hydrogen substituents; alternatively, $R^{23}$, $R^{24}$, and $R^{25}$ can be hydrogen and $R^{22}$ and $R^{26}$ can be non-hydrogen substituents; alternatively, $R^{22}$, $R^{24}$, and $R^{26}$ can be hydrogen and $R^{23}$ and $R^{25}$ and can be non-hydrogen substituents; or alternatively, $R^{23}$ and $R^{25}$ can be hydrogen and $R^{22}$, $R^{24}$, and $R^{26}$ can be non-hydrogen substituents.

In an embodiment, the non-hydrogen substituents that can be utilized as $R^{22}$, $R^{23}$, $R^{24}$, $R^{25}$, and $R^{26}$ in the R, $R^2$ or $R^3$ group having Structure III independently can be a halogen, a hydrocarbyl group, or a hydrocarboxy group; alternatively, a halogen or a hydrocarbyl group. In some embodiments, the non-hydrogen substituents that can be utilized as $R^{22}$, $R^{23}$, $R^{24}$, $R^{25}$, and $R^{26}$ in the R, $R^2$ or $R^3$ group having Structure III independently can be a halogen, an alkyl group, or an alkoxy group. Halogens, hydrocarbyl groups, hydrocarboxy groups, alkyl groups, and alkoxy groups that can be utilized as substituents are independently disclosed herein and can be utilized without limitation to further describe the R, $R^2$ and/or $R^3$ group having Structure III.

In an aspect, R, $R^2$ and $R^3$ can each independently be a benzyl group, a substituted benzyl group, a 1-phenyleth-1-yl group, a substituted 1-phenyleth-1-yl, a 2-phenyleth-1-yl group, or a substituted 2-phenyleth-1-yl group. In an embodiment, R, $R^2$ and $R^3$ can each independently be a benzyl group, or a substituted benzyl group; alternatively, a 1-phenyleth-1-yl group or a substituted 1-phenyleth-1-yl; alternatively, a 2-phenyleth-1-yl group or a substituted 2-phenyleth-1-yl group; or alternatively, a benzyl group, a 1-phenyleth-1-yl group, or a 2-phenyleth-1-yl group. In some embodiments, R, $R^2$ and $R^3$ can each independently be a benzyl group; alternatively, a substituted benzyl group; alternatively, a 1-phenyleth-1-yl group; alternatively, a substituted 1-phenyleth-1-yl; alternatively, a 2-phenyleth-1-yl group; or alternatively, a substituted 2-phenyleth-1-yl group.

In an embodiment, each substituent for a substituted benzyl group, a 1-phenyleth-1-yl group, or a 2-phenyleth-1-yl group (general or specific) that can be utilized as R, $R^2$ and/or $R^3$ can be a halogen, a hydrocarbyl group, or a hydrocarboxy group. In some embodiments, each substituent for a substituted benzyl group, 1-phenyleth-1-yl group, or a 2-phenyleth-1-yl group (general or specific) that can be utilized as R, $R^2$ and/or $R^3$ independently can be halogen, an alkyl group, or an alkoxy group. Halogens, hydrocarbyl groups, hydrocarboxy groups, alkyl groups, and alkoxy groups that can be utilized as substituents are independently disclosed herein and can be utilized without limitation to further describe the substituents for the substituted benzyl group, 1-phenyleth-1-yl group, or a 2-phenyleth-1-yl group (general or specific) that can be utilized as R, $R^2$ and/or $R^3$.

In an aspect, R, $R^2$ and $R^3$ can each independently be a pyridinyl group, a substituted pyridinyl group, a furyl group, a substituted furyl group, a thienyl group, or a substituted thienyl group.

In an embodiment, the pyridinyl (or substituted pyridinyl) R, $R^2$ and/or $R^3$ can be a pyridin-2-yl group, a substituted pyridin-2-yl group, a pyridin-3-yl group, a substituted pyridin-3-yl group, a pyridin-4-yl group, or a substituted pyridin-4-yl group; alternatively, a pyridin-2-yl group, a pyridin-3-yl group, or a pyridin-4-yl group. In some embodiments, the pyridinyl (or substituted pyridinyl) R, $R^2$ and/or $R^3$ group can be a pyridin-2-yl group or a substituted pyridin-2-yl group; alternatively, a pyridin-3-yl group or a substituted pyridin-3-yl group; alternatively, a pyridin-4-yl group or a substituted pyridin-4-yl group; alternatively, a pyridin-2-yl group; alternatively, a substituted pyridin-2-yl group; alternatively, a pyridin-3-yl group; alternatively, a substituted pyridin-3-yl group; alternatively, a pyridin-4-yl group; or alternatively, a substituted pyridin-4-yl group. In an embodiment, the substituted pyridinyl R, $R^2$ and/or $R^3$ group can be a 2-substituted pyridin-3-yl group, a 4-substituted pyridin-3-yl group, a 5-substituted pyridin-3-yl group, a 6-substituted pyridin-3-yl group, a 2,4-disubstituted pyridin-3-yl group, a 2,6-disubstituted pyridin-3-yl group, or a 2,4,6-trisubstituted pyridin-3-yl group; alternatively, a 2-substituted pyridin-3-yl group, a 4-substituted pyridin-3-yl group, or a 6-substituted pyridin-3-yl group; alternatively, a 2,4-disubstituted pyridin-3-yl group or a 2,6-disubstituted pyridin-3-yl group; alternatively, a 2-substituted pyridin-3-yl group; alternatively, a 4-substituted pyridin-3-yl group; alternatively, a 5-substituted pyridin-3-yl group; alternatively, a 6-substituted pyridin-3-yl group; alternatively, a 2,4-disubstituted pyridin-3-yl group; alternatively, a 2,6-disubstituted pyridin-3-yl group; or alternatively, a 2,4,6-trisubstituted pyridin-3-yl group.

In an embodiment, the furyl (or substituted furyl) R, $R^2$ and/or $R^3$ group can be a fur-2-yl group, a substituted fur-2-yl group, a fur-3-yl group, or a substituted fur-3-yl group. In an embodiment, the substituted furyl R, $R^2$ and/or $R^3$ group can be a 2-substituted fur-3-yl group, a 4-substituted fur-3-yl group, or a 2,4-disubstituted fur-3-yl group.

In an embodiment, the thienyl (or substituted thienyl) R, $R^2$ and/or $R^3$ group can be a thien-2-yl group, a substituted thien-2-yl group, a thien-3-yl group, or a substituted thien-3-yl group. In some embodiments, the thienyl (or substituted thienyl) R, $R^2$ and/or $R^3$ group can be a thien-2-yl group or a substituted thien-2-yl group. In an embodiment, the substituted thienyl R, $R^2$ and/or $R^3$ group can be a 2-substituted thien-3-yl group, a 4-substituted thien-3-yl group, or a 2,4-disubstituted thien-3-yl group.

In an embodiment, each substituent for a substituted pyridinyl, furyl, or thienyl groups (general or specific) that can be utilized as R, $R^2$ and/or $R^3$ can each independently be a halogen, a hydrocarbyl group, or a hydrocarboxy group. In some embodiments, each substituent for a substituted pyridinyl, furyl, and/or or thienyl group (general or specific) that can be utilized as R, $R^2$ and $R^3$ each independently can be a halogen, an alkyl group, or an alkoxy group; alternatively, a halogen or an alkyl group; alternatively, a halogen or an alkoxy group; alternatively, an alkyl group or an alkoxy group; alternatively, a halogen; alternatively, an alkyl group; or alternatively, an alkoxy group. Halogens, hydrocarbyl groups, hydrocarboxy groups, alkyl groups, and alkoxy groups that can be utilized as substituents are independently disclosed herein and can be utilized without limitation to further describe the substituents for the substituted pyridinyl, furyl, and/or thienyl groups (general or specific) that can be utilized as R, $R^2$ and/or $R^3$.

In a non-limiting embodiment, R, $R^2$ and/or $R^3$ can each independently be a phenyl group, a 2-alkylphenyl group, a 3-alkylphenyl group, a 4-alkylphenyl group, a 2,4-dialkylphenyl group, a 2,6-dialkylphenyl group, a 3,5-dialkylphenyl group, or a 2,4,6-trialkylphenyl group; alternatively, a 2-alkylphenyl group, a 4-alkylphenyl group, a 2,4-dialkylphenyl group, a 2,6-dialkylphenyl group, or a 2,4,6-trialkylphenyl group. In another non-limiting embodiment, R, $R^2$ and $R^3$ can each independently be a phenyl group, a 2-alkoxyphenyl group, a 3-alkoxyphenyl group, a 4-alkoxyphenyl group, or 3,5-dialkoxyphenyl group. In other non-limiting embodiments, R, $R^2$ and $R^3$ can each independently be a phenyl group, a 2-halophenyl group, a 3-halophenyl group, a 4-halophenyl group, a 2,6-dihalophenyl group, or a 3,5-dialkylphenyl group; alternatively, a 2-halophenyl group, a 4-halophenyl group, or a 2,6-dihalophenyl group; alternatively, a 2-halophenyl group or a 4-halophenyl group; alternatively, a 3-halophenyl group or a 3,5-dihalophenyl group; alternatively, a 2-halophenyl group; alternatively, a 3-halophenyl group; alternatively, a 4-halophenyl group; alternatively, a 2,6-dihalophenyl group; or alternatively, a 3,5-dihalophenyl group. Halides, alkyl group substituents, and alkoxy group substituents are independently described herein and can be utilized, without limitation, to further describe the alkylphenyl, dialkylphenyl, trialkylphenyl, alkoxyphenyl, dialkoxyphenyl, halophenyl, or dihalophenyl groups that can be utilized for R, $R^2$ and/or $R^3$. Generally, the halides, alkyl substituents, or alkoxy substituents of a dialkyl, trialkyl phenyl, dialkoxyphenyl, or dihalophenyl groups can be the same; or alternatively, the halo, alkyl substituents, or alkoxy substituents of alkylphenyl, dialkylphenyl, trialkylphenyl, dialkoxyphenyl, or dihalophenyl groups can be different.

In a non-limiting embodiment, R, $R^2$ and $R^3$ can each independently be a 2-methylphenyl group, a 2-ethylphenyl group, a 2-isopropylphenyl group, a 2-tert-butylphenyl group, a 4-methylphenyl group, a 4-ethylphenyl group, a 4-isopropylphenyl group, or a 4-tert-butylphenyl group; alternatively, a 2-methylphenyl group, a 2-ethylphenyl group, a 2-isopropylphenyl group, or a 2-tert-butylphenyl group; alternatively, a 4-methylphenyl group, a 4-ethylphenyl group, a 4-isopropylphenyl group, or a 4-tert-butylphenyl group; alternatively, a 2-methylphenyl group; alternatively, a 2-ethylphenyl group; alternatively, a 2-isopropylphenyl group; alternatively, a 2-tert-butylphenyl group; alternatively, a 4-methylphenyl group; alternatively, a 4-ethylphenyl group; alternatively, a 4-isopropylphenyl group; or alternatively, a 4-tert-butylphenyl group. In another non-limiting embodiment, R, $R^2$ and $R^3$ can each independently be a 2-methoxyphenyl group, a 2-ethoxyphenyl group, a 2-isopropoxyphenyl group, a 2-tert-butoxyphenyl group, a 4-methoxyphenyl group, a 4-ethoxyphenyl group, a 4-isopropoxyphenyl group, or a 4-tert-butoxyphenyl group; alternatively, a 2-methoxyphenyl group, a 2-ethoxyphenyl group, a 2-isopropoxyphenyl group, or a 2-tert-butoxyphenyl group; alternatively, a 4-methoxyphenyl group, a 4-ethoxyphenyl group, a 4-isopropoxyphenyl group, or a 4-tert-butoxyphenyl group; alternatively, a 2-methoxyphenyl group; alternatively, a 2-ethoxyphenyl group; alternatively, a 2-isopropoxyphenyl group; alternatively, a 2-tert-butoxyphenyl group; alternatively, a 4-methoxyphenyl group; alternatively, a 4-ethoxyphenyl group; alternatively, a 4-isopropoxyphenyl group; or alternatively, a 4-tert-butoxyphenyl group. In other non-limiting embodiments, R, $R^2$ and $R^3$ can each independently be a 2-fluorophenyl group, a 2-chlorophenyl group, a 3-fluorophenyl group, a 3-chlorophenyl group, a 4-fluorophenyl group, a 4-chlorophenyl group, a 3,5-difluorophenyl group, or a 3,5-dichlorophenyl group; alternatively, a 2-fluorophenyl group or a 2-chlorophenyl group; alternatively, a 3-fluorophenyl group or a 3-chlorophenyl group; alternatively, a 4-fluorophenyl group or a 4-chlorophenyl group; alternatively, a 3,5-difluorophenyl group or a 3,5-dichlorophenyl group; alternatively, a 3-fluorophenyl group, a 3-chlorophenyl group, a 3,5-difluorophenyl group or a 3,5-dichlorophenyl group; alternatively, a 3-fluorophenyl group or a 3,5-difluorophenyl group; alternatively, a 2-fluorophenyl group; alternatively, a 2-chlorophenyl group; alternatively, a 3-fluorophenyl group; alternatively, a 3-chlorophenyl group; alternatively, a 4-fluorophenyl group; alternatively, a 4-chlorophenyl; alternatively, a 3,5-difluorophenyl group; or alternatively, a 3,5-dichlorophenyl group.

In an embodiment, Q is a donor group which can have Structure (II), (III) or (IV):

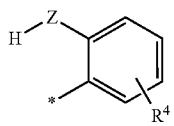

Structure II

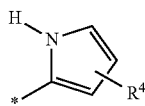

Structure III

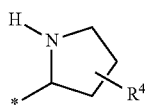

Structure IV where N represents nitrogen, Z can be oxygen or sulfur and $R^4$ can be hydrogen, a halogen, a hydrocarbyl group, or a substituted hydrocarbyl group. Generally $R^4$ can be any of the halogens, hydrocarbyl groups, or substituted hydrocarbyl groups described herein (e.g., in the description of groups suitable for use as $R^2$ and/or $R^3$).

In an embodiment, the CATCOMP comprises a metal salt complex, alternatively a metal-salt complex of an imine bis (phenol) compound, alternatively a metal salt complex of an imine bis(phenol) compound which can have Structure V.

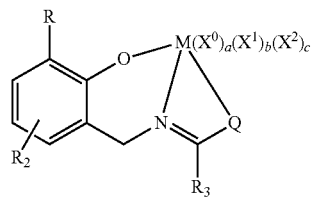

Structure V

In Structure V, O and N represent oxygen and nitrogen respectively Q represents a donor group which can have Structure (VI), (VII) or (VIII).

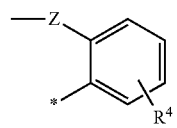

Structure VI

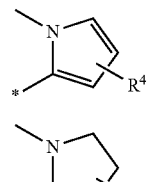

Structure VII

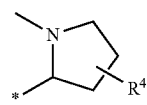

Structure VIII and M is a Group 3 to Group 12 transition metal or lanthanide. Referring to Structure V, $X^0$ can be a neutral ligand and have a value of 0, 1, or 2; $X^1$ can be a monoanionic ligand, and b have a value of 0, 1, 2, 3, or 4; and $X^2$ can be a dianionic ligand, and c have a value of 0 or 1.

In an embodiment, R, $R^2$, $R^3$, $R^4$, and Q of Structure V corresponds to R, $R^2$, $R^3$, $R^4$, and Q of Structure I respectively such that the groups, features and aspects utilized to describe $R^2$, $R^3$, $R^4$, and Q of Structure I may be used to describe the corresponding R, $R^2$, $R^3$, $R^4$, and Q of Structure V. One or more of R, $R^2$, $R^3$, and $R^4$ may each be the same or different.

Generally the metal atom of the metal salt complex of the imine bis(phenol) compound (e.g., M in Structure V) can be any metal atom. In an aspect, the metal atom of the metal salt can be a transition metal or a lanthanide. In an embodiment, suitable metal salts can comprise, or consist essentially of, a Group 3-12 transition metal; alternatively, a Group 4-10 transition metal; alternatively, a Group 6-9 transition metal; alternatively, a Group 7-8 transition metal; alternatively, a Group 4 transition metal; alternatively, a Group 5 transition metal alternatively, a Group 6 transition metal; alternatively, a Group 7 transition metal; alternatively, a Group 8 transition metal; alternatively, a Group 9 transition metal; or alternatively, a Group 10 transition metal. In some embodiments, the metal salt can comprise titanium, zirconium, hafnium, vanadium, niobium, tantalum, chromium, molybdenum, tungsten, manganese, iron, cobalt, nickel, palladium, platinum, copper, or zinc. Alternatively M is a Group 4 transition metal. Alternatively, M is titanium. Alternatively, M is zirconium. Alternatively, M is hafnium.

Generally, the metal atom of the metal can have any positive oxidation state available to the metal atom. In an embodiment, the oxidation state of M is equal to (b+2c+2). In an embodiment, the transition metal can have an oxidation state of from +2 to +6; alternatively, from +2 to +4; or alternatively, from +2 to +3. In some embodiments, the metal atom of the transition metal salt, $ML_n$ can have an oxidation state of +1; alternatively, +2; alternatively, +3; or alternatively, +4. For example, the most common oxidation state for Ti, Zr, and Hf can be +4; therefore, c can be equal to zero and b can be equal to 2 (two monoanionic ligands), or b can be equal to zero and c can be equal to 1 (one dianionic ligand). The most common oxidation state for V and Ta can be +5; therefore, for instance, b can be equal to one (one monoanionic ligand) and c can be equal to 1 (one dianionic ligand).

Referring to Structure V, $X^0$ can be a neutral ligand, and the integer a in Structure V can be 0, 1 or 2. In an aspect, suitable neutral ligands can include sigma-donor solvents that contain an atom (or atoms) that can coordinate to the metal atom in Structure V. Examples of suitable coordinating atoms include, but are not limited to, O, N, S, and P, or combinations of these atoms. The neutral ligand can be unsubstituted or can be substituted. Substituent groups are independently described herein and can be utilized, without limitation to further describe a neutral ligand which can be utilized as $X^0$ in Structure V. In some aspects, the neutral ligand can be a Lewis base. When the integer a is equal to 2, it is contemplated that the two neutral ligands can be the same or different and the descriptions set forth herein apply to each ligand independently.

In an aspect, $X^0$, can be an ether, a thioether, an amine, a nitrile, or a phosphine. In another aspect, $X^0$, can be an acyclic ether, a cyclic ether, an acyclic thioether, a cyclic thioether, a nitrile, an acyclic amine, a cyclic amine, an acyclic phosphine, a cyclic phosphine, or combinations thereof. In other aspects, $X^0$, can be an acyclic ether or a cyclic ether; alternatively, an acyclic thioether or a cyclic thioether; alternatively, an acyclic amine or a cyclic amine; alternatively, an acyclic phosphine or a cyclic phosphine; alternatively, an acyclic ether; alternatively, a cyclic ether; alternatively, an acyclic thioether; alternatively, a cyclic thioether; alternatively, a nitrile; alternatively, an acyclic amine; alternatively, a cyclic amine; alternatively, an acyclic phosphine; or alternatively, a cyclic phosphine. Further, $X^0$ can include any substituted analogs of any acyclic ether, cyclic ether, acyclic thioether, cyclic thioether, nitrile, acyclic amine, cyclic amine, acyclic phosphine, or cyclic phosphine, as disclosed herein.

In an aspect, $X^0$ can be a nitrile having the formula $R^{1q}C \equiv N$, an ether having the formula $R^{2q}$—O—$R^{3q}$, a thioether having the formula $R^{4q}$—S—$R^{5q}$, an amine having the formula $NR^{6q}R^{7q}R^{8q}$, $NHR^{6q}R^{7q}$, or $NH_2R^{6q}$, or a phosphine having the formula $PR^{9q}R^{10q}R^{11q}$, $PHR^{9q}R^{10q}$, or $PH_2R^{9q}$; alternatively, a nitrile having the formula $R^{1q}C \equiv N$, an ether having the formula $R^{2q}$—O—$R^{3q}$, a thioether having the formula $R^{4q}$—S—$R^{5q}$, an amine having the formula $NR^{6q}R^{7q}R^{8q}$, or a phosphine having the formula $PR^{9q}R^{10q}R^{11q}$; or alternatively, a nitrile having the formula $R^{1q}C \equiv N$, an ether having the formula $R^{2q}$—O—$R^{3q}$, a thioether having the formula $R^{4q}$—S—$R^{5q}$, an amine having the formula $NR^{6q}R^{7q}R^{8q}$, or a phosphine having the formula $PR^{9q}$, $R^{10q}R^{11q}$. In an aspect, $X^0$ can be a nitrile having the formula $R^{1q}C \equiv N$; alternatively, an ether having the formula $R^{2q}$—O—$R^{3q}$; alternatively, a thioether having the formula $R^{4a}$—S—$R^{5a}$; alternatively, an amine having the formula $NR^{6q}R^{7q}R^{8q}$, $NHR^{6q}R^{7q}$, or $NH_2R^{6q}$; alternatively, a phosphine having the formula $PR^{9q}R^{10q}R^{11q}$, $PHR^{9q}R^{10q}$, or $PH_2R^{9q}$; or alternatively, a phosphine having the formula $PR^{5q}R^{10q}R^{11q}$.

In an aspect, $R^{1q}$ of the nitrile having the formula $R^{1q}C \equiv N$, $R^{2q}$ and $R^{3q}$ of the ether having formula $R^{2q}$—O—$R^{3q}$, $R^{4q}$ and $R^{5q}$ of the thioether having the formula $R^{4q}$—S—$R^{5q}$, $R^{6q}$, $R^{7q}$, and $R^{8q}$ of the amine having the formula $NR^{6q}R^{7q}R^{8q}$, $NHR^{6q}R^{7q}$, or $NH_2R^{6q}$, and $R^{9q}$, $R^{10q}$, and $R^{11q}$ of the phosphine having the formula $PR^{9q}R^{10q}R^{11q}$, $PHR^{9q}R^{10q}$, or $PH_2R^{9q}$, independently can be a $C_1$ to $C_{18}$ hydrocarbyl group; alternatively, a $C_1$ to $C_{15}$ hydrocarbyl group; alternatively, a $C_1$ to $C_{12}$ hydrocarbyl group; alternatively, a $C_1$ to $C_8$ hydrocarbyl group; or alternatively, a $C_1$ to $C_6$ hydrocarbyl group. It should also be noted that $R^{2q}$ and $R^{3q}$ of the ether having formula $R^{2q}$—O—$R^{3q}$, $R^{4q}$ and $R^{5q}$ of the thioether having the formula $R^{4q}$—S—$R^{5q}$, any two of $R^{6q}$, $R^{7q}$, and $R^{8q}$ of the amine having the formula $NR^{6q}R^{7q}R^{8q}$ or $NHR^{6q}R^{7q}$, and/or any two of $R^{9q}$, $R^{10q}$, and $R^{11q}$ of the phosphine having the formula $PR^{9q}R^{10q}R^{11q}$ or $PHR^{9q}R^{10q}$ can be joined to form a ring containing the ether oxygen atom, the thioether sulfur atom, the amine nitrogen atom, or the phosphine phosphorus atom to form a cyclic ether, thioether, amine, or phosphine, respectively, as described herein in regards to cyclic ethers, thioethers, amines, and phosphines.

In an aspect, $R^{1q}$ of the nitrile having the formula $R^{1q}C \equiv N$, $R^{2q}$ and $R^{3q}$ of the ether having formula $R^{2q}$—O—$R^{3q}$, $R^{4q}$ and $R^{5q}$ of the thioether having the formula $R^{4q}$—S—$R^{5q}$, $R^{6q}$, $R^{7q}$, and $R^{8q}$ of the amine having the formula $NR^{6q}R^{7q}R^{8q}$, $NHR^{6q}R^{7q}$, or $NH_2R^{6q}$, and $R^{9q}$, $R^{10q}$, and $R^{11q}$ of the phosphine having the formula $PR^{9q}R^{10q}R^{11q}$, $PHR^{9q}R^{10q}$, or $PH_2R^{9q}$, independently be any hydrocarbyl group disclosed herein. The hydrocarbyl group can be, for instance, any alkyl group, cycloalkyl group, aryl group, or aralkyl group disclosed herein.

In another aspect $X^0$, in Structure V independently can be a $C_2$-$C_{30}$ ether, a $C_2$-$C_{30}$ thioether, a $C_2$-$C_{20}$ nitrile, a $C_1$-$C_{30}$ amine, or a $C_1$-$C_{30}$ phosphine; alternatively, a $C_2$-$C_{18}$ ether; alternatively, a $C_2$-$C_{18}$ thioether; alternatively, a $C_2$-$C_{12}$ nitrile; alternatively, a $C_1$-$C_{18}$ amine; or alternatively, a $C_1$-$C_{18}$ phosphine. In some aspects, each neutral ligand independently can be a $C_2$-$C_{12}$ ether, a $C_2$-$C_{12}$ thioether, a $C_2$-$C_8$ nitrile, a $C_1$-$C_{12}$ amine, or a $C_1$-$C_{12}$ phosphine; alternatively, a $C_2$-$C_{10}$ ether; alternatively, a $C_2$-$C_{10}$ thioether; alternatively, a $C_2$-$C_6$ nitrile; alternatively, a $C_1$-$C_8$ amine; or alternatively, a $C_1$-$C_8$ phosphine.

Suitable ethers which can be utilized as $X^0$, either alone or in combination, can include, but are not limited to, dimethyl ether, diethyl ether, dipropyl ether, dibutyl ether, methyl ethyl ether, methyl propyl ether, methyl butyl ether, diphenyl ether, ditolyl ether, tetrahydrofuran, 2-methyltetrahydrofuran, 2,5-dimethyltetrahydrofuran, 2,3-dihydrofuran, 2,5-dihydrofuran, furan, benzofuran, isobenzofuran, dibenzofuran, tetrahydropyran, 3,4-dihydro-2H-pyran, 3,6-dihydro-2H-pyran, 2H-pyran, 4H-pyran, 1,3-dioxane, 1,4-dioxane, morpholine, and the like, including substituted derivatives thereof.

Suitable thioethers which can be utilized as $X^0$, either alone or in combination, can include, but are not limited to, dimethyl thioether, diethyl thioether, dipropyl thioether, dibutyl thioether, methyl ethyl thioether, methyl propyl thioether, methyl butyl thioether, diphenyl thioether, ditolyl thioether, thiophene, benzothiophene, tetrahydrothiophene, thiane, and the like, including substituted derivatives thereof.

Suitable nitriles which can be utilized as $X^0$, either alone or in combination, can include, but are not limited to, acetonitrile, propionitrile, butyronitrile, benzonitrile, 4-methylbenzonitrile, and the like, including substituted derivatives thereof.

Suitable amines which can be utilized as $X^0$, either alone or in combination, can include, but are not limited to, methyl amine, ethyl amine, propyl amine, butyl amine, dimethyl amine, diethyl amine, dipropyl amine, dibutyl amine, trimethyl amine, triethyl amine, tripropyl amine, tributyl amine, aniline, diphenylamine, triphenylamine, tolylamine, xylylamine, ditolylamine, pyridine, quinoline, pyrrole, indole, 2-methylpyridine, 3-methylpyridine, 4-methylpyridine, 2,5-dimethylpyrrole, 2,5-diethylpyrrole, 2,5-dipropylpyrrole, 2,5-dibutylpyrrole, 2,4-dimethylpyrrole, 2,4-diethylpyrrole, 2,4-dipropylpyrrole, 2,4-dibutylpyrrole, 3,4-dimethylpyrrole, 3,4-diethylpyrrole, 3,4-dipropylpyrrole, 3,4-dibutylpyrrole, 2-methylpyrrole, 2-ethylpyrrole, 2-propylpyrrole, 2-butylpyrrole, 3-methylpyrrole, 3-ethylpyrrole, 3-propylpyrrole, 3-butylpyrrole, 3-ethyl-2,4-dimethylpyrrole, 2,3,4,5-tetramethylpyrrole, 2,3,4,5-tetraethylpyrrole, and the like, including substituted derivatives thereof. Suitable amines can be primary amines, secondary amines, or tertiary amines.

Suitable phosphines which can be utilized as $X^0$, either alone or in combination, can include, but are not limited to, trimethylphosphine, triethylphosphine, tripropylphosphine, tributylphosphine, phenylphosphine, tolylphosphine, diphenylphosphine, ditolylphosphine, triphenylphosphine, tritolylphosphine, methyldiphenylphosphine, dimethylphenylphosphine, ethyldiphenylphosphine, diethylphenylphosphine, and the like, including substituted derivatives thereof.

In an aspect, $X^0$ can be azetidine, oxetane, thietane, dioxetane, dithietane, tetrahydropyrrole, dihydropyrrole, pyrrole, indole, isoindole, tetrahydrofuran, 2-methyltetrahydrofuran, 2,5-dimethyltetrahydrofuran, dihydrofuran, furan, benzofuran, isobenzofuran, tetrahydrothiophene, dihydrothiophene, thiophene, benzothiophene, isobenzothiophene, imidazolidine, pyrazole, imidazole, oxazolidine, oxazole, isoxazole, thiazolidine, thiazole, isothiazole, benzothiazole, dioxolane, dithiolane, triazole, dithiazole, piperidine, pyridine, dimethyl amine, diethyl amine, tetrahydropyran, dihydropyran, pyran, thiane, piperazine, diazine, oxazine, thiazine, dithiane, dioxane, dioxin, triazine, triazinane, trioxane, oxepin, azepine, thiepin, diazepine, morpholine, quinoline, tetrahydroquinone, bicyclo[3.3.1]tetrasiloxane, or acetonitrile; alternatively, azetidine, oxetane, thietane, dioxetane, dithietane, tetrahydropyrrole, tetrahydrofuran, 2-methyltetrahydrofuran, 2,5-dimethyltetrahydrofuran, tetrahydrothiophene, imidazolidine, oxazolidine, oxazole, thiazolidine, thiazole, dioxolane, dithiolane, piperidine, tetrahydropyran, pyran, thiane, piperazine, oxazine, thiazine, dithiane, dioxane, dioxin, triazinane, trioxane, azepine, thiepin, diazepine, morpholine, 1,2-thiazole, or bicyclo[3.3.1]tetrasiloxane; alternatively, tetrahydropyrrole, tetrahydrofuran, 2-methyltetrahydrofuran, 2,5-dimethyltetrahydrofuran, tetrahydrothiophene, oxazolidine, thiazolidine, dioxolane, dithiolane, dithiazole, piperidine, tetrahydropyran, pyran, thiane, piperazine, dithiane, dioxane, dioxin, trioxane, or morpholine; alternatively, tetrahydrofuran, 2-methyltetrahydrofuran, 2,5-dimethyltetrahydrofuran, tetrahydrothiophene, dioxolane, dithiolane, tetrahydropyran, pyran, thiane, dithiane, dioxane, dioxin, or trioxane; alternatively, tetrahydrofuran, dioxolane, tetrahydropyran, dioxane, or trioxane; alternatively, pyrrole, furan, pyrazole, imidazole, oxazole, isoxazole, thiazole, isothiazole, triazole, pyridine, dimethyl amine, diethyl amine, diazine, triazine, or quinoline; alternatively, pyrrole, furan, imidazole, oxazole, thiazole, triazole, pyridine, dimethyl amine, diethyl amine, diazine, or triazine; or alternatively, furan, oxazole, thiazole, triazole, pyridine, diazine, or triazine. In some aspects, $X^0$ can be azetidine; alternatively, oxetane; alternatively, thietane; alternatively, dioxetane; alternatively, dithietane; alternatively, tetrahydropyrrole; alternatively, dihydropyrrole, alternatively, pyrrole; alternatively, indole; alternatively, isoindole; alternatively, tetrahydrofuran; alternatively, 2-methyltetrahydrofuran; alternatively, 2,5-dimethyltetrahydrofuran; alternatively, dihydropyrrole; alternatively, furan; alternatively, benzofuran; alternatively, isobenzofuran; alternatively, tetrahydrothiophene; alternatively, dihydrothiophene; alternatively, thiophene; alternatively, benzothiophene; alternatively, isobenzothiophene; alternatively, imidazolidine; alternatively, pyrazole; alternatively, imidazole; alternatively, oxazolidine; alternatively, oxazole; alternatively, isoxazole; alternatively, thiazolidine; alternatively, thiazole; alternatively, benzothiazole; alternatively, isothiazole; alternatively, dioxolane; alternatively, dithiolane; alternatively, triazole; alternatively, dithiazole; alternatively, piperidine; alternatively, pyridine; alternatively, dimethyl amine; alternatively, diethyl amine; alternatively, tetrahydropyran; alternatively, dihydropyran; alternatively, pyran; alternatively, thiane; alternatively, piperazine; alternatively, diazine; alternatively, oxazine; alternatively, thiazine; alternatively, dithiane; alternatively, dioxane; alternatively, dioxin; alternatively, triazine; alternatively, triazinane; alternatively, trioxane; alternatively, oxepin; alternatively, azepine; alternatively, thiepin; alternatively, diazepine; alternatively, morpholine; alternatively, quinoline; alternatively, tetrahydroquinone; alternatively, bicyclo[3.3.1]tetrasiloxane; or alternatively, acetonitrile.

In another aspect, $X^0$ can be azetidine, tetrahydropyrrole, dihydropyrrole, pyrrole, indole, isoindole, imidazolidine, pyrazole, imidazole, oxazolidine, oxazole, isoxazole, thiazolidine, thiazole, isothiazole, triazole, benzotriazole, dithiazole, piperidine, pyridine, dimethyl amine, diethyl amine, piperazine, diazine, oxazine, thiazine, triazine, azepine, diazepine, morpholine, quinoline, or tetrahydroisoquinoline. In another aspect, $X^0$ can be thietane, dithietane, tetrahydrothiophene, dihydrothiophene, thiophene, benzothiophene, isobenzothiophene, thiazolidine, thiazole, isothiazole, dithiolane, dithiazole, thiane, thiazine, dithiane, or thiepin. In another aspect, $X^0$ can be tetrahydrofuran, furan, methyltetrahydrofuran, dihydrofuran, tetrahydropyran, 2,3-dihydropyran, 1,3-dioxane, 1,4-dioxane, morpholine, N-methylmorpholine, acetonitrile, propionitrile, butyronitrile, benzonitrile, pyridine, ammonia, methyl amine, ethyl amine, dimethyl amine, diethyl amine, trimethyl amine, triethyl amine, trimethylphosphine, triethylphosphine, triphenylphosphine, tri-n-butylphosphine, methyl isocyanide, n-butyl isocyanide, phenyl isocyanide, $SMe_2$, thiophene, or tetrahydrothiophene. In another aspect, $X^0$ can be tetrahydrofuran, methyltetrahydrofuran, tetrahydropyran, 1,4-dioxane, acetonitrile, pyridine, dimethyl amine, diethyl amine, ammonia, trimethyl amine, triethyl amine, trimethylphosphine, triethylphosphine, triphenylphosphine, $SMe_2$, or tetrahydrothiophene; alternatively, tetrahydrofuran, methyltetrahydrofuran, tetrahydropyran, or 1,4-dioxane; alternatively, ammonia, trimethylamine, or triethylamine; or alternatively, trimethylphosphine, triethylphosphine, or triphenylphosphine. Yet, in another aspect, $X^0$ can be tetrahydrofuran, acetonitrile, pyridine, ammonia, dimethyl amine, diethyl amine, trimethyl amine, trimethylphosphine, or triphenylphosphine; alternatively, tetrahydrofuran, acetonitrile, pyridine, dimethyl amine, diethyl amine, trimethyl amine, trimethylphosphine, or triphenylphosphine; alternatively, tetrahydrofuran, acetonitrile, dimethyl amine, diethyl amine, or pyridine; alternatively, tetrahydrofuran; alternatively, acetonitrile; alternatively, dimethyl amine; alternatively, diethyl amine; or alternatively, pyridine.

$X^1$ in Structure V can be a monoanionic ligand, and the integer b in Structure V can be 0, 1, 2, 3, or 4. $X^1$ can be a hydrogen (hydride), a halide, a $C_1$ to $C_{18}$ hydrocarbyl group, a hydrocarbyloxide group, a hydrocarbylamino group, a hydrocarbylsilyl group, or a hydrocarbylaminosilyl group. If b is greater than 1, each $X^1$ group of Structure V, can be the same or a different. In an embodiment, b is greater than 1 and each $X^1$ can independently be a hydrogen (hydride), a halide, a $C_1$ to $C_{18}$ hydrocarbyl group, a hydrocarbyloxide group, a hydrocarbylamino group, a hydrocarbylsilyl group, or a hydrocarbylaminosilyl group.

In one aspect, $X^1$ can be hydrogen, a halide (e.g., F, Cl, Br, or I), a $C_1$ to $C_{18}$ hydrocarbyl group, a hydrocarbyloxide group, a hydrocarbylamino group, a hydrocarbylsilyl group, or a hydrocarbylaminosilyl group. In another aspect, $X^1$ can be hydrogen, a halide, a $C_1$ to $C_{12}$ hydrocarbyl group, a hydrocarbyloxide group, a hydrocarbylamino group, a hydrocarbylsilyl group, or a hydrocarbylaminosilyl group. In yet another aspect, $X^1$ can be hydrogen, a halide, a $C_1$ to $C_{10}$ hydrocarbyl group, a hydrocarbyloxide group, a hydrocarbylamino group, a hydrocarbylsilyl group, or a hydrocarbylaminosilyl group. In still another aspect, $X^1$ can be hydrogen, a halide, a $C_1$ to $C_8$ hydrocarbyl group, a hydrocarbyloxide group, a hydrocarbylamino group, a hydrocarbylsilyl group, or a hydrocarbylaminosilyl group.

The hydrocarbyl group which can be $X^1$ in Structure V can be any $C_1$ to $C_{18}$ hydrocarbyl group, any $C_1$ to $C_{12}$ hydrocarbyl group, any $C_1$ to $C_{10}$ hydrocarbyl group, or any $C_1$ to $C_8$ hydrocarbyl group disclosed herein. A hydrocarbyloxide group is used generically herein to include, for instance, alkoxy, aryloxy, and -(alkyl or aryl)-O-(alkyl or aryl) groups, and these groups can comprise up to about 18 carbon atoms (e.g., $C_1$ to $C_{18}$, $C_1$ to $C_{12}$, $C_1$ to $C_{10}$, or $C_1$ to $C_8$ hydrocarbyloxide groups). Illustrative and non-limiting examples of hydrocarbyloxide groups can include methoxy, ethoxy, propoxy, butoxy, phenoxy, substituted phenoxy, acetylacetonate (acac), and the like. The term hydrocarbylamino group is used generically herein to refer collectively to, for instance, alkylamino, arylamino, dialkylamino, diarylamino, and -(alkyl or aryl)-N-(alkyl or aryl) groups, and the like. Unless otherwise specified, the hydrocarbylamino groups which can be $X^1$ in Structure V can comprise up to about 18 carbon atoms (e.g., $C_1$ to $C_{18}$, $C_1$ to $C_{12}$, $C_1$ to $C_{10}$, or $C_1$ to $C_8$ hydrocarbylamino groups). The hydrocarbylsilyl group which can be $X^1$ in Structure V can be any $C_1$ to $C_{18}$ hydrocarbylsilyl group, any $C_1$ to $C_{12}$ hydrocarbylsilyl group, any $C_1$ to $C_{10}$ hydrocarbylsilyl group, or any $C_1$ to $C_8$ hydrocarbylsilyl group, disclosed herein. A hydrocarbylaminosilyl group is used herein to refer to groups containing at least one hydrocarbon moiety, at least one nitrogen atom, and at least one silicon atom. Illustrative and non-limiting examples of hydrocarbylaminosilyl groups which can be $X^1$ can include, but are not limited to —$N(SiMe_3)_2$, —$N(SiEt_3)_2$, and the like. Unless otherwise specified, the hydrocarbylaminosilyl groups which can be $X^1$ can comprise up to about 18 carbon atoms (e.g., $C_1$ to $C_{18}$, $C_1$ to $C_{12}$, $C_1$ to $C_{10}$, or $C_1$ to $C_8$ hydrocarbylaminosilyl groups).

In accordance with an aspect of this disclosure, $X^1$ in Structure V can be a halide; alternatively, a $C_1$ to $C_{18}$ hydrocarbyl group; alternatively, a $C_1$ to $C_{18}$ hydrocarbyloxide group; alternatively, a $C_1$ to $C_{18}$ hydrocarbylamino group; alternatively, a $C_1$ to $C_{18}$ hydrocarbylsilyl group; or alternatively, a $C_1$ to $C_{18}$ hydrocarbylaminosilyl group. In accordance with another aspect, $X^1$ can be hydrogen; alternatively, F; alternatively, Cl; alternatively, Br; alternatively, I; alternatively, a $C_1$ to $C_{18}$ hydrocarbyl group; alternatively, a $C_1$ to $C_{18}$ hydrocarbyloxide group; alternatively, a $C_1$ to $C_{18}$ hydrocarbylamino group; alternatively, a $C_1$ to $C_{18}$ hydrocarbylsilyl group; or alternatively, a $C_1$ to $C_{18}$ hydrocarbylaminosilyl group. In accordance with yet another aspect, or at least one $X^1$ can be hydrogen, a halide, methyl, phenyl, benzyl, an alkoxy, an aryloxy, acetylacetonate, an alkylamino, a dialkylamino, a trihydrocarbylsilyl, or a hydrocarbylaminosilyl; alternatively, hydrogen, a halide, methyl, phenyl, or benzyl; alternatively, an alkoxy, an aryloxy, or acetylacetonate; alternatively, an alkylamino or a dialkylamino; alternatively, a trihydrocarbylsilyl or hydrocarbylaminosilyl; alternatively, hydrogen or a halide; alternatively, methyl, phenyl, benzyl, an alkoxy, an aryloxy, acetylacetonate, an alkylamino, or a dialkylamino; alternatively, hydrogen; alternatively, a halide; alternatively, methyl; alternatively, phenyl; alternatively, benzyl; alternatively, an alkoxy; alternatively, an aryloxy; alternatively, acetylacetonate; alternatively, an alkylamino; alternatively, a dialkylamino; alternatively, a trihydrocarbylsilyl; or alternatively, a hydrocarbylaminosilyl. In these and other aspects, the alkoxy, aryloxy, alkylamino, dialkylamino, trihydrocarbylsilyl, and hydrocarbylaminosilyl can be a $C_1$ to $C_{18}$, a $C_1$ to $C_{12}$, a $C_1$ to $C_{10}$, or a $C_1$ to $C_8$ alkoxy, aryloxy, alkylamino, dialkylamino, trihydrocarbylsilyl, or hydrocarbylaminosilyl.

$X^2$ in Structure V can be a dianionic ligand, and the integer c in Structure V can be either 0 or 1. In one aspect, $X^2$ can be =O, =$NR^{2A}$, or =$CR^{2B}R^{2C}$. In another aspect, $X^2$ can be =O; alternatively, $X^2$ can be =$NR^{2A}$; or alternatively, $X^2$ can be =$CR^{2B}R^{2C}$. Independently, $R^{2A}$, $R^{2B}$, and $R^{2C}$ can be hydrogen or any $C_1$ to $C_{18}$ hydrocarbyl group disclosed herein; alternatively, hydrogen or any $C_1$ to $C_{12}$ hydrocarbyl group disclosed herein; alternatively, hydrogen or any $C_1$ to $C_{10}$ hydrocarbyl group disclosed herein; or alternatively, hydrogen or any $C_1$ to $C_8$ hydrocarbyl group disclosed herein. As an example, $R^{2A}$, $R^{2B}$, and $R^{2C}$ can each independently be hydrogen or any $C_1$ to $C_{12}$, $C_1$ to $C_8$, or any $C_1$ to $C_6$ alkyl group disclosed herein.

In an embodiment, an imine (bis)phenol compound suitable for use in a CATCOMP of the present disclosure comprises a compound having Structure IX:

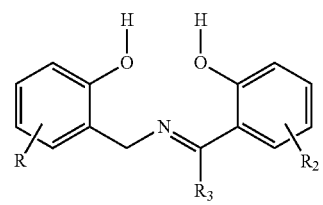

Structure IX where the groups utilized to describe R, $R^2$, and $R^3$ of Structure I may be utilized to describe R, $R^2$, and $R^3$ respectively of Structure IX.

In an embodiment, an imine bis(phenol) compound suitable for use in a CATCOMP of the present disclosure comprises a compound having Structure X:

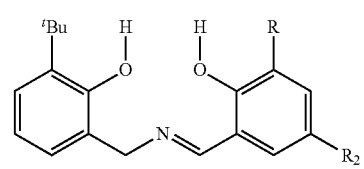

Structure X where the groups utilized to describe R, and $R^2$ of Structure I may be utilized to describe R and $R^2$ respectively of Structure X. In an embodiment of Structure X, R is a t-butyl group and $R^2$ is hydrogen. Alternatively R and $R^2$ are t-butyl groups, alternatively R is a methyl group and $R^2$ is hydrogen, alternatively R and $R^2$ are chloride, alternatively R is adamantyl and $R^2$ is methyl, alternatively R is methoxy and $R^2$ is hydrogen, or alternatively R and $R^2$ are hydrogen.

In an embodiment, an imine phenol compound suitable for use in a CATCOMP of the present disclosure comprises a compound having Structure XI:

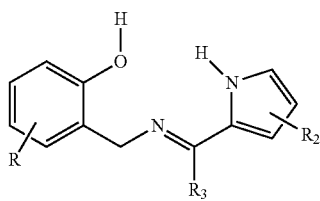

Structure XI where the groups utilized to describe R, $R^2$, and $R^3$ of Structure I may be utilized to describe R, $R^2$, and $R^3$ respectively of Structure XI.

In an embodiment, an imine phenol compound suitable for use in a CATCOMP of the present disclosure comprises a compound having Structure XII:

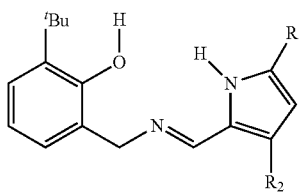

Structure XII where the groups utilized to describe R and $R^2$ of Structure I may be utilized to describe R and $R^2$ respectively of Structure XII. In an embodiment of Structure XII, R and $R^2$ are methyl groups, or alternatively R is methoxy and $R^2$ is hydrogen.

In an embodiment, a metal salt complex of an imine (bis) phenol compound suitable for use in a CATCOMP of the present disclosure comprises a compound having Structure XIII:

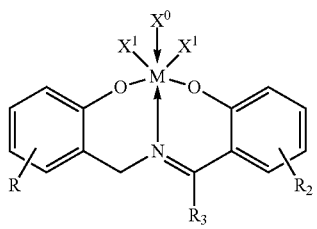

Structure XIII where M is titanium, zirconium, or hafnium and R, $R^2$, $R^3$, $X^0$, and $X^1$ are of the type described herein and $X^0$ is optional. In an embodiment of Structure XIII, M is zirconium and R is a t-butyl group. Alternatively, M is hafnium and R is a t-butyl group; alternatively, M is zirconium and R and $R^2$ are t-butyl groups, alternatively M is zirconium and R is a methyl group, alternatively M is zirconium and R and $R^2$ are chloride, or alternatively M is zirconium, R is adamantyl and $R^2$ is methyl.

In an embodiment, a metal salt complex of an imine bis (phenol) compound suitable for use in a CATCOMP of the present disclosure comprises a compound having Structure XIV:

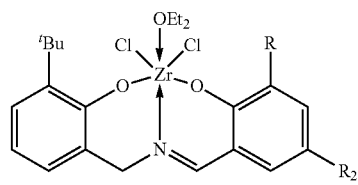

Structure XIV where the groups utilized to describe R and $R^2$ of Structure I may be utilized to describe R and $R^2$ respectively of Structure XIV and $Et_2O$ is optional.

In an embodiment, a metal salt complex of an imine bis (phenol) compound suitable for use in a CATCOMP of the present disclosure comprises a compound having Structure XV where $Et_2O$ is optional:

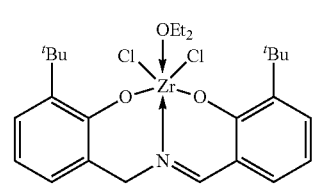

Structure XV

In an embodiment, a metal salt complex of an imine bis (phenol) compound suitable for use in a CATCOMP of the present disclosure comprises a compound having any of Structures XVI, XVII, XVIII, XIX, XX, or XXI:

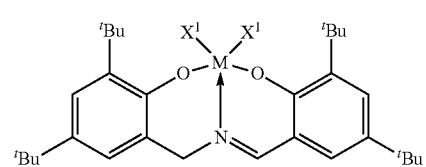

Structure XVI

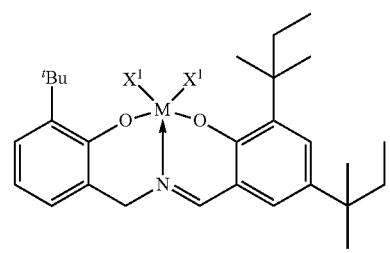

Structure XVII

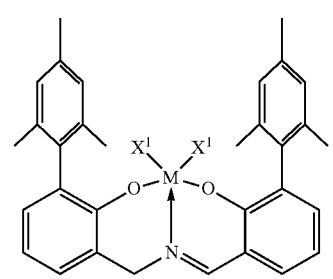

Structure XVIII

Structure XIX

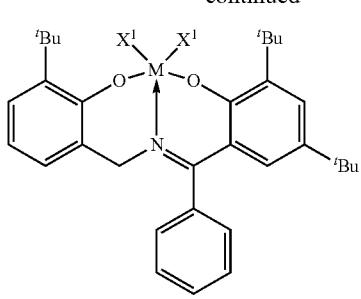

Structure XX

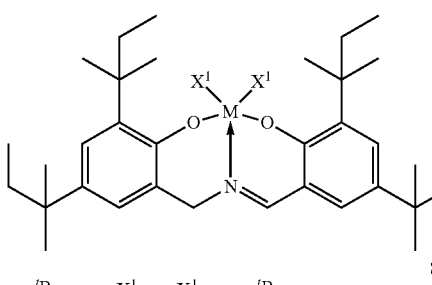

Structure XXI

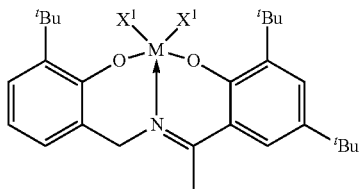

In an embodiment, the metallocene-containing compound in the CATCOMP is an unbridged metallocene, designated MTE-A, which, when utilized as an ethylene polymerization catalyst. Herein, the term "metallocene" describes a compound comprising at least one $\eta^3$ to $\eta_1{}^5$-cycloalkadienyl-type moiety, wherein $\eta^3$ to $\eta^5$-cycloalkadienyl moieties include cyclopentadienyl ligands, indenyl ligands, fluorenyl ligands, and the like, including partially saturated or substituted derivatives or analogs of any of these. Possible substituents on these ligands include hydrogen, therefore the description "substituted derivatives thereof" in this disclosure comprises partially saturated ligands such as tetrahydroindenyl, tetrahydrofluorenyl, octahydrofluorenyl, partially saturated indenyl, partially saturated fluorenyl, substituted partially saturated indenyl, substituted partially saturated fluorenyl, and the like.

In an embodiment, MTE-A is a compound that may be characterized by one of general formulas 1 or 2:

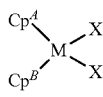

Formula 1

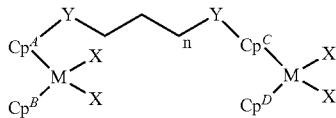

Formula 2 where each X is independently F, Cl, Br, I, methyl, benzyl, phenyl, H, $BH_4$, a hydrocarbyloxide group having up to 20 carbon atoms, a hydrocarbylamino group having up to 20 carbon atoms, a trihydrocarbylsilyl group having up to 20 carbon atoms, $OBR'_2$ wherein R' may be an alkyl group having up to 12 carbon atoms or an aryl group having up to 12 carbon atoms, and $SO_3R''$, wherein R'' may be an alkyl group having up to 12 carbon atoms or an aryl group having up to 12 carbon atoms; Y is a $CR_2$ or $SiR_2$ group where R is hydrogen or a hydrocarbyl group; $Cp^A$, $Cp^B$, $Cp^C$, and $Cp^D$ are each independently a substituted or unsubstituted cyclopentadienyl group, indenyl group, or flourenyl group and where any substituent on $C_P{}^A$, $Cp^B$, $Cp^C$, and $Cp^D$ can be H, a hydrocarbyl group having up to 18 carbon atoms or a hydrocarbylsilyl group having up to 18 carbon atoms.

In an embodiment, MTE-A is a dinuclear compound wherein each metal moiety has the same structural characteristic described previously herein. In an embodiment, MTE-A is a nonbridged metallocene. Nonlimiting examples of compounds suitable for use in this disclosure as MTE-A are represented by structures (1)-(13):

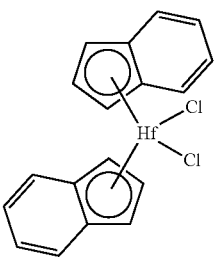
(1)

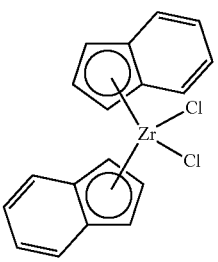
(2)

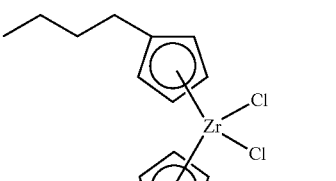
(3)

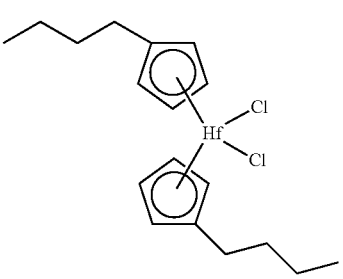
(4)

(5) 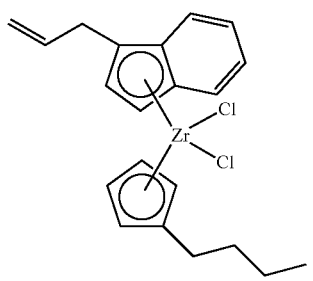

(6) 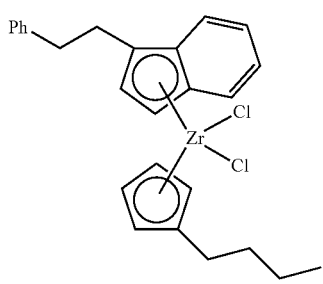

(7) 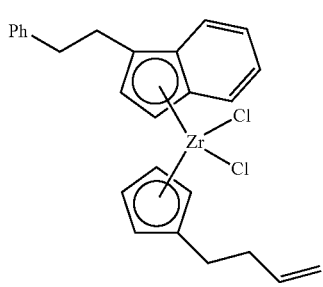

(8) 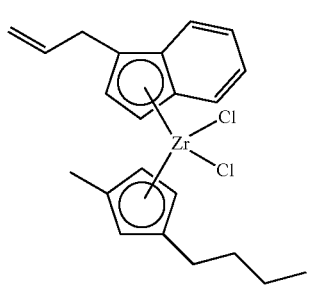

(9) 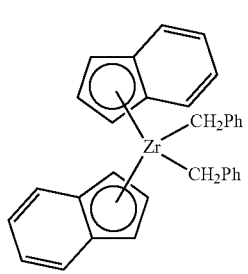

(10) 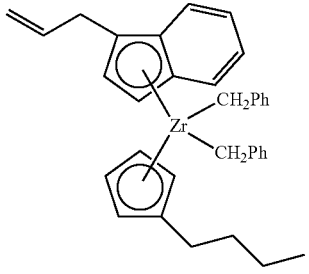

(11) 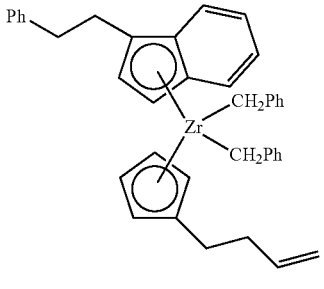

(12) 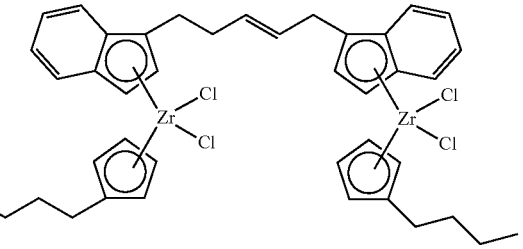

(13) 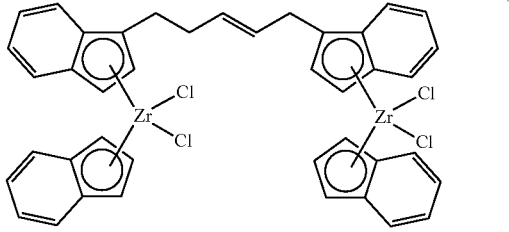

Other nonlimiting examples of metallocene compounds that may be suitably employed as MTE-A in a CATCOMP of the type disclosed herein include bis(cyclopentadienyl)hafnium dichloride; bis(n-butylcyclopentadienyl)bis(di-t-butylamido)hafnium; bis(n-propylcyclopentadienyl)zirconium dichloride; bis(pentamethylcyclopentadienyl)zirconium dichloride; bis(1-propylindenyl)zirconium dichloride; or any combination thereof.

In an alternative embodiment, the CATCOMP comprises a bridged metallocene compound hereinafter designated MTE-B. In an embodiment, MTE-B can be characterized by one of general formulas 3 or 4:

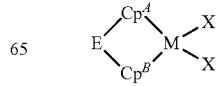

Formula 3

Formula 4

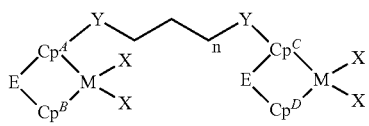

where M is Ti, Zr or Hf; each X is independently F, Cl, Br, I, methyl, phenyl, benzyl, H, BH$_4$, a hydrocarbyloxide group having up to 20 carbon atoms, a hydrocarbylamino group having up to 20 carbon atoms, a trihydrocarbylsilyl group having up to 20 carbon atoms, OBR'$_2$ wherein R' may be an alkyl group having up to 12 carbon atoms or an aryl group having up to 12 carbon atoms, or SO$_3$R" wherein R" may be an alkyl group having up to 12 carbon atoms or an aryl group having up to 12 carbon atoms; Y is a CR$_2$, SiR$_2$, or R$_2$CCR$_2$ group which may be linear or cyclic and where R is hydrogen or a hydrocarbyl group; Cp$^A$, Cp$^B$, Cp$^C$, and Cp$^D$ are each independently a substituted or unsubstituted cyclopentadienyl group, indenyl group, or flourenyl group and where any substituent on Cp$^A$, Cp$^B$, Cp$^C$, and Cp$^D$ can be H, a hydrocarbyl group having up to 18 carbon atoms or a hydrocarbylsilyl group having up to 18 carbon atoms. E represents a bridging group which may comprise (i) a cyclic or heterocyclic moiety having up to 18 carbon atoms, (ii) a group represented by the general formula E$^A$R$^{3A}$R$^{4A}$, wherein E$^A$ is C, Si, Ge, or B, and R$^{3A}$ and R$^{4A}$ are independently H or a hydrocarbyl group having up to 18 carbon atoms, (iii) a group represented by the general formula —CR$^{3B}$R$^{4B}$—CR$^{3C}$R$^{4C}$—, wherein R$^{3B}$, R$^{4B}$, R$^{3C}$, and R$^{4C}$ are independently H or a hydrocarbyl group having up to 10 carbon atoms, or (iv) a group represented by the general formula SiR$_2$—CR$_2$ where X is Si or C and R is a hydrogen or hydrocarbyl group; or —SiR$^{3D}$R$^{4D}$—SiR$^{3E}$R$^{4E}$—, wherein R$^{3D}$, R$^{4D}$, R$^{3E}$, and R$^{4E}$ are independently H or a hydrocarbyl group having up to 10 carbon atoms, and wherein at least one of R$^{3A}$, R$^{3B}$, R$^{4A}$, R$^{4B}$, R$^{3C}$, R$^{4C}$, R$^{3D}$, R$^{4D}$, R$^{3E}$, R$^{4E}$, or the substituent on Cp, Cp$_1$, or Cp$_2$, is (1) a terminal alkenyl group having up to 12 carbon atoms or (2) a dinuclear compound wherein each metal moiety has the same structural characteristic as MTE-B. Nonlimiting examples of compounds suitable for use in this disclosure as MTE-B are represented by structures (14)-(29):

(14)

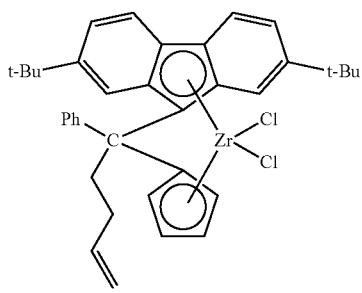

(15)

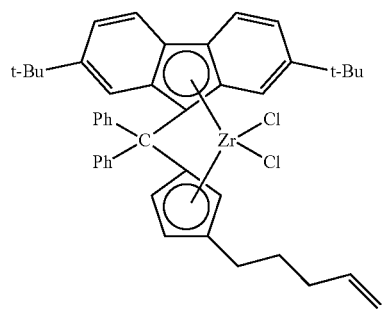

(16)

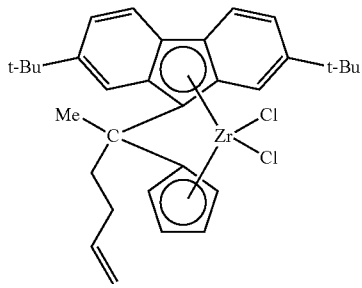

(17)

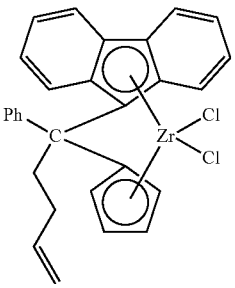

(18)

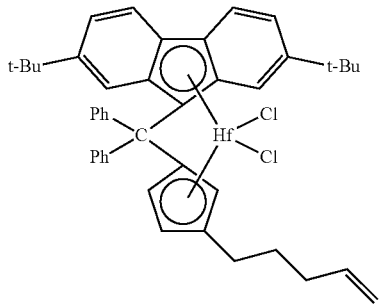

(19)

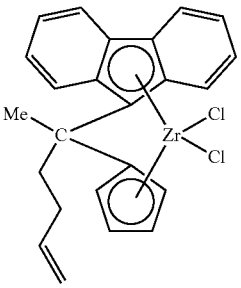

-continued
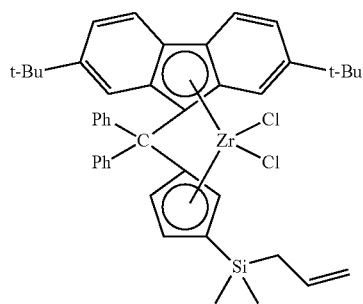 (20)
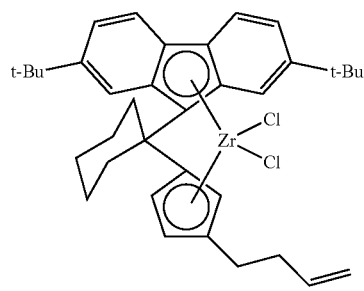 (21)
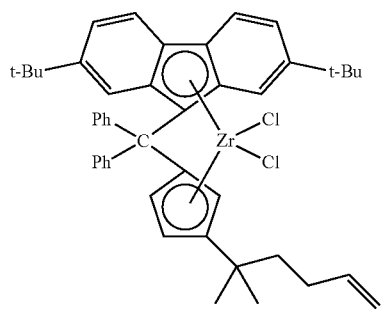 (22)
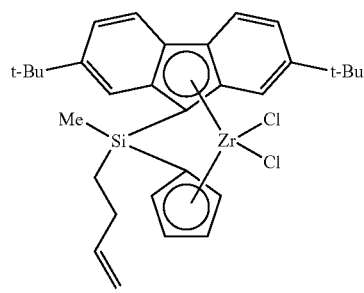 (23)
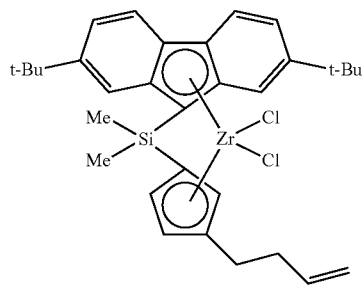 (24)
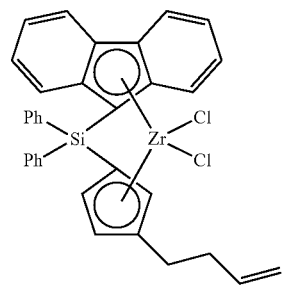 (25)
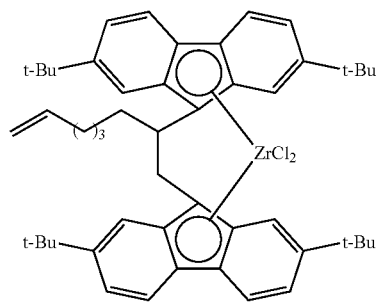 (26)
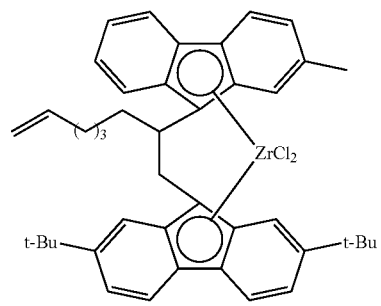 (27)
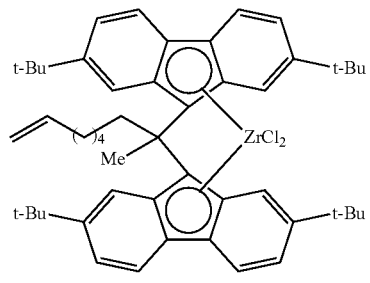 (28)

-continued (29)

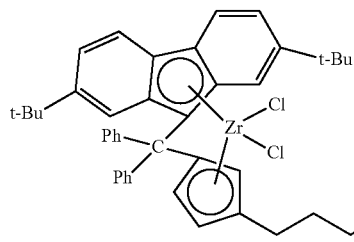 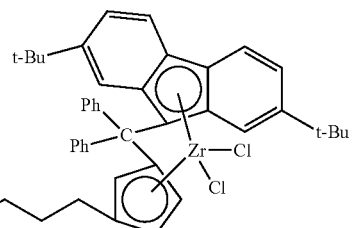

In an embodiment, the CATCOMP further comprises a chemically-treated solid oxide which may function as an activator-support. Alternatively, the chemically-treated solid oxide can comprise a clay mineral, a pillared clay, an exfoliated clay, an exfoliated clay gelled into another oxide matrix, a layered silicate mineral, a non-layered silicate mineral, a layered aluminosilicate mineral, a non-layered aluminosilicate mineral, or any combination thereof.

Generally, chemically-treated solid oxides exhibit enhanced acidity as compared to the corresponding untreated solid oxide compound. The chemically-treated solid oxide also functions as a catalyst activator as compared to the corresponding untreated solid oxide. While the chemically-treated solid oxide activates the transition-metal salt complex in the absence of co-catalysts, co-catalysts may also be included in the catalyst composition. The activation function of the activator-support is evident in the enhanced activity of catalyst composition as a whole, as compared to a catalyst composition containing the corresponding untreated solid oxide. However, it is believed that the chemically-treated solid oxide can function as an activator, even in the absence of an organoaluminum compound, aluminoxanes, organoboron or organoborate compounds, ionizing ionic compounds, and the like.

The chemically-treated solid oxide can comprise a solid oxide treated with an electron-withdrawing anion. While not intending to be bound by the following statement, it is believed that treatment of the solid oxide with an electron-withdrawing component augments or enhances the acidity of the oxide. Thus, either the activator-support exhibits Lewis or Brønsted acidity that is typically greater than the Lewis or Brønsted acid strength of the untreated solid oxide, or the activator-support has a greater number of acid sites than the untreated solid oxide, or both. One method to quantify the acidity of the chemically-treated and untreated solid oxide materials is by comparing the polymerization activities of the treated and untreated oxides under acid catalyzed reactions.

Chemically-treated solid oxides of this disclosure are formed generally from an inorganic solid oxide that exhibits Lewis acidic or Brønsted acidic behavior and has a relatively high porosity. The solid oxide is chemically-treated with an electron-withdrawing component, typically an electron-withdrawing anion, to form an activator-support.

According to one aspect of the present disclosure, the solid oxide used to prepare the chemically-treated solid oxide has a pore volume greater than about 0.1 cc/g. According to another aspect of the present disclosure, the solid oxide has a pore volume greater than about 0.5 cc/g. According to yet another aspect of the present disclosure, the solid oxide has a pore volume greater than about 1.0 cc/g.

In another aspect, the solid oxide has a surface area of from about 100 $m^2/g$ to about 1000 $m^2/g$. In yet another aspect, the solid oxide has a surface area of from about 200 $m^2/g$ to about 800 $m^2/g$. In still another aspect of the present disclosure, the solid oxide has a surface area of from about 250 $m^2/g$ to about 600 $m^2/g$.

The chemically-treated solid oxide can comprise a solid inorganic oxide comprising oxygen and one or more elements selected from Group 2, 3, 4, 5, 6, 7, 8, 9, 10, 11, 12, 13, 14, or 15 of the periodic table, or comprising oxygen and one or more elements selected from the lanthanide or actinide elements (See: Hawley's Condensed Chemical Dictionary, 11th Ed., John Wiley & Sons, 1995; Cotton, F. A., Wilkinson, G., Murillo, C. A., and Bochmann, M., Advanced Inorganic Chemistry, 6th Ed., Wiley-Interscience, 1999). For example, the inorganic oxide can comprise oxygen and an element, or elements, selected from Al, B, Be, Bi, Cd, Co, Cr, Cu, Fe, Ga, La, Mn, Mo, Ni, Sb, Si, Sn, Sr, Th, Ti, V, W, P, Y, Zn, and Zr.

Suitable examples of solid oxide materials or compounds that can be used to form the chemically-treated solid oxide include, but are not limited to, $Al_2O_3$, $B_2O_3$, BeO, $Bi_2O_3$, CdO, $Co_3O_4$, $Cr_2O_3$, CuO, $Fe_2O_3$, $Ga_2O_3$, $La_2O_3$, $Mn_2O_3$, $MoO_3$, NiO, $P_2O_5$, $Sb_2O_5$, $SiO_2$, $SnO_2$, SrO, $ThO_2$, $TiO_2$, $V_2O_5$, $WO_3$, $Y_2O_3$, ZnO, $ZrO_2$, and the like, including mixed oxides thereof, and combinations thereof. For example, the solid oxide can comprise silica, alumina, silica-alumina, silica-coated alumina, aluminum phosphate, aluminophosphate, heteropolytungstate, titania, zirconia, magnesia, boria, zinc oxide, mixed oxides thereof, or any combination thereof.

The solid oxide of this disclosure encompasses oxide materials such as alumina, "mixed oxide" compounds thereof such as silica-alumina, and combinations and mixtures thereof. The mixed oxide compounds such as silica-alumina can be single or multiple chemical phases with more than one metal combined with oxygen to form a solid oxide compound. Examples of mixed oxides that can be used in the activator-support of the present disclosure include, but are not limited to, silica-alumina, silica-titania, silica-zirconia, zeolites, various clay minerals, alumina-titania, alumina-zirconia, zinc-aluminate, alumina-boria, silica-boria, aluminophosphate-silica, titania-zirconia, and the like. The solid oxide of this disclosure also encompasses oxide materials such as silica-coated alumina, as described in U.S. Pat. No. 7,884,163, the disclosure of which is incorporated herein by reference in its entirety.

The electron-withdrawing component used to treat the solid oxide can be any component that increases the Lewis or Brønsted acidity of the solid oxide upon treatment (as compared to the solid oxide that is not treated with at least one electron-withdrawing anion). According to one aspect of the present disclosure, the electron-withdrawing component is an electron-withdrawing anion derived from a salt, an acid, or other compound, such as a volatile organic compound, that serves as a source or precursor for that anion. Examples of electron-withdrawing anions include, but are not limited to, sulfate, bisulfate, fluoride, chloride, bromide, iodide, fluorosulfate, fluoroborate, phosphate, fluorophosphate, trifluoroacetate, triflate, fluorozirconate, fluorotitanate, phosphotungstate, and the like, including mixtures and combinations thereof. In addition, other ionic or non-ionic compounds that serve as sources for these electron-withdrawing anions also can be employed in the present disclosure. It is contemplated that the electron-withdrawing anion can be, or can comprise, fluoride, chloride, bromide, phosphate, triflate, bisulfate, or sulfate, and the like, or any combination thereof, in some aspects of this disclosure. In other aspects, the electron-withdrawing anion can comprise sulfate, bisulfate, fluoride, chloride, bromide, iodide, fluorosulfate, fluoroborate, phosphate, fluorophosphate, trifluoroacetate, triflate, fluorozirconate, fluorotitanate, and the like, or any combination thereof.

Thus, for example, the activator-support (e.g., chemically-treated solid oxide) used in the catalyst compositions can be, or can comprise, fluorided alumina, chlorided alumina, bromided alumina, sulfated alumina, fluorided silica-alumina, chlorided silica-alumina, bromided silica-alumina, sulfated silica-alumina, fluorided silica-zirconia, chlorided silica-zirconia, bromided silica-zirconia, sulfated silica-zirconia, fluorided silica-titania, fluorided silica-coated alumina, sulfated silica-coated alumina, phosphated silica-coated alumina, and the like, or combinations thereof. In one aspect, the activator-support can be, or can comprise, fluorided alumina, sulfated alumina, fluorided silica-alumina, sulfated silica-alumina, fluorided silica-coated alumina, sulfated silica-coated alumina, phosphated silica-coated alumina, and the like, or any combination thereof. In another aspect, the activator-support comprises fluorided alumina; alternatively, comprises chlorided alumina; alternatively, comprises sulfated alumina; alternatively, comprises fluorided silica-alumina; alternatively, comprises sulfated silica-alumina; alternatively, comprises fluorided silica-zirconia; alternatively, comprises chlorided silica-zirconia; or alternatively, comprises fluorided silica-coated alumina.

When the electron-withdrawing component comprises a salt of an electron-withdrawing anion, the counterion or cation of that salt can be selected from any cation that allows the salt to revert or decompose back to the acid during calcining. Factors that dictate the suitability of the particular salt to serve as a source for the electron-withdrawing anion include, but are not limited to, the solubility of the salt in the desired solvent, the lack of adverse reactivity of the cation, ion-pairing effects between the cation and anion, hygroscopic properties imparted to the salt by the cation, and the like, and thermal stability of the anion. Examples of suitable cations in the salt of the electron-withdrawing anion include, but are not limited to, ammonium, trialkyl ammonium, tetraalkyl ammonium, tetraalkyl phosphonium, $H^+$, $[H(OEt_2)_2]^+$, and the like.

Further, combinations of one or more different electron-withdrawing anions, in varying proportions, can be used to tailor the specific acidity of the activator-support to the desired level. Combinations of electron-withdrawing components can be contacted with the oxide material simultaneously or individually, and in any order that affords the desired chemically-treated solid oxide acidity. For example, one aspect of this disclosure is employing two or more electron-withdrawing anion source compounds in two or more separate contacting steps.

Thus, one example of such a process by which a chemically-treated solid oxide is prepared is as follows: a selected solid oxide, or combination of solid oxides, is contacted with a first electron-withdrawing anion source compound to form a first mixture; this first mixture is calcined and then contacted with a second electron-withdrawing anion source compound to form a second mixture; the second mixture is then calcined to form a treated solid oxide. In such a process, the first and second electron-withdrawing anion source compounds can be either the same or different compounds.

According to another aspect of the present disclosure, the chemically-treated solid oxide comprises a solid inorganic oxide material, a mixed oxide material, or a combination of inorganic oxide materials, that is chemically-treated with an electron-withdrawing component, and optionally treated with a metal source, including metal salts, metal ions, or other metal-containing compounds. Nonlimiting examples of the metal or metal ion include zinc, nickel, vanadium, titanium, silver, copper, gallium, tin, tungsten, molybdenum, zirconium, and the like, or combinations thereof. Examples of chemically-treated solid oxides that contain a metal or metal ion include, but are not limited to, chlorided zinc-impregnated alumina, fluorided titanium-impregnated alumina, fluorided zinc-impregnated alumina, chlorided zinc-impregnated silica-alumina, fluorided zinc-impregnated silica-alumina, sulfated zinc-impregnated alumina, chlorided zinc aluminate, fluorided zinc aluminate, sulfated zinc aluminate, silica-coated alumina treated with hexafluorotitanic acid, silica-coated alumina treated with zinc and then fluorided, and the like, or any combination thereof.

Any method of impregnating the solid oxide material with a metal can be used. The method by which the oxide is contacted with a metal source, typically a salt or metal-containing compound, can include, but is not limited to, gelling, co-gelling, impregnation of one compound onto another, and the like. If desired, the metal-containing compound is added to or impregnated into the solid oxide in solution form, and subsequently converted into the supported metal upon calcining Accordingly, the solid inorganic oxide can further comprise a metal selected from zinc, titanium, nickel, vanadium, silver, copper, gallium, tin, tungsten, molybdenum, and the like, or combinations of these metals. For example, zinc is often used to impregnate the solid oxide because it can provide improved catalyst activity at a low cost.

The solid oxide can be treated with metal salts or metal-containing compounds before, after, or at the same time that the solid oxide is treated with the electron-withdrawing anion. Following any contacting method, the contacted mixture of solid compound, electron-withdrawing anion, and the metal ion is typically calcined. Alternatively, a solid oxide material, an electron-withdrawing anion source, and the metal salt or metal-containing compound are contacted and calcined simultaneously.

Various processes are used to form the chemically-treated solid oxide useful in the present disclosure. The chemically-treated solid oxide can comprise the contact product of one or more solid oxides with one or more electron-withdrawing anion sources. It is not required that the solid oxide be calcined prior to contacting the electron-withdrawing anion source. The contact product typically is calcined either during or after the solid oxide is contacted with the electron-withdrawing anion source. The solid oxide can be calcined or uncalcined. Various processes to prepare solid oxide activator-supports that can be employed in this disclosure have been reported. For example, such methods are described in U.S. Pat. Nos. 6,107,230; 6,165,929; 6,294,494; 6,300,271; 6,316,553; 6,355,594; 6,376,415; 6,388,017; 6,391,816; 6,395,666; 6,524,987; 6,548,441; 6,548,442; 6,576,583; 6,613,712; 6,632,894; 6,667,274; and 6,750,302; the disclosures of which are incorporated herein by reference in their entirety.

According to one aspect of the present disclosure, the solid oxide material is chemically-treated by contacting it with an electron-withdrawing component, typically an electron-withdrawing anion source. Further, the solid oxide material optionally is chemically treated with a metal ion, and then calcined to form a metal-containing or metal-impregnated chemically-treated solid oxide. According to another aspect of the present disclosure, the solid oxide material and electron-withdrawing anion source are contacted and calcined simultaneously.

The method by which the oxide is contacted with the electron-withdrawing component, typically a salt or an acid of an electron-withdrawing anion, can include, but is not limited to, gelling, co-gelling, impregnation of one compound onto another, and the like. Thus, following any contacting method, the contacted mixture of the solid oxide, electron-withdrawing anion, and optional metal ion, is calcined.

The solid oxide activator-support (i.e., chemically-treated solid oxide) thus can be produced by a process comprising:

1) contacting a solid oxide (or solid oxides) with an electron-withdrawing anion source compound (or compounds) to form a first mixture; and 2) calcining the first mixture to form the solid oxide activator-support.

According to another aspect of the present disclosure, the solid oxide activator-support (chemically-treated solid oxide) is produced by a process comprising:

1) contacting a solid oxide (or solid oxides) with a first electron-withdrawing anion source compound to form a first mixture;

2) calcining the first mixture to produce a calcined first mixture;

3) contacting the calcined first mixture with a second electron-withdrawing anion source compound to form a second mixture; and 4) calcining the second mixture to form the solid oxide activator-support.

According to yet another aspect of the present disclosure, the chemically-treated solid oxide is produced or formed by contacting the solid oxide with the electron-withdrawing anion source compound, where the solid oxide compound is calcined before, during, or after contacting the electron-withdrawing anion source, and where there is a substantial absence of aluminoxanes, organoboron or organoborate compounds, and ionizing ionic compounds.

Calcining of the treated solid oxide generally is conducted in an ambient atmosphere, typically in a dry ambient atmosphere, at a temperature from about 200° C. to about 900° C., and for a time of about 1 minute to about 100 hours. Calcining can be conducted at a temperature of from about 300° C. to about 800° C., or alternatively, at a temperature of from about 400° C. to about 700° C. Calcining can be conducted for about 30 minutes to about 50 hours, or for about 1 hour to about 15 hours. Thus, for example, calcining can be carried out for about 1 to about 10 hours at a temperature of from about 350° C. to about 550° C. Any suitable ambient atmosphere can be employed during calcining. Generally, calcining is conducted in an oxidizing atmosphere, such as air. Alternatively, an inert atmosphere, such as nitrogen or argon, or a reducing atmosphere, such as hydrogen or carbon monoxide, can be used.

According to one aspect of the present disclosure, the solid oxide material is treated with a source of halide ion, sulfate ion, or a combination of anions, optionally treated with a metal ion, and then calcined to provide the chemically-treated solid oxide in the form of a particulate solid. For example, the solid oxide material can be treated with a source of sulfate (termed a "sulfating agent"), a source of chloride ion (termed a "chloriding agent"), a source of fluoride ion (termed a "fluoriding agent"), or a combination thereof, and calcined to provide the solid oxide activator. Useful acidic activator-supports include, but are not limited to, bromided alumina, chlorided alumina, fluorided alumina, sulfated alumina, bromided silica-alumina, chlorided silica-alumina, fluorided silica-alumina, sulfated silica-alumina, bromided silica-zirconia, chlorided silica-zirconia, fluorided silica-zirconia, sulfated silica-zirconia, fluorided silica-titania, alumina treated with hexafluorotitanic acid, silica-coated alumina treated with hexafluorotitanic acid, silica-alumina treated with hexafluorozirconic acid, silica-alumina treated with trifluoroacetic acid, fluorided boria-alumina, silica treated with tetrafluoroboric acid, alumina treated with tetrafluoroboric acid, alumina treated with hexafluorophosphoric acid, a pillared clay, such as a pillared montmorillonite, optionally treated with fluoride, chloride, or sulfate; phosphated alumina or other aluminophosphates optionally treated with sulfate, fluoride, or chloride; or any combination of the above. Further, any of these activator-supports optionally can be treated with a metal ion.

The chemically-treated solid oxide can comprise a fluorided solid oxide in the form of a particulate solid. The fluorided solid oxide can be formed by contacting a solid oxide with a fluoriding agent. The fluoride ion can be added to the oxide by forming a slurry of the oxide in a suitable solvent such as alcohol or water including, but not limited to, the one to three carbon alcohols because of their volatility and low surface tension. Examples of suitable fluoriding agents include, but are not limited to, hydrofluoric acid (HF), ammonium fluoride ($NH_4F$), ammonium bifluoride ($NH_4HF_2$), ammonium tetrafluoroborate ($NH_4BF_4$), ammonium silicofluoride (hexafluorosilicate) (($NH_4$)$_2SiF_6$), ammonium hexafluorophosphate ($NH_4PF_6$), hexafluorotitanic acid ($H_2TiF_6$), ammonium hexafluorotitanic acid (($NH_4$)$_2TiF_6$), hexafluorozirconic acid ($H_2ZrF_6$), $AlF_3$, $NH_4AlF_4$, analogs thereof, and combinations thereof. Triflic acid and ammonium triflate also can be employed. For example, ammonium bifluoride ($NH_4HF_2$) can be used as the fluoriding agent, due to its ease of use and availability.

If desired, the solid oxide is treated with a fluoriding agent during the calcining step. Any fluoriding agent capable of thoroughly contacting the solid oxide during the calcining step can be used. For example, in addition to those fluoriding agents described previously, volatile organic fluoriding agents can be used. Examples of volatile organic fluoriding agents useful in this aspect of the disclosure include, but are not limited to, freons, perfluorohexane, perfluorobenzene, fluoromethane, trifluoroethanol, and the like, and combinations thereof. Calcining temperatures generally must be high enough to decompose the compound and release fluoride. Gaseous hydrogen fluoride (HF) or fluorine ($F_2$) itself also can be used with the solid oxide if fluorided while calcining Silicon tetrafluoride ($SiF_4$) and compounds containing tetrafluoroborate ($BF_4$) also can be employed. One convenient method of contacting the solid oxide with the fluoriding agent is to vaporize a fluoriding agent into a gas stream used to fluidize the solid oxide during calcination.

Similarly, in another aspect of this disclosure, the chemically-treated solid oxide comprises a chlorided solid oxide in the form of a particulate solid. The chlorided solid oxide is formed by contacting a solid oxide with a chloriding agent. The chloride ion can be added to the oxide by forming a slurry of the oxide in a suitable solvent. The solid oxide can be treated with a chloriding agent during the calcining step. Any chloriding agent capable of serving as a source of chloride and thoroughly contacting the oxide during the calcining step can be used, such as $SiCl_4$, $SiMe_2Cl_2$, $TiCl_4$, $BCl_3$, and the like, including mixtures thereof. Volatile organic chloriding agents can be used. Examples of suitable volatile organic chloriding agents include, but are not limited to, certain freons, perchlorobenzene, chloromethane, dichloromethane, chloroform, carbon tetrachloride, trichloroethanol, and the like, or any combination thereof. Gaseous hydrogen chloride or chlorine itself also can be used with the solid oxide during calcining. One convenient method of contacting the oxide with the chloriding agent is to vaporize a chloriding agent into a gas stream used to fluidize the solid oxide during calcination.

The amount of fluoride or chloride ion present before calcining the solid oxide generally is from about 1 to about 50% by weight, where the weight percent is based on the weight of the solid oxide, for example, silica-alumina, before calcining. According to another aspect of this disclosure, the amount of fluoride or chloride ion present before calcining the solid oxide is from about 1 to about 25% by weight, and according to another aspect of this disclosure, from about 2 to about 20% by weight. According to yet another aspect of this disclosure, the amount of fluoride or chloride ion present before calcining the solid oxide is from about 4 to about 10% by weight. Once impregnated with halide, the halided oxide can be dried by any suitable method including, but not limited to, suction filtration followed by evaporation, drying under vacuum, spray drying, and the like, although it is also possible to initiate the calcining step immediately without drying the impregnated solid oxide.

The silica-alumina used to prepare the treated silica-alumina typically has a pore volume greater than about 0.5 cc/g. According to one aspect of the present disclosure, the pore volume is greater than about 0.8 cc/g, and according to another aspect of the present disclosure, greater than about 1.0 cc/g. Further, the silica-alumina generally has a surface area greater than about 100 $m^2/g$. According to another aspect of this disclosure, the surface area is greater than about 250 $m^2/g$. Yet, in another aspect, the surface area is greater than about 350 $m^2/g$.

The silica-alumina utilized in the present disclosure typically has an alumina content from about 5 to about 95% by weight. According to one aspect of this disclosure, the alumina content of the silica-alumina is from about 5 to about 50%, or from about 8% to about 30%, alumina by weight. In another aspect, high alumina content silica-alumina compounds can employed, in which the alumina content of these silica-alumina compounds typically ranges from about 60% to about 90%, or from about 65% to about 80%, alumina by weight. According to yet another aspect of this disclosure, the solid oxide component comprises alumina without silica, and according to another aspect of this disclosure, the solid oxide component comprises silica without alumina.

The sulfated solid oxide comprises sulfate and a solid oxide component, such as alumina or silica-alumina, in the form of a particulate solid. Optionally, the sulfated oxide is treated further with a metal ion such that the calcined sulfated oxide comprises a metal. According to one aspect of the present disclosure, the sulfated solid oxide comprises sulfate and alumina. In some instances, the sulfated alumina is formed by a process wherein the alumina is treated with a sulfate source, for example, sulfuric acid or a sulfate salt such as ammonium sulfate. This process is generally performed by forming a slurry of the alumina in a suitable solvent, such as alcohol or water, in which the desired concentration of the sulfating agent has been added. Suitable organic solvents include, but are not limited to, the one to three carbon alcohols because of their volatility and low surface tension.

According to one aspect of this disclosure, the amount of sulfate ion present before calcining is from about 0.5 to about 100 parts by weight sulfate ion to about 100 parts by weight solid oxide. According to another aspect of this disclosure, the amount of sulfate ion present before calcining is from about 1 to about 50 parts by weight sulfate ion to about 100 parts by weight solid oxide, and according to still another aspect of this disclosure, from about 5 to about 30 parts by weight sulfate ion to about 100 parts by weight solid oxide. These weight ratios are based on the weight of the solid oxide before calcining. Once impregnated with sulfate, the sulfated oxide can be dried by any suitable method including, but not limited to, suction filtration followed by evaporation, drying under vacuum, spray drying, and the like, although it is also possible to initiate the calcining step immediately.

According to another aspect of the present disclosure, the activator-support used in preparing the catalyst compositions of this disclosure comprises an ion-exchangeable activator-support, including but not limited to silicate and aluminosilicate compounds or minerals, either with layered or non-layered structures, and combinations thereof. In another aspect of this disclosure, ion-exchangeable, layered aluminosilicates such as pillared clays are used as activator-supports. When the acidic activator-support comprises an ion-exchangeable activator-support, it can optionally be treated with at least one electron-withdrawing anion such as those disclosed herein, though typically the ion-exchangeable activator-support is not treated with an electron-withdrawing anion.

According to another aspect of the present disclosure, the activator-support of this disclosure comprises clay minerals having exchangeable cations and layers capable of expanding. Typical clay mineral activator-supports include, but are not limited to, ion-exchangeable, layered aluminosilicates such as pillared clays. Although the term "support" is used, it is not meant to be construed as an inert component of the catalyst composition, but rather is to be considered an active part of the catalyst composition, because of its intimate association with the transition-metal salt complex component.

According to another aspect of the present disclosure, the clay materials of this disclosure encompass materials either in their natural state or that have been treated with various ions by wetting, ion exchange, or pillaring. Typically, the clay material activator-support of this disclosure comprises clays that have been ion exchanged with large cations, including polynuclear, highly charged metal complex cations. However, the clay material activator-supports of this disclosure also encompass clays that have been ion exchanged with simple salts, including, but not limited to, salts of Al(III), Fe(II), Fe(III), and Zn(II) with ligands such as halide, acetate, sulfate, nitrate, or nitrite.

According to another aspect of the present disclosure, the activator-support comprises a pillared clay. The term "pillared clay" is used to refer to clay materials that have been ion exchanged with large, typically polynuclear, highly charged metal complex cations. Examples of such ions include, but are not limited to, Keggin ions which can have charges such as $7^+$, various polyoxometallates, and other large ions. Thus, the term pillaring refers to a simple exchange reaction in which the exchangeable cations of a clay material are replaced with large, highly charged ions, such as Keggin ions. These polymeric cations are then immobilized within the interlayers of the clay and when calcined are converted to metal oxide "pillars," effectively supporting the clay layers as column-like structures. Thus, once the clay is dried and calcined to produce the supporting pillars between clay layers, the expanded lattice structure is maintained and the porosity is enhanced. The resulting pores can vary in shape and size as a function of the pillaring material and the parent clay material used. Examples of pillaring and pillared clays are found in: T. J. Pinnavaia, Science 220 (4595), 365-371 (1983); J. M. Thomas, Intercalation Chemistry, (S. Whittington and A. Jacobson, eds.) Ch. 3, pp. 55-99, Academic Press, Inc., (1972); U.S. Pat. Nos. 4,452,910; 5,376,611; and 4,060,480; the disclosures of which are incorporated herein by reference in their entirety.

The pillaring process utilizes clay minerals having exchangeable cations and layers capable of expanding. Any pillared clay that can enhance the polymerization of olefins in the catalyst composition of the present disclosure can be used. Therefore, suitable clay minerals for pillaring include, but are not limited to, allophanes; smectites, both dioctahedral (Al) and tri-octahedral (Mg) and derivatives thereof such as montmorillonites (bentonites), nontronites, hectorites, or laponites; halloysites; vermiculites; micas; fluoromicas; chlorites; mixed-layer clays; the fibrous clays including but not limited to sepiolites, attapulgites, and palygorskites; a serpentine clay; illite; laponite; saponite; and any combination thereof. In one aspect, the pillared clay activator-support comprises bentonite or montmorillonite. The principal component of bentonite is montmorillonite.

The pillared clay can be pretreated if desired. For example, a pillared bentonite is pretreated by drying at about 300° C. under an inert atmosphere, typically dry nitrogen, for about 3 hours, before being added to the polymerization reactor. Although an exemplary pretreatment is described herein, it should be understood that the preheating can be carried out at many other temperatures and times, including any combination of temperature and time steps, all of which are encompassed by this disclosure.

The activator-support used to prepare the catalyst compositions of the present disclosure can be combined with other inorganic support materials, including, but not limited to, zeolites, inorganic oxides, phosphated inorganic oxides, and the like. In one aspect, typical support materials that are used include, but are not limited to, silica, silica-alumina, alumina, titania, zirconia, magnesia, boria, thoria, aluminophosphate, aluminum phosphate, silica-titania, coprecipitated silica/titania, mixtures thereof, or any combination thereof. In an embodiment, the activator-support comprises a sulfated solid oxide activator support (SSA).

The process of making these activator-supports may include precipitation, co-precipitation, impregnation, gelation, pore-gelation, calcining (at up to 900° C.), spray-drying, flash-drying, rotary drying and calcining, milling, sieving, and similar operations.

In an embodiment, the CATCOMP optionally comprises a metal alkyl or a metalloid alkyl which may function as a cocatalyst. Generally, the metal alkyl compound which can be utilized in the catalyst system of this disclosure can be any heteroleptic or homoleptic metal alkyl compound. In an embodiment, the metal alkyl can comprise, consist essentially of, or consist of, a non-halide metal alkyl, a metal alkyl halide, or any combination thereof; alternatively, a non-halide metal alkyl; or alternatively, a metal alkyl halide.

In an embodiment, the metal of the metal alkyl can comprise, consist essentially of, or consist of, a group 1, 2, 11, 12, 13, or 14 metal; or alternatively, a group 13 or 14 metal; or alternatively, a group 13 metal. In some embodiments, the metal of the metal alkyl (non-halide metal alkyl or metal alkyl halide) can be lithium, sodium, potassium, rubidium, cesium, beryllium, magnesium, calcium, strontium, barium, zinc, cadmium, boron, aluminum, or tin; alternatively, lithium, sodium, potassium, magnesium, calcium, zinc, boron, aluminum, or tin; alternatively, lithium, sodium, or potassium; alternatively, magnesium, calcium; alternatively, lithium; alternatively, sodium; alternatively, potassium; alternatively, magnesium; alternatively, calcium; alternatively, zinc; alternatively, boron; alternatively, aluminum; or alternatively, tin.

In some embodiments, the metal alkyl (non-halide metal alkyl or metal alkyl halide) can comprise, consist essentially of, or consist of, a lithium alkyl, a sodium alkyl, a magnesium alkyl, a boron alkyl, a zinc alkyl, or an aluminum alkyl. In some embodiments, the metal alkyl (non-halide metal alkyl or metal alkyl halide) can comprise, consist essentially of, or consist of, an aluminum alkyl.

In an embodiment, the aluminum alkyl can be a trialkylaluminum, an alkylaluminum halide, an alkylaluminum alkoxide, an aluminoxane, or any combination thereof. In some embodiments, the aluminum alkyl can be a trialkylaluminum, an alkylaluminum halide, an aluminoxane, or any combination thereof; or alternatively, a trialkylaluminum, an aluminoxane, or any combination thereof. In other embodiments, the aluminum alkyl can be a trialkylaluminum; alternatively, an alkylaluminum halide; alternatively, an alkylaluminum alkoxide; or alternatively, an aluminoxane.

In a non-limiting embodiment, the aluminoxane can have a repeating unit characterized by the Formula I:

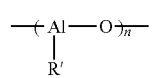

Formula I wherein R' is a linear or branched alkyl group. Alkyl groups for metal alkyls have been independently described herein and can be utilized without limitation to further describe the aluminoxanes having Formula I. Generally, n of Formula I is greater than 1; or alternatively, greater than 2. In an embodiment, n can range from 2 to 15; or alternatively, range from 3 to 10. In an aspect, each halide of any metal alkyl halide disclosed herein can independently be fluoride, chloride, bromide, or iodide; alternatively, chloride, bromide, or iodide. In an embodiment, each halide of any metal alkyl halide disclosed herein can be fluoride; alternatively, chloride; alternatively, bromide; or alternatively, iodide.

In an aspect, the alkyl group of any metal alkyl disclosed herein (non-halide metal alkyl or metal alkyl halide) can each independently be a $C_1$ to $C_{20}$ alkyl group; alternatively, a $C_1$ to C10 alkyl group; or alternatively, a $C_1$ to $C_6$ alkyl group. In an embodiment, the alkyl group(s) can each independently be a methyl group, an ethyl group, a propyl group, a butyl group, a pentyl group, a hexyl group, a heptyl group, or an octyl group; alternatively, a methyl group, a ethyl group, a butyl group, a hexyl group, or an octyl group. In some embodiments, the alkyl group can each independently be a methyl group, an ethyl group, an n-propyl group, an n-butyl group, an iso-butyl group, an n-hexyl group, or an n-octyl group; alternatively, a methyl group, an ethyl group, an n-butyl group, or an iso-butyl group; alternatively, a methyl group; alternatively, an ethyl group; alternatively, an n-propyl group; alternatively, an n-butyl group; alternatively, an iso-butyl group; alternatively, an n-hexyl group; or alternatively, an n-octyl group.

In an aspect, the alkoxide group of any metal alkyl alkoxide disclosed herein can each independently be a $C_1$ to $C_{20}$ alkoxy group; alternatively, a $C_1$ to $C_{10}$ alkoxy group; or alternatively, a $C_1$ to $C_6$ alkoxy group. In an embodiment, each alkoxide group of any metal alkyl alkoxide disclosed herein can each independently be a methoxy group, an ethoxy group, a propoxy group, a butoxy group, a pentoxy group, a hexoxy group, a heptoxy group, or an octoxy group; alternatively, a methoxy group, a ethoxy group, a butoxy group, a hexoxy group, or an octoxy group. In some embodiments, each alkoxide group of any metal alkyl alkoxide disclosed herein can each independently be a methoxy group, an ethoxy group, an n-propoxy group, an n-butoxy group, an iso-butoxy group, an n-hexoxy group, or an n-octoxy group; alternatively, a methoxy group, an ethoxy group, an n-butoxy group, or an iso-butoxy group; alternatively, a methoxy group; alternatively, an ethoxy group; alternatively, an n-propoxy group; alternatively, an n-butoxy group; alternatively, an iso-butoxy group; alternatively, an n-hexoxy group; or alternatively, an n-octoxy group.

In a non-limiting embodiment, useful metal alkyls can include methyl lithium, n-butyl lithium, sec-butyl lithium, tert-butyl lithium, diethyl magnesium, di-n-butylmagnesium, ethylmagnesium chloride, n-butylmagnesium chloride, and diethyl zinc.

In a non-limiting embodiment, useful trialkylaluminum compounds can include trimethylaluminum, triethylaluminum, tripropylaluminum, tributylaluminum, trihexylaluminum, trioctylaluminum, or mixtures thereof. In some non-limiting embodiments, trialkylaluminum compounds can include trimethylaluminum, triethylaluminum, tripropylaluminum, tri-n-butylaluminum, tri-isobutylaluminum, trihexylaluminum, tri-n-octylaluminum, or mixtures thereof; alternatively, triethylaluminum, tri-n-butylaluminum, tri-isobutylaluminum, trihexylaluminum, tri-n-octylaluminum, or mixtures thereof; alternatively, triethylaluminum, tri-n-butylaluminum, trihexylaluminum, tri-n-octylaluminum, or mixtures thereof. In other non-limiting embodiments, useful trialkylaluminum compounds can include trimethylaluminum; alternatively, triethylaluminum; alternatively, tripropylaluminum; alternatively, tri-n-butylaluminum; alternatively, tri-isobutylaluminum; alternatively, trihexylaluminum; or alternatively, tri-n-octylaluminum.

In a non-limiting embodiment, useful alkylaluminum halides can include diethylaluminum chloride, diethylaluminum bromide, ethylaluminum dichloride, ethylaluminum sesquichloride, and mixtures thereof. In some non-limiting embodiments, useful alkylaluminum halides can include diethylaluminum chloride, ethylaluminum dichloride, ethylaluminum sesquichloride, and mixtures thereof. In other non-limiting embodiments, useful alkylaluminum halides can include diethylaluminum chloride; alternatively, diethylaluminum bromide; alternatively, ethylaluminum dichloride; or alternatively, ethylaluminum sesquichloride.

In a non-limiting embodiment, useful aluminoxanes can include methylaluminoxane (MAO), ethylaluminoxane, modified methylaluminoxane (MMAO), n-propylaluminoxane, iso-propylaluminoxane, n-butylaluminoxane, sec-butylaluminoxane, iso-butylaluminoxane, t-butyl aluminoxane, 1-pentylaluminoxane, 2-pentylaluminoxane, 3-pentylaluminoxane, iso-pentylaluminoxane, neopentylaluminoxane, or mixtures thereof; In some non-limiting embodiments, useful aluminoxanes can include methylaluminoxane (MAO), modified methylaluminoxane (MMAO), isobutyl aluminoxane, t-butyl aluminoxane, or mixtures thereof. In other non-limiting embodiments, useful aluminoxanes can include methylaluminoxane (MAO); alternatively, ethylaluminoxane; alternatively, modified methylaluminoxane (MMAO); alternatively, n-propylaluminoxane; alternatively, iso-propylaluminoxane; alternatively, n-butylaluminoxane; alternatively, sec-butylaluminoxane; alternatively, iso-butylaluminoxane; alternatively, t-butyl aluminoxane; alternatively, 1-pentylaluminoxane; alternatively, 2-pentylaluminoxane; alternatively, 3-pentylaluminoxane; alternatively, iso-pentylaluminoxane; or alternatively, neopentylaluminoxane.

In an embodiment, the metal alkyl comprises comprise an organoboron compound or an organoborate compound. Organoboron or organoborate compounds include neutral boron compounds, borate salts, and the like, or combinations thereof. For example, fluoroorgano boron compounds and fluoroorgano borate compounds are contemplated.

Any fluoroorgano boron or fluoroorgano borate compound can be utilized with the present disclosure. Examples of fluoroorgano borate compounds that can be used in the present disclosure include, but are not limited to, fluorinated aryl borates such as N,N-dimethylanilinium tetrakis(pentafluorophenyl)borate, triphenylcarbenium tetrakis(pentafluorophenyl)borate, lithium tetrakis(pentafluorophenyl)borate, N,N-dimethylanilinium tetrakis[3,5-bis(trifluoro-methyl)phenyl]borate, triphenylcarbenium tetrakis[3,5-bis(trifluoromethyl)phenyl]borate, and the like, or mixtures thereof. Examples of fluoroorgano boron compounds that can be used in the present disclosure include, but are not limited to, tris(pentafluorophenyl)boron, tris[3,5-bis(trifluoromethyl)phenyl]boron, and the like, or mixtures thereof. Although not intending to be bound by the following theory, these examples of fluoroorgano borate and fluoroorgano boron compounds, and related compounds, are thought to form "weakly-coordinating" anions when combined with organometal compounds, as disclosed in U.S. Pat. No. 5,919,983, the disclosure of which is incorporated herein by reference in its entirety. Applicants also contemplate the use of diboron, or bis-boron, compounds or other bifunctional compounds containing two or more boron atoms in the chemical structure, such as disclosed in J. Am. Chem. Soc., 2005, 127, pp. 14756-14768, the content of which is incorporated herein by reference in its entirety.

In one aspect, the weight ratio of the treated solid oxide component to the CATCOMP (e g , imine phenol compound and MTE-A or imine-phenol compound and MTE-B) may be from about 10,000:1 to about 10:1. In another aspect, the weight ratio of the treated solid oxide component to the CATCOMP may be from about 5000:1 to about 10:1, an in yet another aspect, from about 2000:1 to 50:1. These weight ratios are based on the combined weights of cocatalyst (e.g., organoaluminum, treated oxide) and CATCOMP used to prepare the catalyst composition, regardless of the order of contacting the catalyst components. In an embodiment, the metal salt complex of an imine phenol compound and the metallocene complex are present in the CATCOMP in a ratio of from about 100:1 to about 1:100 based on the total weight of the CATCOMP, alternatively from about 20:1 to about 1:20, or alternatively from about 10:1 to about 1:10.

In an embodiment, CATCOMPs of the type disclosed herein display a catalytic activity in a polymerization reaction ranging from about 1 g PE/g cat·h to about 1,000,000 kg PE/g cat·h, alternatively from about 1 kg PE/g cat·h to about 100,000 kg PE/g cat·h, or alternatively from about 10 kg PE/g cat·h to about 10,000 kg PE/g cat·h. Catalyst system activity is defined as grams of a product produced per gram of the transition metal salt complex utilized in the catalyst system over the first 30 minutes of a reaction beginning from the time when the complete catalyst system is contacted with the olefin. Catalyst system activity can be stated in terms of various products of an olefin oligomerization or polymerization.

In an embodiment, a catalyst system of the type disclosed herein is used to prepare a polymer by any olefin polymerization method, using various types of polymerization reactors. As used herein, "polymerization reactor" includes any reactor capable of polymerizing olefin monomers to produce homopolymers and/or copolymers. Homopolymers and/or copolymers produced in the reactor may be referred to as resin and/or polymers. The various types of reactors include, but are not limited to those that may be referred to as batch, slurry, gas-phase, solution, high pressure, tubular, autoclave, or other reactor and/or reactors. Gas phase reactors may comprise fluidized bed reactors or staged horizontal reactors. Slurry reactors may comprise vertical and/or horizontal loops. High pressure reactors may comprise autoclave and/or tubular reactors. Reactor types may include batch and/or continuous processes. Continuous processes may use intermittent and/or continuous product discharge or transfer. Processes may also include partial or full direct recycle of un-reacted monomer, un-reacted comonomer, catalyst and/or co-catalysts, diluents, and/or other materials of the polymerization process. Polymerization reactor systems of the present disclosure may comprise one type of reactor in a system or multiple reactors of the same or different type, operated in any suitable configuration. Production of polymers in multiple reactors may include several stages in at least two separate polymerization reactors interconnected by a transfer system making it possible to transfer the polymers resulting from the first polymerization reactor into the second reactor. Alternatively, polymerization in multiple reactors may include the transfer, either manual or automatic, of polymer from one reactor to subsequent reactor or reactors for additional polymerization. Alternatively, multi-stage or multi-step polymerization may take place in a single reactor, wherein the conditions are changed such that a different polymerization reaction takes place.

The desired polymerization conditions in one of the reactors may be the same as or different from the operating conditions of any other reactors involved in the overall process of producing the polymer of the present disclosure. Multiple reactor systems may include any combination including, but not limited to multiple loop reactors, multiple gas phase reactors, a combination of loop and gas phase reactors, multiple high pressure reactors or a combination of high pressure with loop and/or gas reactors. The multiple reactors may be operated in series or in parallel. In an embodiment, any arrangement and/or any combination of reactors may be employed to produce the polymer of the present disclosure.

According to one embodiment, the polymerization reactor system may comprise at least one loop slurry reactor. Such reactors may comprise vertical or horizontal loops. Monomer, diluent, catalyst system, and optionally any comonomer may be continuously fed to a loop slurry reactor, where polymerization occurs. Generally, continuous processes may comprise the continuous introduction of a monomer, a catalyst, and/or a diluent into a polymerization reactor and the continuous removal from this reactor of a suspension comprising polymer particles and the diluent. Reactor effluent may be flashed to remove the liquids that comprise the diluent from the solid polymer, monomer and/or comonomer. Various technologies may be used for this separation step including but not limited to, flashing that may include any combination of heat addition and pressure reduction; separation by cyclonic action in either a cyclone or hydrocyclone; separation by centrifugation; or other appropriate method of separation.

Typical slurry polymerization processes (also known as particle-form processes) are disclosed in U.S. Pat. Nos. 3,248,179, 4,501,885, 5,565,175, 5,575,979, 6,239,235, 6,262,191 and 6,833,415, for example; each of which are herein incorporated by reference in their entirety.

Suitable diluents used in slurry polymerization include, but are not limited to, the monomer being polymerized and hydrocarbons that are liquids under reaction conditions. Examples of suitable diluents include, but are not limited to, hydrocarbons such as propane, cyclohexane, isobutane, n-butane, n-pentane, isopentane, neopentane, and n-hexane. Some loop polymerization reactions can occur under bulk conditions where no diluent is used. An example is polymerization of propylene monomer as disclosed in U.S. Pat. Nos. 5,455,314, which is incorporated by reference herein in its entirety.

According to yet another embodiment, the polymerization reactor may comprise at least one gas phase reactor. Such systems may employ a continuous recycle stream containing one or more monomers continuously cycled through a fluidized bed in the presence of the catalyst under polymerization conditions. A recycle stream may be withdrawn from the fluidized bed and recycled back into the reactor. Simultaneously, polymer product may be withdrawn from the reactor and new or fresh monomer may be added to replace the polymerized monomer. Such gas phase reactors may comprise a process for multi-step gas-phase polymerization of olefins, in which olefins are polymerized in the gaseous phase in at least two independent gas-phase polymerization zones while feeding a catalyst-containing polymer formed in a first polymerization zone to a second polymerization zone. One type of gas phase reactor is disclosed in U.S. Pat. Nos. 4,588,790, 5,352,749, and 5,436,304, each of which is incorporated by reference in its entirety herein.

According to still another embodiment, a high pressure polymerization reactor may comprise a tubular reactor or an autoclave reactor. Tubular reactors may have several zones where fresh monomer, initiators, or catalysts are added. Monomer may be entrained in an inert gaseous stream and introduced at one zone of the reactor. Initiators, catalysts, and/or catalyst components may be entrained in a gaseous stream and introduced at another zone of the reactor. The gas streams may be intermixed for polymerization. Heat and pressure may be employed appropriately to obtain optimal polymerization reaction conditions.

According to yet another embodiment, the polymerization reactor may comprise a solution polymerization reactor wherein the monomer is contacted with the catalyst composition by suitable stirring or other means. A carrier comprising an organic diluent or excess monomer may be employed. If desired, the monomer may be brought in the vapor phase into contact with the catalytic reaction product, in the presence or absence of liquid material. The polymerization zone is maintained at temperatures and pressures that will result in the formation of a solution of the polymer in a reaction medium. Agitation may be employed to obtain better temperature control and to maintain uniform polymerization mixtures throughout the polymerization zone. Adequate means are utilized for dissipating the exothermic heat of polymerization.

Polymerization reactors suitable for the present disclosure may further comprise any combination of at least one raw material feed system, at least one feed system for catalyst or catalyst components, and/or at least one polymer recovery system. Suitable reactor systems for the present invention may further comprise systems for feedstock purification, catalyst storage and preparation, extrusion, reactor cooling, polymer recovery, fractionation, recycle, storage, loadout, laboratory analysis, and process control.

Conditions that are controlled for polymerization efficiency and to provide polymer properties include, but are not limited to temperature, pressure, type and quantity of catalyst or co-catalyst, and the concentrations of various reactants.

Polymerization temperature can affect catalyst productivity, polymer molecular weight and molecular weight distribution. Suitable polymerization temperatures may be any temperature below the de-polymerization temperature, according to the Gibbs Free Energy Equation. Typically, this includes from about 60° C. to about 280° C., for example, and/or from about 70° C. to about 110° C., depending upon the type of polymerization reactor and/or polymerization process.

Suitable pressures will also vary according to the reactor and polymerization process. The pressure for liquid phase polymerization in a loop reactor is typically less than 1000 psig. Pressure for gas phase polymerization is usually at about 200-500 psig. High pressure polymerization in tubular or autoclave reactors is generally run at about 20,000 to 75,000 psig. Polymerization reactors can also be operated in a supercritical region occurring at generally higher temperatures and pressures. Operation above the critical point of a pressure/temperature diagram (supercritical phase) may offer advantages.

The concentration of various reactants can be controlled to produce polymers with certain physical and mechanical properties. The proposed end-use product that will be formed by the polymer and the method of forming that product may be varied to determine the desired final product properties. Mechanical properties include, but are not limited to tensile strength, flexural modulus, impact resistance, creep, stress relaxation and hardness tests. Physical properties include, but are not limited to density, molecular weight, molecular weight distribution, melting temperature, glass transition temperature, temperature melt of crystallization, density, stereoregularity, crack growth, short chain branching, long chain branching and rheological measurements.

The concentrations of monomer, co-monomer, hydrogen, co-catalyst, modifiers, and electron donors are generally important in producing specific polymer properties. Comonomer may be used to control product density. Hydrogen may be used to control product molecular weight. Co-catalysts may be used to alkylate, scavenge poisons and/or control molecular weight. The concentration of poisons may be minimized, as poisons may impact the reactions and/or otherwise affect polymer product properties. Modifiers may be used to control product properties and electron donors may affect stereoregularity.

In an embodiment, the CATCOMP comprises an imine phenol compound characterized by Structure XV, a metallocene compound characterized by Structure 15 or Structure 18, a sulfated solid oxide of the type disclosed herein and an alkylaluminum complex of the type disclosed herein.

The CATCOMP can be contacted with a monomer (e.g., ethylene and optional comonomer) under conditions suitable for the formation of a polymer (e.g., polyethylene). In an embodiment, a monomer (e.g., ethylene) is polymerized using the methodologies disclosed herein to produce a polymer. The polymer may comprise a homopolymer, a copolymer, or combinations thereof. In an embodiment, the polymer is a copolymer comprising ethylene and one or more comonomers such as, for example, alpha olefins. Examples of suitable comonomers include, but are not limited to, unsaturated hydrocarbons having from 3 to 20 carbon atoms such as propylene, 1-butene, 1-pentene, 1-hexene, 3-methyl-1-butene, 4-methyl-l-pentene, 1-heptene, 1-octene, 1-nonene, 1-decene, and mixtures thereof. In an embodiment, the comonomer is 1-hexene. In an embodiment, the commoner may be present in the polymer in an amount of equal to or less than about 0.5 mol. %, alternatively less than about 0.4 mol. %, alternatively less than about 0.3 mol. % or alternatively less than about 0.2 mol. %. In an embodiment, the polymer is a homopolymer. It is to be understood that an inconsequential amount of comonomer may be present in the polymers disclosed herein and the polymer still be considered a homopolymer. Herein an inconsequential amount of a comonomer refers to an amount that does not substantively affect the properties of the polymer disclosed herein.

The polymer may include other additives. Examples of additives include, but are not limited to, antistatic agents, colorants, stabilizers, nucleators, surface modifiers, pigments, slip agents, antiblocks, tackafiers, polymer processing aids, and combinations thereof. Such additives may be used singularly or in combination and may be included in the polymer before, during, or after preparation of the polymer as described herein. Such additives may be added via any suitable technique, for example during an extrusion or compounding step such as during pelletization or subsequent processing into an end use article.

In an embodiment, a polymer of the type described herein is a two-component system comprising a first component designated Component A and a second component designated Component B. The polymer may be a reactor-blend that is result of the use a catalyst system of the type disclosed herein (i.e., an imine(bis) phenol compound, a metallocene) where the polymer is formed by polymerization of a monomer (e.g., olefin) in the presence of the catalyst system and a metal alkyl, all of the type disclosed herein. In an embodiment, Component A and Component B possess an overlapping molecular weight distribution profile such that the MWD profile of Component B is encompassed by the MWD profile of Component A. Component A may have a polymer architecture that is characterized by a broad MWD, high-density and is substantially linear. Component B may have a polymer architecture that is characterized by a narrow MWD and increased branching when compared to Component A. Each of these characteristics are described in more detail later herein. Component A may be present in an amount that constitutes from about 1 weight percent (wt. %) to about 99 wt. % based on the total weight of the polymer, alternatively from about 10 wt. % to about 90 wt. % or alternatively from about 20 wt. % to about 80 wt. %. In an embodiment, greater than about 90%, 91, 92, 93, 94, 95, 96, 97, 98, or 99% of the remainder of the polymer comprises Component B.

In an embodiment, Component A is characterized by a density of from about 0.94 g/cc to about 0.98 g/cc, alternatively from about 0.95 g/cc to about 0.980 g/cc, or alternatively from about 0.955 g/cc to about 0.980 g/cc as determined in accordance with ASTM D-1505. Component B may be characterized by a density of from about 0.86 g/cc to about 0.98 g/cc, alternatively from about 0.87 g/cc to about 0.97 g/cc, or alternatively from about 0.88 g/cc to about 0.96 g/cc as determined in accordance with ASTM D-1505.

In an embodiment, a polymer of the type described herein is multimodal. Herein, the "modality" of a polymer refers to the form of its molecular weight distribution curve, i.e. the appearance of the graph of the polymer weight fraction as a function of its molecular weight. The polymer weight fraction refers to the weight fraction of molecules of a given size. A polymer having a molecular weight distribution curve showing a single peak may be referred to as a unimodal polymer, a polymer having curve showing two distinct peaks may be referred to as bimodal polymer, a polymer having a curve showing three distinct peaks may be referred to as trimodal polymer, a polymer having a curve showing two or more peaks may be referred to as multimodal, etc. Polymer modality may be determined using any suitable methodology such as those described in the examples sections herein.

In an embodiment, a polymer of the type described herein may have a weight average molecular weight ($M_w$) for Component A ranging from about 50 kg/mol to about 1000 kg/mol, alternatively from about 100 kg/mol to about 750 kg/mol or alternatively from about 200 kg/mol to about 500 kg/mol while component B may have a $M_w$ ranging from about 20 kg/mol to about 2000 kg/mol, alternatively from about 50 kg/mol to about 1500 kg/mol or alternatively from about 100 kg/mol to about 1000 kg/mol. The $M_w$ for the polymer composition as a whole may range from about 50 kg/mol to about 1000 kg/mol, alternatively from about 75 kg/mol to about 750 kg/mol, alternatively from about 100 kg/mol to about 500 kg/mol. The weight average molecular weight describes the molecular weight distribution of a polymer and is calculated according to Equation 1:

$$M_w = \frac{\sum_i N_i M_i^2}{\sum_i N_i M_i} \quad (1)$$

where $N_i$ is the number of molecules of molecular weight $M_i$.

The $M_n$ for the polymer composition as a whole may range from about 1 kg/mol to about 100 kg/mol, alternatively from about 5 kg/mol to about 50 kg/mol, alternatively from about 10 kg/mol to about 30 kg/mol. The number average molecular weight is the common average of the molecular weights of the individual polymers and may be calculated according to Equation 2:

$$M_n = \frac{\sum_i N_i M_i}{\sum_i N_i} \quad (2)$$

where $N_i$ is the number of molecules of molecular weight $M_i$.

A polymer of the type disclosed herein may be characterized by a peak molecular weight ($M_p$) of from about 10 kg/mol to about 1000 kg/mol, alternatively from about 50 kg/mol to about 500 kg/mol, or alternatively from about 50 kg/mol to about 400 kg/mol. The $M_p$ refers to the molecular weight of the highest and is a mode of the MWD.

In an embodiment, a polymer of the type described herein may be characterized by a MWD for Component A of greater than about 20, alternatively greater than about 25, or alternatively greater than about 30 while Component B may be characterized by a MWD of less than about 20, alternatively less than about 15, alternatively less than about 10, or alternatively less than about 5. A polymer of the type described herein, as a whole, may be characterized by a MWD of from about 3 to about 100, alternatively from about 6 to about 75, or alternatively from about 10 to about 50. The MWD is the ratio of the $M_w$ to the number average molecular weight (Me), which is also referred to as the polydispersity index (PDI) or more simply as polydispersity.

A polymer of the type described herein may be further characterized by a ratio of z-average molecular weight ($M_z$) to $M_w$ ($M_z/M_w$) of from about 1.5 to about 20, alternatively from about 2 to about 15 or alternatively from about 3 to about 10. The z-average molecular weight is a higher order molecular weight average which is calculated according to Equation 3:

$$M_z = \frac{\sum_i N_i M_i^3}{\sum_i N_i M_i^2} \quad (3)$$

where $N_i$ is the amount of substance of species i and $M_i$ is the molecular weight of species i. The ratio of $M_z/M_w$ is another indication of the breadth of the MWD of a polymer.

In an embodiment, a polymer of the type described herein may have a high load melt index, HLMI, in a range from about 0.01 g/10 min. to about 1000 g/10 min., alternatively from about 0.1 g/10 min. to about 100 g/10 min., or alternatively from about 1 g/10 min. to about 20 g/10 min. The high load melt index (HLMI) refers to the rate a polymer which can be forced through an extrusion rheometer orifice of 0.0824 inch diameter when subjected to a force of 21,600 grams at 190° C. in accordance with ASTM D 1238.

In an embodiment, a polymer of the type disclosed herein has a Carreau Yasuda 'a' parameter, CY-a, in the range of from about 0.05 to about 0.8, alternatively from about 0.1 to about 0.5, or alternatively from about 0.15 to about 0.4. The Carreau Yasuda 'a' parameter (CY-a) is defined as the rheological breath parameter. Rheological breadth refers to the breadth of the transition region between Newtonian and power-law type shear rate for a polymer or the frequency dependence of the viscosity of the polymer. The rheological breadth is a function of the relaxation time distribution of a polymer resin, which in turn is a function of the resin molecular structure or architecture. The CY-a parameter may be obtained by assuming the Cox-Merz rule and calculated by fitting flow curves generated in linear-viscoelastic dynamic oscillatory frequency sweep experiments with a modified Carreau-Yasuda (CY) model, which is represented by Equation (4):

$$E = E_o [1 + (T_\xi \dot{\gamma})^a]^{\frac{n-1}{a}} \quad (4)$$

where
E=viscosity (Pa·s)
$\dot{\gamma}$=shear rate (1/s)
a=rheological breadth parameter
$T_\xi$=relaxation time (s) [describes the location in time of the transition region]
$E_o$=zero shear viscosity (Pa·s) [defines the Newtonian plateau]
n=power law constant [defines the final slope of the high shear rate region]

To facilitate model fitting, the power law constant n is held at a constant value. Details of the significance and interpretation of the CY model and derived parameters may be found in: C. A. Hieber and H. H. Chiang, *Rheol. Acta,* 28, 321 (1989); C. A. Hieber and H. H. Chiang, *Polym. Eng. Sci.,* 32, 931 (1992); and R. B. Bird, R. C. Armstrong and O. Hasseger, *Dynamics of Polymeric Liquids, Volume* 1, *Fluid Mechanics,* 2nd Edition, John Wiley & Sons (1987), each of which is incorporated by reference herein in its entirety.

In an embodiment, a polymer of the type described herein may have a zero-shear viscosity ($\eta_0$) of from about 1E+03 Pa·s to about 1E+10 Pa·s, alternatively from about 1E+04 Pa·s to about 1E+09 Pa·s, or alternatively from about 1E+05 Pa·s to about 1E+08 Pa·s.

In an embodiment, a polymer of the type disclosed herein is further characterized by a reverse comonomer branching distribution or reverse short-chain branching distribution (SCBD) resulting in short-chain branching (SCB) that occurs primarily in Component B of the polymer. Herein, the SCBD refers to number of SCB per 1000 carbon atoms at each MW across the MWD profile of a polymer.

In an embodiment, a polymer of the type disclosed herein is characterized by a short-chain branching content of from about 0.1 to about 20 short chain branches per 1000 total carbon atoms, alternatively from about 0.5 to about 15, or alternatively from about 1 to about 10. In another embodiment, a polymer of the type disclosed herein is characterized by the SCB present in Component B in an amount that constitutes from about 75% to about 100% based on the number of short-chain branches per 1000 carbon atoms, alternatively from about 80% to about 100% based on the number of short-chain branches per 1000 carbon atoms, alternatively from about 90% to about 100% based on the number of short-chain branches per 1000 carbon atoms.

In an embodiment, a polymer of the type disclosed herein is a reactor blend of polymers prepared by contacting an imine (bis)phenol compound, a metallocene compound and a metal alkyl, all of the type disclosed herein, with a monomer under conditions suitable for the for formation of a polymer. In an embodiment, the monomer is ethylene. Alternatively the polymer formed comprises ethylene and 1-hexene. In an embodiment, the polymer has a polydispersity index of greater than about 15 and a short-chain branching distribution maximum that occurs between a weight average molecular weight of about 30 kDa and 1000 kDa. In an embodiment, the polymer has a level of short-chain branching ranging from about 0.1 to about 20 short chain branches per 1000 total carbon atoms, alternatively from about 0.5 to about 15 or alternatively from about 1 to about 10.

Polymers of the type disclosed herein may be characterized by a short chain branching distribution that is described by a Pearson VII Amp curve fit wherein the value of the short chain branching distribution slope from the short chain branching distribution maximum at a log of the weight average molecular weight less than about the maximum log weight average molecular weight is less than about –0.005. The Pearson Amp Curve Fit is based on the Pearson VII model which contains four adjustable parameters a, p, q, and v0 which correspond to amplitude, line width, shape factor and band center respectively. As q→1 the band reduces to a Lorenzian distribution and as q approaches 50 a more or less Gaussian distribution is obtained. Thus, the Pearson VII curve-fitting procedure approximates a mixed Lorentzian-Gaussian model for band shape.

Polymers of the type disclosed herein may be formed into articles of manufacture or end-use articles using techniques known in the art such as extrusion, blow molding, injection molding, fiber spinning, thermoforming, and casting. Polymers of the type disclosed herein may display an improved processability.

In an embodiment, the polymer comprises PE which may be fabricated into a pipe by extrusion. Extrusion refers to a method of making a polymeric pipe comprising extruding the polymer or copolymer in a molten state through a die to cool and form the polymeric pipe. Hereinafter the disclosure will refer to PE pipe although other polymeric articles are also contemplated.

Pipe extrusion in the simplest terms is performed by conveying solid polymer pellets through the action of a rotating screw followed by the compaction and melting of the pellets through the application of heat and shear forces; the homogenous polymer melt is then conveyed to the die to form the ultimately desired profile. For the fabrication of pipes the extrudate (melt exiting the die), which is annular in shape, is then formed and cooled through a series of vacuum and water cooling tanks. There are numerous kinds of feedstocks in pipe extrusion. The polymer feedstock can either be a pre-pigmented polyethylene resin or it can be a mixture of natural polyethylene and color concentrate (referred to as "Salt and Pepper blends"). In North America, the most common feedstock for pipe extrusion is "Salt and Pepper blends". In Europe and other areas of the world, the most common feedstock for pipe extrusion is pre-pigmented polyethylene resin. Feedstock is rigidly controlled to obtain the proper finished product (pipe) and ultimate consumer specifications. In one "salt and pepper blend" embodiment, the color concentrate is a polyethylene carrier resin loaded with up to 40 weight percent carbon black particles; this concentrate is introduced to maintain approximately 2.5 weight percent carbon black concentration in the final pipe.

The feedstock is then fed into an extruder. The most common extruder system for pipe production is a single-screw extruder. The purpose of the extruder is to melt, homogenize and convey the polyethylene pellets. Extrusion temperatures typically range from 170° C. to 260° C. depending upon the extruder screw design and flow properties of the polyethylene.

The molten polymer is then passed through an annular die to shape the melt. The molten polymer, in the form of an annulus, is then usually forced through a shaping or forming tank while simultaneously being cooled from the outside using a water spray. While the pipe diameter is a direct consequence of the die and sizing sleeve dimensions, the pipe wall thickness depends on the die gap and also the draw-down speed employed.

Next, the pipe is cooled and solidified in the desired dimensions. Cooling is accomplished by the use of several water tanks where the outside pipe is either submerged in water or water is sprayed on the pipe exterior. The pipe is cooled from the outside surface to the inside surface. The interior wall and inside surfaces of the pipe can stay hot for a long period of time, as polyethylene is a poor conductor of heat. Finally, the pipe is printed and either coiled or cut to length.

In an embodiment, the PE pipes of this disclosure display enhanced mechanical properties such as resistance to slow crack growth, decreased tensile natural draw ratio (NDR), resistance to rapid crack propagation and strength sufficient to warrant the designation PE100. The designation PE100 refers to a pressure rating wherein the pipe has a minimum required strength value (50 year extrapolated value at 20° C.; 97.5 lower prediction limit) equal to or greater than 10.0 MPa. Such pipes may display the properties described below either singularly or in combination. The specific methods for determination of these properties are described in more detail herein.

A majority of the field failures in pressure pipe applications are attributable to slow crack growth (SCG). This has led to the development of many lab-scale tests, such as the Pennsylvania Edge-Notch Tensile Test (PENT; ASTM F1473), to predict the resistance to SCG of various polyethylenes. In the PENT test, a notched polyethylene specimen is subjected to creep by the application of a constant tensile load at 80° C. The applied load is such that the initial stress is 3.8 MPa. The time to failure is recorded and reported. A longer failure time correlates with a greater resistance to SCG. Generally speaking, increasing the resin density lowers the PENT failure times. The PE pipe of the type disclosed herein may display PENT failure times of greater than about 800 hours (h) to about 2000 hours, alternatively greater than about 1500 h, or alternatively greater than about 2000 h.

Since the majority of field failures in pressure pipe (gas transport) applications are attributable to a brittle fracture mode referred to as SCG, the resistance to SCG of pressure pipe is often evaluated. One method of evaluating the SCG resistance is by determining the tensile natural draw ratio (tensile NDR) of the resin. There is some evidence that the tensile NDR is directly related to the SCG resistance of HDPE such that the lower the tensile NDR the higher the resistance to SCG. A description of the correlation of SCG to tensile NDR may be found in: E. Laurent, *Comprehensive Evaluation of the Long-Term Mechanical Properties of PE*100 *Resin Meeting the Requirements of Modern Installation Techniques*, Plastic Pipes XI Proceedings of the International Conference, Woodhead Publishing Limited (2001); and in an article by L. Hubert, et al published in 2002 in the Journal of Applied Polymer Science Volume 84 page 2308 each of which is incorporated herein by reference herein in its entirety.

The tensile NDR is determined by performing standard tensile stress-strain experiments on dogbone specimens at a deformation rate of 51 mm/min in accordance with ASTM D638. Referring to FIG. 1, a representative stress-strain curve is shown where the tensile strain is plotted as percent strain and the stress is expressed as force or load (in lbf). Inflection points 20, 40, 50 and 60 mark points at which transformations in material behavior occur. Initially, at conditions of low strain a linear region 10 is observed. In this linear region 10 the material experiences a stress (F) directly proportional to the applied strain (u) and the material behavior can be approximated by Hooke's law (equation 5) with the constant of proportionality being the elastic or Young's modulus denoted Y:

$$F = Yu \qquad (5)$$

Also, in the linear region 10, the deformation behavior is approximately elastic, i.e. the material strain returns to zero when the applied load is removed. The stress at the point where the material's behavior changes from elastic to plastic is known as the yield stress. Application of a load beyond the yield point 20, results in permanent (or plastic) material deformation. Generally, the yield point 20 in polyethylene is evident as a maximum in the load-strain traces as shown in FIG. 1. Beyond the yield point, as the specimen is stretched continuously, the material outside the neck region in the dogbone specimen is drawn into the neck; the load does not change very much during this necking and drawing process. This necking/drawing process continues until the specimen encounters "strain-hardening" or point 50 in FIG. 1. The onset of strain-hardening simply means that any further deformation of the specimen requires considerably more energy input. This is evident in a substantial and dramatic increase in the load in FIG. 1. In other words, the onset of strain hardening 50 marks a period 90 when more stress is required to achieve a given strain than seen in the previous region of the curve. The percent strain at the onset of strain-hardening is defined as the tensile NDR. The continued application of load to the material will eventually result in the material's fracture at the break stress and strain point 60.

Some polymers do not exhibit the distinct strain-hardening behavior shown in FIG. 1. Therefore, in order to define a tensile NDR, the following criterion needs to be satisfied first: the tensile stress at break is at least 10% higher than that of the tensile yield stress ($\sigma_{brk} > 1.10 * \sigma_y$).

In an embodiment, articles (e.g., pipe) prepared from polymers of the type disclosed herein have a tensile NDR ranging from about 540% to about 600%, alternatively less than about of 600% alternatively less than about 550% or less than about 540%.

Polymers prepared from CATCOMPs of the type disclosed herein may contain some user and/or process desired SCBD. The SCBD of the polymers may be adjusted by adjusting the composition of the CATCOMP to provide a SCBD that may be targeted to lie within one or more defined molecular weight ranges of the polymer composition.

EXAMPLE

The present disclosure is further illustrated by the following example, which is not to be construed in any way as imposing limitations upon the scope thereof. On the contrary, it is to be clearly understood that resort can be had to various other aspects, embodiments, modifications, and equivalents thereof which, after reading the description herein, can suggest themselves to one of ordinary skill in the art without departing from the spirit of the present invention or the scope of the appended claims.

The data and descriptions provided in the following example are given to show particular aspects and embodiments of the subject matter disclosed, and to demonstrate a number of the practices and advantages thereof. The example is given as a more detailed demonstration of some of the aspects and embodiments described herein and is not intended to limit the disclosure or claims in any manner.

CATCOMPs of the type disclosed herein were utilized in the polymerization of ethylene. Specifically a CATCOMP comprising the imine bis(phenolate) compound designated Structure XV in Table 1, and a metallocene compound of either Structure 15 or Structure 18 was utilized to produce nine polyethylene samples, designated Samples S1-S9. Each sample was prepared from a mixture comprising 1 g of S-SSA, 0.6 ml of TIBA and a select amount of 1-hexene which was subjected to 450 psi of ethylene monomer and allowed to polymerize at 100° C. for 45 min.

TABLE 1

| Sample No. | Cat | Cat Amount (mg) | PE (g) | Hydrogen (ppm) | 1-hexene (g) | HLMI | Density (g/cc) | $M_n$/1000 (kg/mol) | $M_w$/1000 (kg/mol) | $M_z$/1000 (kg/mol) | $M_v$/1000 (kg/mol) | $M_p$/1000 (kg/mol) | Mw/Mn | $\eta_0$ (Pa-s) | CY-a |
|---|---|---|---|---|---|---|---|---|---|---|---|---|---|---|---|
| C1 | Structure XV | 3 | 213 | 150 | 5 | 6.9 | 0.9656 | 9.99 | 356.03 | 2544.2 | 235.49 | 53.9 | 35.64 | 2.41E+07 | 0.1722 |
| S1 | Structure XV/Structure 18 | 3/0.5 | 311 | 225 | 5 | 5.5 | 0.9501 | 15.43 | 310.19 | 2229.78 | 216.1 | 78.31 | 20.1 | 8.43E+06 | 0.1414 |
| S2 | Structure XV/Structure 18 | 3/0.5 | 280 | 200 | 5 | 4 | 0.9520 | 14.79 | 361.63 | 2343.5 | 252.7 | 81.29 | 24.45 | 8.26E+06 | 0.1664 |
| S3 | Structure XV/Structure 18 | 3/0.5 | 306 | 175 | 5 | 3.2 | 0.9525 | 12.74 | 405.4 | 2602.86 | 280.2 | 92.05 | 31.82 | 1.75E+07 | 0.1672 |
| S4 | Structure XV/Structure 18 | 3/0.5 | 220 | 165 | 5 | 2.2 | 0.9546 | 10.98 | 440.31 | 2791.97 | 300.95 | 113.69 | 40.1 | 8.50E+06 | 0.2152 |

TABLE 1-continued

| Sample No. | Cat | Cat Amount (mg) | PE (g) | Hydrogen (ppm) | 1-hexene (g) | HLMI | Density (g/cc) | $M_n$/1000 (kg/mol) | $M_w$/1000 (kg/mol) | $M_z$/1000 (kg/mol) | $M_v$/1000 (kg/mol) | $M_p$/1000 (kg/mol) | Mw/Mn | $\eta_0$ (Pa-s) | CY-a |
|---|---|---|---|---|---|---|---|---|---|---|---|---|---|---|---|
| S5 | Structure XV/ Structure 18 | 4/0.5 | 269 | 225 | 7 | 2.2 | 0.9483 | 15.71 | 308.01 | 1436.62 | 231.76 | 107.23 | 19.6 | 3.02E+06 | 0.2406 |
| S6 | Structure XV/ Structure 15 | 3/0.15 | 325 | 225 | 5 | 3.9 | 0.9533 | 14.94 | 291.34 | 1907.37 | 211.02 | 99.17 | 19.5 | 4.77E+05 | 0.2580 |
| S7 | Structure XV/ Structure 15 | 3/0.15 | 285 | 200 | 5 | 3.4 | 0.9498 | 17.64 | 294.67 | 1815.63 | 217.9 | 116.55 | 16.7 | 4.02E+05 | 0.2571 |
| S8 | Structure XV/ Structure 15 | 3/0.15 | 318 | 175 | 5 | 1.8 | 0.9505 | 19.3 | 323.63 | 1675.73 | 245.52 | 155.04 | 16.77 | 5.12E+05 | 0.3165 |
| S9 | Structure XV/ Structure 15 | 3/0.2 | 324 | 200 | 5 | 2.9 | 0.9488 | 18.02 | 291.5 | 1628.36 | 219.82 | 121.49 | 16.18 | 4.6E+05 | 0.2720 |
| S10 | Structure XV/ Structure 15 | 3/0.2 | 347 | 175 | 5 | 1.4 | 0.9462 | 20.52 | 317.16 | 1490.02 | 247.66 | 160.52 | 15.46 | 4.63E+05 | 0.3199 |
| S11 | Structure XV/ Structure 15 | 3/0.2 | 299 | 175 | 10 | 2.4 | 0.9445 | 16.63 | 265.24 | 1566.79 | 202.41 | 176.72 | 15.95 | 1.62E+05 | 0.3193 |
| S12 | Structure XV/ Structure 15 | 3/0.3 | 334 | 200 | 10 | 2.8 | 0.9405 | 16.95 | 239.47 | 1193.32 | 190.17 | 154.23 | 14.13 | 1.0E+05 | 0.3646 |

Figure 2:
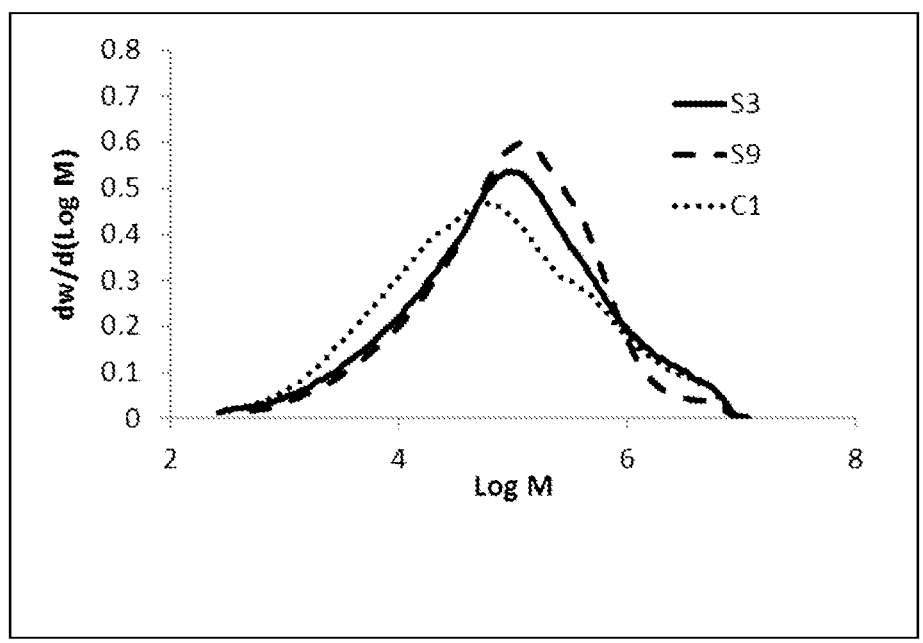
FIG. 2 is a gel permeation chromatograph of the samples from the example.
Figure 3:
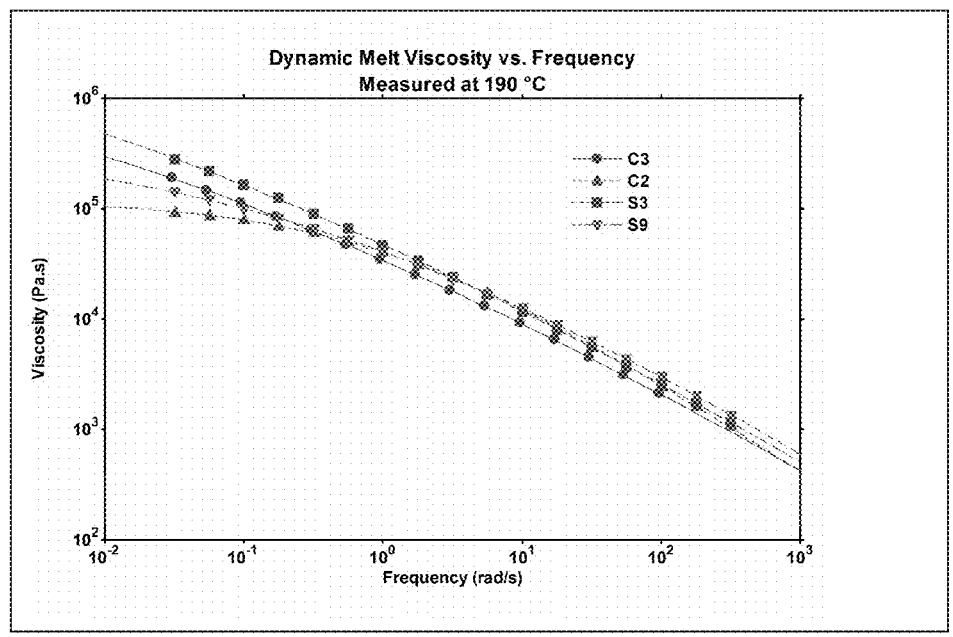
FIG. 3 is a plot of the dynamic melt viscosity as a function of frequency for the samples from the example.

Various properties of the polymer sample are also presented in Table 1. A comparative sample was polymerized in the presence of the imine bis(phenolate) compound represented by Structure XV is designated C1. The data in table 1 demonstrates that by tuning the catalyst composition and reactor conditions polymer samples having various properties were produced. The catalyst combination, amount of 1-hexene, and hydrogen allowed access to a range of HLMIs. Generally, the HLMI of the polymer samples increased with increasing hydrogen feed for a given combination allowing access to a range of HLMIs. Also generally, the density of the polymer samples decreased with increasing 1-hexene addition. GPC curves for samples S3 and S9 are presented in FIG. 2. The CATCOMPs used to prepared samples S3 and S9 contained the compounds represented by Structures 18 and 15 respectively as the metallocene component. Notably sample S3 displayed a broader MWD, contained a lower $M_p$, and a more substantial HMW tail. The rheology of polymers of the type disclosed herein was investigated by monitoring the dynamic melt viscosity as a function of frequency. These results are presented in FIG. 2 for samples S3 and S9. These results are compared to polymers prepared using a dual metallocene system, sample C2, or a chromium catalyst, sample C3. The polymers of the present disclosure are highly shear thinning, similar to chromium sample C3, suggesting the materials will display related processability when compared to chromium systems and display a marked improvement in processability when compared to systems prepared utilizing a dual metallocene catalyst. Chromium sample C3 is the commercial benchmark resin in melt strength, and in light of the similarities in the rheology to S3 and S9, should mean the polymers of the present disclosure should display comparable melt strength.

Figure 4:
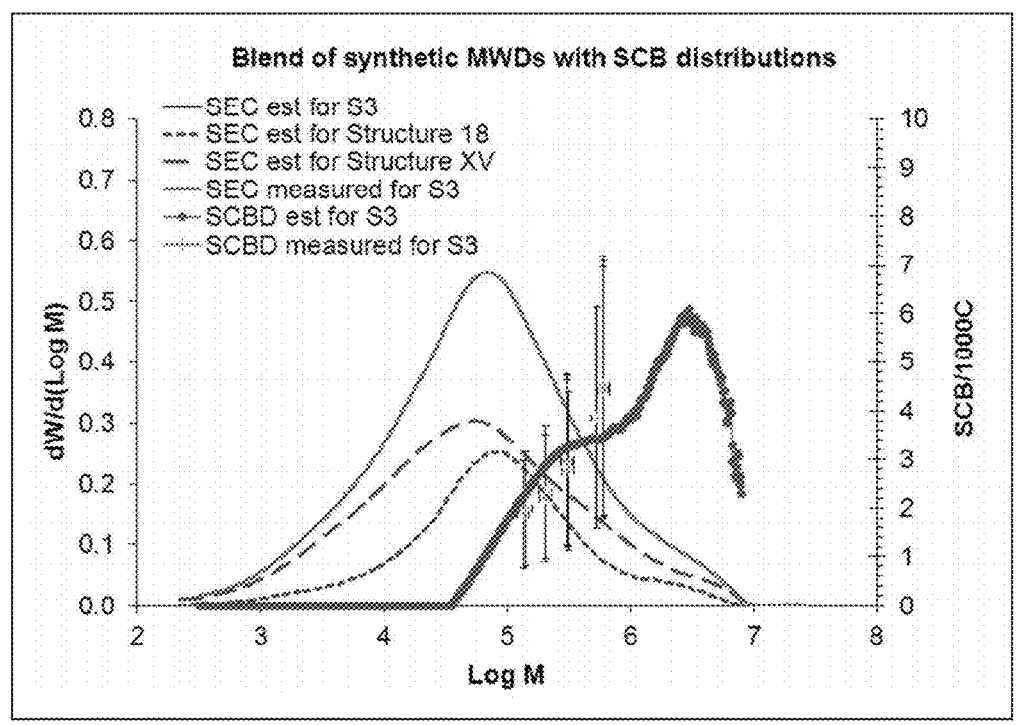
FIGS. 4 and 5 are plots of the short chain branching distribution for the samples from the example.
Figure 5:
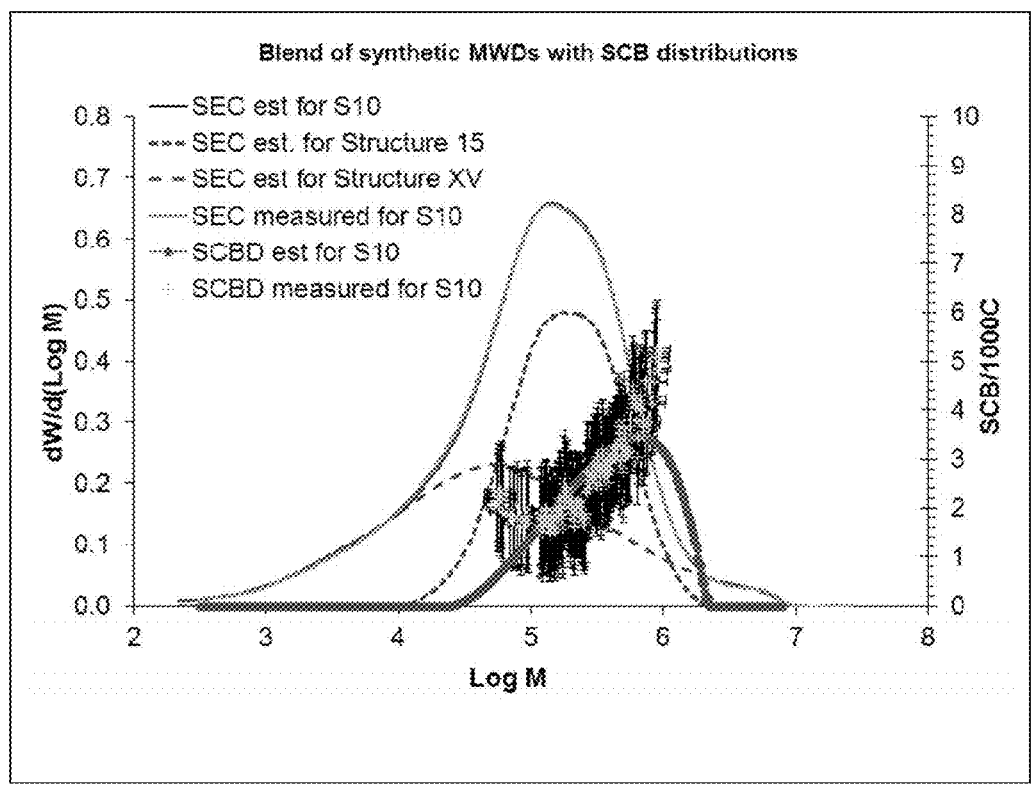

The SCBD of polymers of the type disclosed herein, specifically samples S3 and S10, were determined by GPC and the results are presented in FIGS. 4 and 5 respectively. The results demonstrate that the butyl branches are located within Component B. The tensile NDR for various polymer samples of the type disclosed herein was determined and are presented in Table 2. As shown in Table 2, the inclusion of the short-chain branches by the inclusion of the compounds represented by Structures 15 and 18 led to a significant reduction in the NDR (%) and increased slow crack growth resistance. For example, C1 which was prepared in the absence of the compounds represented by Structures 15 or 18 had an NDR of 747. The inclusion of compounds represented by Structures 15 or 18 in the polymerization both reduced the density and NDR of the polymer.

Comparisons of the polymers of the type disclosed herein (i.e., prepared using CATCOMPS) to polymers prepared with chromium catalysts C3 and C4 are contained in Table 3. The data illustrates improved SCG resistance for polymers of the type disclosed herein, e.g., S2 and S12, for a similar density as given by the reduced NDR.

The improved SCG resistance by NDR measurement is demonstrated by the PENT testing in Table 4. At the same density, S5 vastly outperforms C3 in PENT.

TABLE 2

| Sample No. | Density (g/cc) | NDR (%) |
|---|---|---|
| C1 | 0.966 | 747.0 |
| S1 | 0.950 | 543.8 |
| S2 | 0.952 | 537.2 |
| S3 | 0.953 | 531.8 |
| S4 | 0.955 | 517.4 |
| S5 | 0.948 | 504.0 |
| S6 | 0.953 | 580.7 |
| S7 | 0.950 | 511.8 |
| S8 | 0.951 | 558.7 |
| S9 | 0.949 | 518.5 |
| S10 | 0.946 | 464.5 |
| S11 | 0.945 | 479.7 |
| S12 | 0.941 | 447.7 |

TABLE 3

| Sample No. | Density (g/cc) | NDR (%) |
|---|---|---|
| C3 | 0.947 | 591 |
| S5 | 0.948 | 504 |
| C4 | 0.938 | 507 |
| S12 | 0.941 | 448 |

TABLE 4

| Sample No. | Density (g/cc) | NDR (%) | PENT 3.8 MPa (h) |
|---|---|---|---|
| C3 | 0.947 | 591 | 188 |
| S5 | 0.948 | 504 | >2000 |

The results demonstrate the placement of SCB within the HMW end of the broad distribution provides polymers with superb SCG resistance as indicated by the NDR and PENT values. Comonomer incorporation with polymers prepared using the CATCOMPs of this disclosure displayed improved properties such as low NDR values across a range of densities.

The following enumerated embodiments are provided as non-limiting examples.

A first embodiment, which is a polymer reactor-blend comprising at least a first component having a polydispersity index of greater than about 20 and present in an amount of from about 1 wt. % to about 99 wt. % based on the total weight of the polymer and a second component having a polydispersity index of less than about 20 and present in an amount of from about 1 wt. % to about 99 wt. % based on the total weight of the polymer wherein a molecular weight distribution of the second component lies within a molecular weight distribution of the first component.

A second embodiment, which is the polymer of the first embodiment having greater than about 75% of branching contained within the second component.

A third embodiment, which is the polymer of the first or second embodiment formed from ethylene and a comonomer.

A fourth embodiment, which is the polymer of any of the first to third embodiments wherein the first component has a density of greater than about 0.950 g/cc.

A fifth embodiment, which is the polymer of any of the second to fourth embodiments wherein the branching can be either short-chain branching, long-chain branching or both.

A sixth embodiment, which is the polymer of any of the third to fifth embodiments wherein the comonomer comprises 1-butene, 1-hexene, 1-octene, or combinations thereof.

A seventh embodiment, which is the polymer of any of the second to sixth embodiments wherein the branching comprises short-chain branching.

An eighth embodiment, which is the polymer of the seventh embodiment wherein the short-chain branching is greater than about 0.1 SCB per 1000 carbons.

A ninth embodiment, which is the polymer of any of the preceding embodiments having a weight average molecular weight of from about 50 kg/mol to about 1000 kg/mol.

A tenth embodiment, which is the polymer of any of the preceding embodiments having a molecular weight distribution of from about 4 to about 200.

An eleventh embodiment, which is the polymer of any of the preceding embodiments having a CY-a value of from about 0.05 to about 0.8.

A twelfth embodiment, which is the polymer of any of the preceding embodiments having a short-chain branching content of from about 1 to about 20 SCB per 1000 carbons.

A thirteenth embodiment, which is the polymer of any of the preceding embodiments having a tensile draw ratio of less than about 600%.

A fourteenth embodiment, which is the polymer of any of the preceding embodiments having a PENT failure time of greater than 800 h determined in accordance with ASTM F1473 using a 3.8 MPa stress.

A fifteenth embodiment, which is a method of preparing a polymer pipe comprising:

obtaining a polymer prepared by contacting ethylene monomer and 1-hexene with a catalyst composition comprising (i) an imine (bis) phenolate compound having Structure XIV

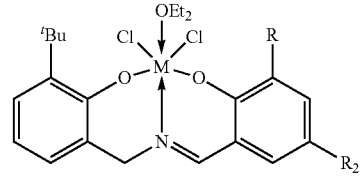

Structure XIV where M is a Group 3 to Group 12 transition metal or lanthanide $R^2$ and $R^3$ can each independently be hydrogen, a halogen, a hydrocarbyl group, or a substituted hydrocarbyl group and (ii) a metallocene complex under conditions suitable for the formation of a polymer and $Et_2O$ is optional; and fabricating the polymer into a pipe wherein the polymer has zero shear viscosity of from about 1E+05 Pa-s to about 1E+10 Pa-s and a tensile natural draw ratio of less than about 600% and wherein the pipe has a PENT value of greater than about 800 hours as determined in accordance with ASTM F1473 using a 3.8 MPa stress.

A sixteenth embodiment, which is a polymer reactor blend having a polydispersity index of greater than about 15 and a short-chain branching distribution maximum that occurs between a weight average molecular weight of about 30 kDa and 1000 kDa.

A seventeenth embodiment, which is the polymer of the sixteenth embodiment having a level of short-chain branching ranging from about 0.1 to about 20 short chain branches per 1000 total carbon atoms and a short chain branching distribution that is described by a Pearson VII Amp curve fit wherein the value of the short chain branching distribution slope from the short chain branching distribution maximum at a log of the weight average molecular weight less than about the maximum log weight average molecular weight is less than about −0.005.

An eighteenth embodiment, which is the polymer of the sixteenth or seventeenth embodiment comprising polyethylene.

A nineteenth embodiment, which is the polymer of the sixteenth, seventeenth, or eighteenth embodiment prepared using a catalyst composition comprising at least one imine (bis)phenolate compound, at least one metallocene compound, and a metal alkyl.

A twentieth embodiment, which is an article prepared from the polymer of the sixteenth, seventeenth, eighteenth or nineteenth embodiment.

While embodiments of the disclosure have been shown and described, modifications thereof can be made by one skilled in the art without departing from the spirit and teachings of the disclosure. The embodiments described herein are exemplary only, and are not intended to be limiting. Many variations and modifications of the disclosure disclosed herein are possible and are within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, Rl, and an upper limit, Ru, is disclosed, any number falling within the range is specifically disclosed. In particular, the following numbers within the range are specifically disclosed: R=Rl+k*(Ru−Rl), wherein k is a variable ranging from 1 percent to 100 percent with a 1 percent increment, i.e., k is 1 percent, 2 percent, 3 percent, 4 percent, 5 percent, . . . , 50 percent, 51 percent, 52 percent, . . . , 95 percent, 96 percent, 97 percent, 98 percent, 99 percent, or 100 percent. Moreover, any numerical range defined by two R numbers as defined in the above is also specifically disclosed. Use of the term "optionally" with respect to any element of a claim is intended to mean that the subject element is required, or alternatively, is not required. Both alternatives are intended to be within the scope of the claim. Use of broader terms such as comprises, includes, having, etc. should be understood to provide support for narrower terms such as consisting of, consisting essentially of, comprised substantially of, etc.

Accordingly, the scope of protection is not limited by the description set out above but is only limited by the claims which follow, that scope including all equivalents of the subject matter of the claims. Each and every claim is incorporated into the specification as an embodiment of the present disclosure. Thus, the claims are a further description and are an addition to the embodiments of the present disclosure. The discussion of a reference herein is not an admission that it is prior art to the present disclosure, especially any reference that may have a publication date after the priority date of this application. The disclosures of all patents, patent applications, and publications cited herein are hereby incorporated by reference, to the extent that they provide exemplary, procedural, or other details supplementary to those set forth herein.

What is claimed is:

1. A method of preparing a polymer pipe comprising:
obtaining a polymer prepared by contacting ethylene and a comonomer with a catalyst composition comprising at least one imine (bis) phenolate compound and at least one metallocene compound under conditions suitable for the formation of the polymer, wherein the polymer comprises at least a first component having a polydispersity index of greater than about 20 and present in an amount of from about 1 wt % to about 99 wt % based on the total weight of the polymer and a second component having a polydispersity index of less than about 20 and present in an amount of from about 1 wt % to about 99 wt % based on the total weight of the polymer, wherein a molecular weight distribution of the second component is encompassed by a molecular weight distribution of the first component and wherein the polymer has greater than about 75% of branching contained within the second component, and
wherein the polymer has zero shear viscosity of from about 1E+03 Pa-s to about 1E+10 Pa-s and a tensile natural draw ratio of less than about 600%; and fabricating the polymer into a pipe, wherein the pipe has a PENT value of greater than about 800 hours as determined in accordance with ASTM F1473 using a 3.8 MPa stress.

2. The method of claim 1 wherein the polymer has a polydispersity index of greater than about 15 and a short-chain branching distribution maximum that occurs between a weight average molecular weight of about 30 kDa and 1000 kDa.

3. The method of claim 2 wherein the polymer has a level of short-chain branching ranging from about 0.1 to about 20 short chain branches per 1000 total carbon atoms and a short chain branching distribution that is described by a Pearson VII Amp curve fit wherein the value of the short chain branching distribution slope from the short chain branching distribution maximum at a log of the weight average molecular weight less than about the maximum log weight average molecular weight is less than about −0.005.

4. The method of claim 1 wherein the polymer has a level of short-chain branching ranging from about 0.1 to about 20 short chain branches per 1000 total carbon atoms and a short chain branching distribution that is described by a Pearson VII Amp curve fit wherein the value of the short chain branching distribution slope from the short chain branching distribution maximum at a log of the weight average molecular weight less than about the maximum log weight average molecular weight is less than about −0.005.

5. The method of claim 1 wherein the comonomer comprises 1-butene, 1-hexene, 1-octene, or combinations thereof.

6. The method of claim 5 wherein the polymer has a CY-a value of from about 0.05 to about 0.8.

7. The method of claim 6 wherein the polymer has a weight average molecular weight of from about 50 kg/mol to about 1000 kg/mol.

8. The method of claim 1 wherein the polymer has a CY-a value of from about 0.05 to about 0.8.

9. The method of claim 1 wherein the polymer has a weight average molecular weight of from about 50 kg/mol to about 1000 kg/mol.

10. A method of preparing a polymer pipe comprising:
obtaining a polymer prepared by contacting ethylene and a comonomer with a catalyst composition comprising at least one imine (bis) phenolate compound and at least one metallocene compound under conditions suitable for the formation of the polymer, wherein the polymer comprises at least a first component having a polydispersity index of greater than about 20 and present in an amount of from about 1 wt % to about 99 wt % based on the total weight of the polymer and a second component having a polydispersity index of less than about 20 and present in an amount of from about 1 wt % to about 99 wt % based on the total weight of the polymer, wherein a molecular weight distribution of the second component is encompassed by a molecular weight distribution of the first component and wherein the polymer has greater than about 75% of branching contained within the second component, and
wherein the polymer has a polydispersity index of greater than about 15 and a short-chain branching distribution maximum that occurs between a weight average molecular weight of about 30 kDa and 1000 kDa; and fabricating the polymer into a pipe, wherein the pipe has a PENT value of greater than about 800 hours as determined in accordance with ASTM F1473 using a 3.8 MPa stress.

11. The method of claim 10 wherein the comonomer comprises 1-butene, 1-hexene, 1-octene, or combinations thereof.

12. The method of claim 11 wherein the polymer has a CY-a value of from about 0.05 to about 0.8.

13. The method of claim 12 wherein the polymer has a weight average molecular weight of from about 50 kg/mol to about 1000 kg/mol .

14. The method of claim 10 wherein the polymer has a CY-a value of from about 0.05 to about 0.8.

15. The method of claim 10 wherein the polymer has a weight average molecular weight of from about 50 kg/mol to about 1000 kg/mol.

16. A method of preparing a polymer pipe comprising:
obtaining a polymer prepared by contacting ethylene and a comonomer with a catalyst composition comprising at least one imine (bis) phenolate compound and at least one metallocene compound under conditions suitable for the formation of the polymer, wherein the polymer comprises at least a first component having a polydispersity index of greater than about 20 and present in an amount of from about 1 wt % to about 99 wt % based on the total weight of the polymer and a second component having a polydispersity index of less than about 20 and present in an amount of from about 1 wt % to about 99 wt % based on the total weight of the polymer, wherein a molecular weight distribution of the second component is encompassed by a molecular weight distribution of the first component and wherein the polymer has greater than about 75% of branching contained within the second component, and wherein the polymer has a level of short-chain branching ranging from about 0.1 to about 20 short chain branches per 1000 total carbon atoms and a short chain branching distribution that is described by a Pearson VII Amp curve fit wherein the value of the short chain branching distribution slope from the short chain branching distribution maximum at a log of the weight average molecular weight less than about the maximum log weight average molecular weight is less than about −0.005; and fabricating the polymer into a pipe, wherein the pipe has a PENT value of greater than about 800 hours as determined in accordance with ASTM F1473 using a 3.8 MPa stress.

17. The method of claim 16 wherein the comonomer comprises 1-butene, 1-hexene, 1-octene, or combinations thereof.

18. The method of claim 17 wherein the polymer has a CY-a value of from about 0.05 to about 0.8.

19. The method of claim 18 wherein the polymer has a weight average molecular weight of from about 50 kg/mol to about 10 kg/mol.

20. The method of claim 16 wherein the polymer has a CY-a value of from about 0.05 to about 0.8.

21. The method of claim 16 wherein the polymer has a weight average molecular weight of from about 50 kg/mol to about 1000 kg/mol.

* * * * *